United States Patent
Bellegarda

(10) Patent No.: US 8,935,167 B2
(45) Date of Patent: Jan. 13, 2015

(54) EXEMPLAR-BASED LATENT PERCEPTUAL MODELING FOR AUTOMATIC SPEECH RECOGNITION

(71) Applicant: Apple Inc., Cupertino, CA (US)

(72) Inventor: Jerome Bellegarda, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 310 days.

(21) Appl. No.: 13/626,825

(22) Filed: Sep. 25, 2012

(65) Prior Publication Data

US 2014/0088964 A1    Mar. 27, 2014

(51) Int. Cl.
G10L 15/00    (2013.01)
G10L 15/06    (2013.01)

(52) U.S. Cl.
USPC .................... 704/244; 704/231; 704/243

(58) Field of Classification Search
CPC ...... G10L 15/065; G10L 15/063; G10L 15/07
USPC ......................................... 704/231, 243, 244
See application file for complete search history.

(56) References Cited

U.S. PATENT DOCUMENTS

| | | |
|---|---|---|
| 3,704,345 A | 11/1972 | Coker et al. |
| 3,828,132 A | 8/1974 | Flanagan et al. |
| 3,979,557 A | 9/1976 | Schulman et al. |
| 4,278,838 A | 7/1981 | Antonov |
| 4,282,405 A | 8/1981 | Taguchi |
| 4,310,721 A | 1/1982 | Manley et al. |
| 4,348,553 A | 9/1982 | Baker et al. |
| 4,653,021 A | 3/1987 | Takagi |
| 4,688,195 A | 8/1987 | Thompson et al. |
| 4,692,941 A | 9/1987 | Jacks et al. |
| 4,718,094 A | 1/1988 | Bahl et al. |
| 4,724,542 A | 2/1988 | Williford |
| 4,726,065 A | 2/1988 | Froessl |
| 4,727,354 A | 2/1988 | Lindsay |

(Continued)

FOREIGN PATENT DOCUMENTS

| | | | |
|---|---|---|---|
| CH | 681573 A5 | 4/1993 | |
| DE | 3837590 A1 | 5/1990 | |

(Continued)

OTHER PUBLICATIONS

Alfred App, 2011, http://www.alfredapp.com/, 5 pages.

(Continued)

Primary Examiner — Shaun Roberts
(74) Attorney, Agent, or Firm — Morrison & Foerster LLP

(57) ABSTRACT

Methods, systems, and computer-readable media related to selecting observation-specific training data (also referred to as "observation-specific exemplars") from a general training corpus, and then creating, from the observation-specific training data, a focused, observation-specific acoustic model for recognizing the observation in an output domain are disclosed. In one aspect, a global speech recognition model is established based on an initial set of training data; a plurality of input speech segments to be recognized in an output domain are received; and for each of the plurality of input speech segments: a respective set of focused training data relevant to the input speech segment is identified in the global speech recognition model; a respective focused speech recognition model is generated based on the respective set of focused training data; and the respective focused speech recognition model is provided to a recognition device for recognizing the input speech segment in the output domain.

27 Claims, 7 Drawing Sheets

(56) References Cited

U.S. PATENT DOCUMENTS

| | | |
|---|---|---|
| 4,776,016 A | 10/1988 | Hansen |
| 4,783,807 A | 11/1988 | Marley |
| 4,811,243 A | 3/1989 | Racine |
| 4,819,271 A | 4/1989 | Bahl et al. |
| 4,827,520 A | 5/1989 | Zeinstra |
| 4,829,576 A | 5/1989 | Porter |
| 4,833,712 A | 5/1989 | Bahl et al. |
| 4,839,853 A | 6/1989 | Deerwester et al. |
| 4,852,168 A | 7/1989 | Sprague |
| 4,862,504 A | 8/1989 | Nomura |
| 4,878,230 A | 10/1989 | Murakami et al. |
| 4,903,305 A | 2/1990 | Gillick et al. |
| 4,905,163 A | 2/1990 | Garber et al. |
| 4,914,586 A | 4/1990 | Swinehart et al. |
| 4,914,590 A | 4/1990 | Loatman et al. |
| 4,944,013 A | 7/1990 | Gouvianakis et al. |
| 4,955,047 A | 9/1990 | Morganstein et al. |
| 4,965,763 A | 10/1990 | Zamora |
| 4,974,191 A | 11/1990 | Amirghodsi et al. |
| 4,977,598 A | 12/1990 | Doddington et al. |
| 4,992,972 A | 2/1991 | Brooks et al. |
| 5,010,574 A | 4/1991 | Wang |
| 5,020,112 A | 5/1991 | Chou |
| 5,021,971 A | 6/1991 | Lindsay |
| 5,022,081 A | 6/1991 | Hirose et al. |
| 5,027,406 A | 6/1991 | Roberts et al. |
| 5,031,217 A | 7/1991 | Nishimura |
| 5,032,989 A | 7/1991 | Tornetta |
| 5,040,218 A | 8/1991 | Vitale et al. |
| 5,047,617 A | 9/1991 | Bianco |
| 5,057,915 A | 10/1991 | Kohrn et al. |
| 5,072,452 A | 12/1991 | Brown et al. |
| 5,091,945 A | 2/1992 | Kleijn |
| 5,127,053 A | 6/1992 | Koch |
| 5,127,055 A | 6/1992 | Larkey |
| 5,128,672 A | 7/1992 | Kaehler |
| 5,133,011 A | 7/1992 | McKiel, Jr. |
| 5,142,584 A | 8/1992 | Ozawa |
| 5,164,900 A | 11/1992 | Bernath |
| 5,165,007 A | 11/1992 | Bahl et al. |
| 5,179,652 A | 1/1993 | Rozmanith et al. |
| 5,194,950 A | 3/1993 | Murakami et al. |
| 5,197,005 A | 3/1993 | Shwartz et al. |
| 5,199,077 A | 3/1993 | Wilcox et al. |
| 5,202,952 A | 4/1993 | Gillick et al. |
| 5,208,862 A | 5/1993 | Ozawa |
| 5,216,747 A | 6/1993 | Hardwick et al. |
| 5,220,639 A | 6/1993 | Lee |
| 5,220,657 A | 6/1993 | Bly et al. |
| 5,222,146 A | 6/1993 | Bahl et al. |
| 5,230,036 A | 7/1993 | Akamine et al. |
| 5,235,680 A | 8/1993 | Bijnagte |
| 5,267,345 A | 11/1993 | Brown et al. |
| 5,268,990 A | 12/1993 | Cohen et al. |
| 5,282,265 A | 1/1994 | Rohra Suda et al. |
| RE34,562 E | 3/1994 | Murakami et al. |
| 5,291,286 A | 3/1994 | Murakami et al. |
| 5,293,448 A | 3/1994 | Honda |
| 5,293,452 A | 3/1994 | Picone et al. |
| 5,297,170 A | 3/1994 | Eyuboglu et al. |
| 5,301,109 A | 4/1994 | Landauer et al. |
| 5,303,406 A | 4/1994 | Hansen et al. |
| 5,309,359 A | 5/1994 | Katz et al. |
| 5,317,507 A | 5/1994 | Gallant |
| 5,317,647 A | 5/1994 | Pagallo |
| 5,325,297 A | 6/1994 | Bird et al. |
| 5,325,298 A | 6/1994 | Gallant |
| 5,327,498 A | 7/1994 | Hamon |
| 5,333,236 A | 7/1994 | Bahl et al. |
| 5,333,275 A | 7/1994 | Wheatley et al. |
| 5,345,536 A | 9/1994 | Hoshimi et al. |
| 5,349,645 A | 9/1994 | Zhao |
| 5,353,377 A | 10/1994 | Kuroda et al. |
| 5,377,301 A | 12/1994 | Rosenberg et al. |
| 5,384,892 A | 1/1995 | Strong |
| 5,384,893 A | 1/1995 | Hutchins |
| 5,386,494 A | 1/1995 | White |
| 5,386,556 A | 1/1995 | Hedin et al. |
| 5,390,279 A | 2/1995 | Strong |
| 5,396,625 A | 3/1995 | Parkes |
| 5,400,434 A | 3/1995 | Pearson |
| 5,404,295 A | 4/1995 | Katz et al. |
| 5,412,756 A | 5/1995 | Bauman et al. |
| 5,412,804 A | 5/1995 | Krishna |
| 5,412,806 A | 5/1995 | Du et al. |
| 5,418,951 A | 5/1995 | Damashek |
| 5,424,947 A | 6/1995 | Nagao et al. |
| 5,434,777 A | 7/1995 | Luciw |
| 5,444,823 A | 8/1995 | Nguyen |
| 5,455,888 A | 10/1995 | Iyengar et al. |
| 5,469,529 A | 11/1995 | Bimbot et al. |
| 5,471,611 A | 11/1995 | McGregor |
| 5,475,587 A | 12/1995 | Anick et al. |
| 5,479,488 A | 12/1995 | Lennig et al. |
| 5,491,772 A | 2/1996 | Hardwick et al. |
| 5,493,677 A | 2/1996 | Balogh |
| 5,495,604 A | 2/1996 | Harding et al. |
| 5,502,790 A | 3/1996 | Yi |
| 5,502,791 A | 3/1996 | Nishimura et al. |
| 5,515,475 A | 5/1996 | Gupta et al. |
| 5,536,902 A | 7/1996 | Serra et al. |
| 5,537,618 A | 7/1996 | Boulton et al. |
| 5,574,823 A | 11/1996 | Hassanein et al. |
| 5,577,241 A | 11/1996 | Spencer |
| 5,578,808 A | 11/1996 | Taylor |
| 5,579,436 A | 11/1996 | Chou et al. |
| 5,581,655 A | 12/1996 | Cohen et al. |
| 5,584,024 A | 12/1996 | Shwartz |
| 5,596,676 A | 1/1997 | Swaminathan et al. |
| 5,596,994 A | 1/1997 | Bro |
| 5,608,624 A | 3/1997 | Luciw |
| 5,613,036 A | 3/1997 | Strong |
| 5,617,507 A | 4/1997 | Lee et al. |
| 5,619,694 A | 4/1997 | Shimazu |
| 5,621,859 A | 4/1997 | Schwartz et al. |
| 5,621,903 A | 4/1997 | Luciw et al. |
| 5,642,464 A | 6/1997 | Yue et al. |
| 5,642,519 A | 6/1997 | Martin |
| 5,644,727 A | 7/1997 | Atkins |
| 5,664,055 A | 9/1997 | Kroon |
| 5,675,819 A | 10/1997 | Schuetze |
| 5,682,539 A | 10/1997 | Conrad et al. |
| 5,687,077 A | 11/1997 | Gough, Jr. |
| 5,696,962 A | 12/1997 | Kupiec |
| 5,701,400 A | 12/1997 | Amado |
| 5,706,442 A | 1/1998 | Anderson et al. |
| 5,710,886 A | 1/1998 | Christensen et al. |
| 5,712,957 A | 1/1998 | Waibel et al. |
| 5,715,468 A | 2/1998 | Budzinski |
| 5,721,827 A | 2/1998 | Logan et al. |
| 5,727,950 A | 3/1998 | Cook et al. |
| 5,729,694 A | 3/1998 | Holzrichter et al. |
| 5,732,390 A | 3/1998 | Katayanagi et al. |
| 5,734,791 A | 3/1998 | Acero et al. |
| 5,737,734 A | 4/1998 | Schultz |
| 5,748,974 A | 5/1998 | Johnson |
| 5,749,081 A | 5/1998 | Whiteis |
| 5,759,101 A | 6/1998 | Von Kohorn |
| 5,790,978 A | 8/1998 | Olive et al. |
| 5,794,050 A | 8/1998 | Dahlgren et al. |
| 5,794,182 A | 8/1998 | Manduchi et al. |
| 5,794,207 A | 8/1998 | Walker et al. |
| 5,794,237 A | 8/1998 | Gore, Jr. |
| 5,799,276 A | 8/1998 | Komissarchik et al. |
| 5,822,743 A | 10/1998 | Gupta et al. |
| 5,825,881 A | 10/1998 | Colvin, Sr. |
| 5,826,261 A | 10/1998 | Spencer |
| 5,828,999 A | 10/1998 | Bellegarda et al. |
| 5,835,893 A | 11/1998 | Ushioda |
| 5,839,106 A | 11/1998 | Bellegarda |
| 5,845,255 A | 12/1998 | Mayaud |
| 5,857,184 A | 1/1999 | Lynch |
| 5,860,063 A | 1/1999 | Gorin et al. |
| 5,862,233 A | 1/1999 | Walker et al. |

(56) References Cited

U.S. PATENT DOCUMENTS

| | | |
|---|---|---|
| 5,864,806 A | 1/1999 | Mokbel et al. |
| 5,864,844 A | 1/1999 | James et al. |
| 5,867,799 A | 2/1999 | Lang et al. |
| 5,873,056 A | 2/1999 | Liddy et al. |
| 5,875,437 A | 2/1999 | Atkins |
| 5,884,323 A | 3/1999 | Hawkins et al. |
| 5,895,464 A | 4/1999 | Bhandari et al. |
| 5,895,466 A | 4/1999 | Goldberg et al. |
| 5,899,972 A | 5/1999 | Miyazawa et al. |
| 5,913,193 A | 6/1999 | Huang et al. |
| 5,915,249 A | 6/1999 | Spencer |
| 5,930,769 A | 7/1999 | Rose |
| 5,933,822 A | 8/1999 | Braden-Harder et al. |
| 5,936,926 A | 8/1999 | Yokouchi et al. |
| 5,940,811 A | 8/1999 | Norris |
| 5,941,944 A | 8/1999 | Messerly |
| 5,943,670 A | 8/1999 | Prager |
| 5,948,040 A | 9/1999 | DeLorme et al. |
| 5,956,699 A | 9/1999 | Wong et al. |
| 5,960,422 A | 9/1999 | Prasad |
| 5,963,924 A | 10/1999 | Williams et al. |
| 5,966,126 A | 10/1999 | Szabo |
| 5,970,474 A | 10/1999 | LeRoy et al. |
| 5,974,146 A | 10/1999 | Randle et al. |
| 5,982,891 A | 11/1999 | Ginter et al. |
| 5,987,132 A | 11/1999 | Rowney |
| 5,987,140 A | 11/1999 | Rowney et al. |
| 5,987,404 A | 11/1999 | Della Pietra et al. |
| 5,987,440 A | 11/1999 | O'Neil et al. |
| 5,999,908 A | 12/1999 | Abelow |
| 6,016,471 A | 1/2000 | Kuhn et al. |
| 6,023,684 A | 2/2000 | Pearson |
| 6,024,288 A | 2/2000 | Gottlich et al. |
| 6,026,345 A | 2/2000 | Shah et al. |
| 6,026,375 A | 2/2000 | Hall et al. |
| 6,026,388 A | 2/2000 | Liddy et al. |
| 6,026,393 A | 2/2000 | Gupta et al. |
| 6,029,132 A | 2/2000 | Kuhn et al. |
| 6,038,533 A | 3/2000 | Buchsbaum et al. |
| 6,052,656 A | 4/2000 | Suda et al. |
| 6,055,514 A | 4/2000 | Wren |
| 6,055,531 A | 4/2000 | Bennett et al. |
| 6,064,960 A | 5/2000 | Bellegarda et al. |
| 6,070,139 A | 5/2000 | Miyazawa et al. |
| 6,070,147 A | 5/2000 | Harms et al. |
| 6,076,051 A | 6/2000 | Messerly et al. |
| 6,076,088 A | 6/2000 | Paik et al. |
| 6,078,914 A | 6/2000 | Redfern |
| 6,081,750 A | 6/2000 | Hoffberg et al. |
| 6,081,774 A | 6/2000 | de Hita et al. |
| 6,088,731 A | 7/2000 | Kiraly et al. |
| 6,094,649 A | 7/2000 | Bowen et al. |
| 6,105,865 A | 8/2000 | Hardesty |
| 6,108,627 A | 8/2000 | Sabourin |
| 6,119,101 A | 9/2000 | Peckover |
| 6,122,616 A | 9/2000 | Henton |
| 6,125,356 A | 9/2000 | Brockman et al. |
| 6,144,938 A | 11/2000 | Surace et al. |
| 6,173,261 B1 | 1/2001 | Arai et al. |
| 6,173,279 B1 | 1/2001 | Levin et al. |
| 6,188,999 B1 | 2/2001 | Moody |
| 6,195,641 B1 | 2/2001 | Loring et al. |
| 6,205,456 B1 | 3/2001 | Nakao |
| 6,208,971 B1 | 3/2001 | Bellegarda et al. |
| 6,233,559 B1 | 5/2001 | Balakrishnan |
| 6,233,578 B1 | 5/2001 | Machihara et al. |
| 6,246,981 B1 | 6/2001 | Papineni et al. |
| 6,260,024 B1 | 7/2001 | Shkedy |
| 6,266,637 B1 | 7/2001 | Donovan et al. |
| 6,275,824 B1 | 8/2001 | O'Flaherty et al. |
| 6,285,786 B1 | 9/2001 | Seni et al. |
| 6,308,149 B1 | 10/2001 | Gaussier et al. |
| 6,311,189 B1 | 10/2001 | deVries et al. |
| 6,317,594 B1 | 11/2001 | Gossman et al. |
| 6,317,707 B1 | 11/2001 | Bangalore et al. |
| 6,317,831 B1 | 11/2001 | King |
| 6,321,092 B1 | 11/2001 | Fitch et al. |
| 6,334,103 B1 | 12/2001 | Surace et al. |
| 6,356,854 B1 | 3/2002 | Schubert et al. |
| 6,356,905 B1 | 3/2002 | Gershman et al. |
| 6,363,348 B1 * | 3/2002 | Besling et al. ............. 704/270.1 |
| 6,366,883 B1 | 4/2002 | Campbell et al. |
| 6,366,884 B1 | 4/2002 | Belllegarda et al. |
| 6,421,672 B1 | 7/2002 | McAllister et al. |
| 6,434,524 B1 | 8/2002 | Weber |
| 6,446,076 B1 | 9/2002 | Burkey et al. |
| 6,449,620 B1 | 9/2002 | Draper et al. |
| 6,453,292 B2 | 9/2002 | Ramaswamy et al. |
| 6,460,029 B1 | 10/2002 | Fries et al. |
| 6,466,654 B1 | 10/2002 | Cooper et al. |
| 6,477,488 B1 | 11/2002 | Bellegarda |
| 6,487,534 B1 | 11/2002 | Thelen et al. |
| 6,499,013 B1 | 12/2002 | Weber |
| 6,501,937 B1 | 12/2002 | Ho et al. |
| 6,505,158 B1 | 1/2003 | Conkie |
| 6,505,175 B1 | 1/2003 | Silverman et al. |
| 6,505,183 B1 | 1/2003 | Loofbourrow et al. |
| 6,510,417 B1 | 1/2003 | Woods et al. |
| 6,513,063 B1 | 1/2003 | Julia et al. |
| 6,523,061 B1 | 2/2003 | Halverson et al. |
| 6,523,172 B1 | 2/2003 | Martinez-Guerra et al. |
| 6,526,382 B1 | 2/2003 | Yuschik |
| 6,526,395 B1 | 2/2003 | Morris |
| 6,532,444 B1 | 3/2003 | Weber |
| 6,532,446 B1 | 3/2003 | King |
| 6,546,388 B1 | 4/2003 | Edlund et al. |
| 6,553,344 B2 | 4/2003 | Bellegarda et al. |
| 6,556,983 B1 | 4/2003 | Altschuler et al. |
| 6,584,464 B1 | 6/2003 | Warthen |
| 6,598,039 B1 | 7/2003 | Livowsky |
| 6,601,026 B2 | 7/2003 | Appelt et al. |
| 6,601,234 B1 | 7/2003 | Bowman-Amuah |
| 6,604,059 B2 | 8/2003 | Strubbe et al. |
| 6,615,172 B1 | 9/2003 | Bennett et al. |
| 6,615,175 B1 | 9/2003 | Gazdzinski |
| 6,615,220 B1 | 9/2003 | Austin et al. |
| 6,625,583 B1 | 9/2003 | Silverman et al. |
| 6,631,346 B1 | 10/2003 | Karaorman et al. |
| 6,633,846 B1 | 10/2003 | Bennett et al. |
| 6,647,260 B2 | 11/2003 | Dusse et al. |
| 6,650,735 B2 | 11/2003 | Burton et al. |
| 6,654,740 B2 | 11/2003 | Tokuda et al. |
| 6,665,639 B2 | 12/2003 | Mozer et al. |
| 6,665,640 B1 | 12/2003 | Bennett et al. |
| 6,665,641 B1 | 12/2003 | Coorman et al. |
| 6,684,187 B1 | 1/2004 | Conkie |
| 6,691,064 B2 | 2/2004 | Vroman |
| 6,691,111 B2 | 2/2004 | Lazaridis et al. |
| 6,691,151 B1 | 2/2004 | Cheyer et al. |
| 6,697,780 B1 | 2/2004 | Beutnagel et al. |
| 6,697,824 B1 | 2/2004 | Bowman-Amuah |
| 6,701,294 B1 | 3/2004 | Ball et al. |
| 6,711,585 B1 | 3/2004 | Copperman et al. |
| 6,718,324 B2 | 4/2004 | Edlund et al. |
| 6,721,728 B2 | 4/2004 | McGreevy |
| 6,735,632 B1 | 5/2004 | Kiraly et al. |
| 6,742,021 B1 | 5/2004 | Halverson et al. |
| 6,757,362 B1 | 6/2004 | Cooper et al. |
| 6,757,718 B1 | 6/2004 | Halverson et al. |
| 6,766,320 B1 | 7/2004 | Wang et al. |
| 6,778,951 B1 | 8/2004 | Contractor |
| 6,778,952 B2 | 8/2004 | Bellegarda |
| 6,778,962 B1 | 8/2004 | Kasai et al. |
| 6,778,970 B2 | 8/2004 | Au |
| 6,792,082 B1 | 9/2004 | Levine |
| 6,807,574 B1 | 10/2004 | Partovi et al. |
| 6,810,379 B1 | 10/2004 | Vermeulen et al. |
| 6,813,491 B1 | 11/2004 | McKinney |
| 6,829,603 B1 | 12/2004 | Chai et al. |
| 6,832,194 B1 | 12/2004 | Mozer et al. |
| 6,842,767 B1 | 1/2005 | Partovi et al. |
| 6,847,966 B1 | 1/2005 | Sommer et al. |
| 6,847,979 B2 | 1/2005 | Allemang et al. |
| 6,851,115 B1 | 2/2005 | Cheyer et al. |

(56) References Cited

U.S. PATENT DOCUMENTS

| | | | |
|---|---|---|---|
| 6,859,931 B1 | 2/2005 | Cheyer et al. | |
| 6,895,380 B2 | 5/2005 | Sepe, Jr. | |
| 6,895,558 B1 | 5/2005 | Loveland | |
| 6,901,399 B1 | 5/2005 | Corston et al. | |
| 6,912,499 B1 | 6/2005 | Sabourin et al. | |
| 6,924,828 B1 | 8/2005 | Hirsch | |
| 6,928,614 B1 | 8/2005 | Everhart | |
| 6,931,384 B1 | 8/2005 | Horvitz et al. | |
| 6,937,975 B1 | 8/2005 | Elworthy | |
| 6,937,986 B2 | 8/2005 | Denenberg et al. | |
| 6,957,183 B2 * | 10/2005 | Malayath et al. | 704/246 |
| 6,964,023 B2 | 11/2005 | Maes et al. | |
| 6,980,949 B2 | 12/2005 | Ford | |
| 6,980,955 B2 | 12/2005 | Okutani et al. | |
| 6,985,865 B1 | 1/2006 | Packingham et al. | |
| 6,988,071 B1 | 1/2006 | Gazdzinski | |
| 6,996,531 B2 | 2/2006 | Korall et al. | |
| 6,999,925 B2 * | 2/2006 | Fischer et al. | 704/243 |
| 6,999,927 B2 | 2/2006 | Mozer et al. | |
| 7,006,969 B2 * | 2/2006 | Atal | 704/238 |
| 7,020,685 B1 | 3/2006 | Chen et al. | |
| 7,027,974 B1 | 4/2006 | Busch et al. | |
| 7,036,128 B1 | 4/2006 | Julia et al. | |
| 7,050,550 B2 * | 5/2006 | Steinbiss et al. | 379/88.01 |
| 7,050,977 B1 | 5/2006 | Bennett | |
| 7,058,569 B2 | 6/2006 | Coorman et al. | |
| 7,062,428 B2 | 6/2006 | Hogenhout et al. | |
| 7,069,560 B1 | 6/2006 | Cheyer et al. | |
| 7,092,887 B2 | 8/2006 | Mozer et al. | |
| 7,092,928 B1 | 8/2006 | Elad et al. | |
| 7,093,693 B1 | 8/2006 | Gazdzinski | |
| 7,124,081 B1 * | 10/2006 | Bellegarda | 704/255 |
| 7,127,046 B1 | 10/2006 | Smith et al. | |
| 7,127,403 B1 | 10/2006 | Saylor et al. | |
| 7,136,710 B1 | 11/2006 | Hoffberg et al. | |
| 7,137,126 B1 | 11/2006 | Coffman et al. | |
| 7,139,714 B2 | 11/2006 | Bennett et al. | |
| 7,139,722 B2 | 11/2006 | Perrella et al. | |
| 7,152,070 B1 | 12/2006 | Musick et al. | |
| 7,174,298 B2 * | 2/2007 | Sharma | 704/270.1 |
| 7,177,798 B2 | 2/2007 | Hsu et al. | |
| 7,197,460 B1 | 3/2007 | Gupta et al. | |
| 7,200,559 B2 | 4/2007 | Wang | |
| 7,203,646 B2 | 4/2007 | Bennett | |
| 7,216,073 B2 | 5/2007 | Lavi et al. | |
| 7,216,080 B2 | 5/2007 | Tsiao et al. | |
| 7,225,125 B2 | 5/2007 | Bennett et al. | |
| 7,233,790 B2 | 6/2007 | Kjellberg et al. | |
| 7,233,904 B2 | 6/2007 | Luisi | |
| 7,266,496 B2 | 9/2007 | Wang et al. | |
| 7,277,854 B2 | 10/2007 | Bennett et al. | |
| 7,290,039 B1 | 10/2007 | Lisitsa et al. | |
| 7,299,033 B2 | 11/2007 | Kjellberg et al. | |
| 7,308,404 B2 * | 12/2007 | Venkataraman et al. | 704/255 |
| 7,310,600 B1 | 12/2007 | Garner et al. | |
| 7,324,947 B2 | 1/2008 | Jordan et al. | |
| 7,349,953 B2 | 3/2008 | Lisitsa et al. | |
| 7,376,556 B2 | 5/2008 | Bennett | |
| 7,376,645 B2 | 5/2008 | Bernard | |
| 7,379,874 B2 | 5/2008 | Schmid et al. | |
| 7,386,449 B2 | 6/2008 | Sun et al. | |
| 7,389,224 B1 | 6/2008 | Elworthy | |
| 7,392,185 B2 | 6/2008 | Bennett | |
| 7,398,209 B2 | 7/2008 | Kennewick et al. | |
| 7,403,938 B2 | 7/2008 | Harrison et al. | |
| 7,409,337 B1 | 8/2008 | Potter et al. | |
| 7,415,100 B2 | 8/2008 | Cooper et al. | |
| 7,418,392 B1 | 8/2008 | Mozer et al. | |
| 7,426,467 B2 | 9/2008 | Nashida et al. | |
| 7,427,024 B1 | 9/2008 | Gazdzinski et al. | |
| 7,447,635 B1 | 11/2008 | Konopka et al. | |
| 7,454,351 B2 | 11/2008 | Jeschke et al. | |
| 7,467,087 B1 | 12/2008 | Gillick et al. | |
| 7,475,010 B2 | 1/2009 | Chao | |
| 7,483,894 B2 | 1/2009 | Cao | |
| 7,487,089 B2 | 2/2009 | Mozer | |
| 7,496,498 B2 | 2/2009 | Chu et al. | |
| 7,496,512 B2 | 2/2009 | Zhao et al. | |
| 7,502,738 B2 | 3/2009 | Kennewick et al. | |
| 7,508,373 B2 | 3/2009 | Lin et al. | |
| 7,522,927 B2 | 4/2009 | Fitch et al. | |
| 7,523,108 B2 | 4/2009 | Cao | |
| 7,526,466 B2 | 4/2009 | Au | |
| 7,529,671 B2 | 5/2009 | Rockenbeck et al. | |
| 7,529,676 B2 | 5/2009 | Koyama | |
| 7,539,656 B2 | 5/2009 | Fratkina et al. | |
| 7,546,382 B2 | 6/2009 | Healey et al. | |
| 7,548,895 B2 | 6/2009 | Pulsipher | |
| 7,552,055 B2 | 6/2009 | Lecoeuche | |
| 7,555,431 B2 | 6/2009 | Bennett | |
| 7,558,730 B2 | 7/2009 | Davis et al. | |
| 7,571,106 B2 | 8/2009 | Cao et al. | |
| 7,599,918 B2 | 10/2009 | Shen et al. | |
| 7,620,549 B2 | 11/2009 | Di Cristo et al. | |
| 7,624,007 B2 | 11/2009 | Bennett | |
| 7,634,409 B2 | 12/2009 | Kennewick et al. | |
| 7,636,657 B2 | 12/2009 | Ju et al. | |
| 7,640,160 B2 | 12/2009 | Di Cristo et al. | |
| 7,647,225 B2 | 1/2010 | Bennett et al. | |
| 7,657,424 B2 | 2/2010 | Bennett | |
| 7,672,841 B2 | 3/2010 | Bennett | |
| 7,676,026 B1 | 3/2010 | Baxter, Jr. | |
| 7,684,985 B2 | 3/2010 | Dominach et al. | |
| 7,693,715 B2 | 4/2010 | Hwang et al. | |
| 7,693,720 B2 | 4/2010 | Kennewick et al. | |
| 7,698,131 B2 | 4/2010 | Bennett | |
| 7,702,500 B2 | 4/2010 | Blaedow | |
| 7,702,508 B2 | 4/2010 | Bennett | |
| 7,707,027 B2 | 4/2010 | Balchandran et al. | |
| 7,707,032 B2 | 4/2010 | Wang et al. | |
| 7,707,267 B2 | 4/2010 | Lisitsa et al. | |
| 7,711,565 B1 | 5/2010 | Gazdzinski | |
| 7,711,672 B2 | 5/2010 | Au | |
| 7,716,056 B2 | 5/2010 | Weng et al. | |
| 7,720,674 B2 | 5/2010 | Kaiser et al. | |
| 7,720,683 B1 | 5/2010 | Vermeulen et al. | |
| 7,725,307 B2 | 5/2010 | Bennett | |
| 7,725,318 B2 | 5/2010 | Gavalda et al. | |
| 7,725,320 B2 | 5/2010 | Bennett | |
| 7,725,321 B2 | 5/2010 | Bennett | |
| 7,729,904 B2 | 6/2010 | Bennett | |
| 7,729,916 B2 | 6/2010 | Coffman et al. | |
| 7,734,461 B2 | 6/2010 | Kwak et al. | |
| 7,747,616 B2 | 6/2010 | Yamada et al. | |
| 7,752,152 B2 | 7/2010 | Paek et al. | |
| 7,756,868 B2 | 7/2010 | Lee | |
| 7,774,204 B2 | 8/2010 | Mozer et al. | |
| 7,783,486 B2 | 8/2010 | Rosser et al. | |
| 7,801,729 B2 | 9/2010 | Mozer | |
| 7,809,570 B2 | 10/2010 | Kennewick et al. | |
| 7,809,610 B2 | 10/2010 | Cao | |
| 7,818,176 B2 | 10/2010 | Freeman et al. | |
| 7,822,608 B2 | 10/2010 | Cross, Jr. et al. | |
| 7,826,945 B2 | 11/2010 | Zhang et al. | |
| 7,831,426 B2 | 11/2010 | Bennett | |
| 7,840,400 B2 | 11/2010 | Lavi et al. | |
| 7,840,447 B2 | 11/2010 | Kleinrock et al. | |
| 7,853,574 B2 | 12/2010 | Kraenzel et al. | |
| 7,873,519 B2 | 1/2011 | Bennett | |
| 7,873,654 B2 | 1/2011 | Bernard | |
| 7,881,936 B2 | 2/2011 | Longé et al. | |
| 7,890,652 B2 | 2/2011 | Bull et al. | |
| 7,912,702 B2 | 3/2011 | Bennett | |
| 7,917,367 B2 | 3/2011 | Di Cristo et al. | |
| 7,917,497 B2 | 3/2011 | Harrison et al. | |
| 7,920,678 B2 | 4/2011 | Cooper et al. | |
| 7,925,525 B2 | 4/2011 | Chin | |
| 7,930,168 B2 | 4/2011 | Weng et al. | |
| 7,949,529 B2 | 5/2011 | Weider et al. | |
| 7,949,534 B2 | 5/2011 | Davis et al. | |
| 7,974,844 B2 | 7/2011 | Sumita | |
| 7,974,972 B2 | 7/2011 | Cao | |
| 7,983,915 B2 | 7/2011 | Knight et al. | |
| 7,983,917 B2 | 7/2011 | Kennewick et al. | |

(56) References Cited

U.S. PATENT DOCUMENTS

| | | | |
|---|---|---|---|
| 7,983,997 | B2 | 7/2011 | Allen et al. |
| 7,986,431 | B2 | 7/2011 | Emori et al. |
| 7,987,151 | B2 | 7/2011 | Schott et al. |
| 7,996,228 | B2 | 8/2011 | Miller et al. |
| 8,000,453 | B2 | 8/2011 | Cooper et al. |
| 8,005,679 | B2 | 8/2011 | Jordan et al. |
| 8,015,006 | B2 | 9/2011 | Kennewick et al. |
| 8,024,195 | B2 | 9/2011 | Mozer et al. |
| 8,036,901 | B2 | 10/2011 | Mozer |
| 8,041,570 | B2 | 10/2011 | Mirkovic et al. |
| 8,041,611 | B2 | 10/2011 | Kleinrock et al. |
| 8,055,708 | B2 | 11/2011 | Chitsaz et al. |
| 8,065,155 | B1 | 11/2011 | Gazdzinski |
| 8,065,156 | B2 | 11/2011 | Gazdzinski |
| 8,069,046 | B2 | 11/2011 | Kennewick et al. |
| 8,073,681 | B2 | 12/2011 | Baldwin et al. |
| 8,078,473 | B1 | 12/2011 | Gazdzinski |
| 8,082,153 | B2 | 12/2011 | Coffman et al. |
| 8,095,364 | B2 | 1/2012 | Longé et al. |
| 8,099,289 | B2 | 1/2012 | Mozer et al. |
| 8,107,401 | B2 | 1/2012 | John et al. |
| 8,112,275 | B2 | 2/2012 | Kennewick et al. |
| 8,112,280 | B2 | 2/2012 | Lu |
| 8,117,037 | B2 | 2/2012 | Gazdzinski |
| 8,131,557 | B2 | 3/2012 | Davis et al. |
| 8,140,335 | B2 | 3/2012 | Kennewick et al. |
| 8,165,886 | B1 | 4/2012 | Gagnon et al. |
| 8,166,019 | B1 | 4/2012 | Lee et al. |
| 8,190,359 | B2 | 5/2012 | Bourne |
| 8,195,467 | B2 | 6/2012 | Mozer et al. |
| 8,204,238 | B2 | 6/2012 | Mozer |
| 8,205,788 | B1 | 6/2012 | Gazdzinski et al. |
| 8,219,407 | B1 | 7/2012 | Roy et al. |
| 8,285,551 | B2 | 10/2012 | Gazdzinski |
| 8,285,553 | B2 | 10/2012 | Gazdzinski |
| 8,290,778 | B2 | 10/2012 | Gazdzinski |
| 8,290,781 | B2 | 10/2012 | Gazdzinski |
| 8,296,146 | B2 | 10/2012 | Gazdzinski |
| 8,296,153 | B2 | 10/2012 | Gazdzinski |
| 8,301,456 | B2 | 10/2012 | Gazdzinski |
| 8,311,834 | B1 | 11/2012 | Gazdzinski |
| 8,370,158 | B2 | 2/2013 | Gazdzinski |
| 8,371,503 | B2 | 2/2013 | Gazdzinski |
| 8,374,871 | B2 | 2/2013 | Ehsani et al. |
| 8,447,612 | B2 | 5/2013 | Gazdzinski |
| 8,583,416 | B2 * | 11/2013 | Huang et al. ............ 704/3 |
| 2001/0047264 | A1 | 11/2001 | Roundtree |
| 2002/0032564 | A1 | 3/2002 | Ehsani et al. |
| 2002/0046025 | A1 | 4/2002 | Hain |
| 2002/0069063 | A1 | 6/2002 | Buchner et al. |
| 2002/0077817 | A1 | 6/2002 | Atal |
| 2002/0103641 | A1 | 8/2002 | Kuo et al. |
| 2002/0164000 | A1 | 11/2002 | Cohen et al. |
| 2002/0198714 | A1 | 12/2002 | Zhou |
| 2003/0182115 | A1* | 9/2003 | Malayath et al. ............ 704/236 |
| 2004/0135701 | A1 | 7/2004 | Yasuda et al. |
| 2004/0236778 | A1 | 11/2004 | Junqua et al. |
| 2004/0243412 | A1* | 12/2004 | Gupta et al. ............ 704/254 |
| 2005/0055403 | A1 | 3/2005 | Brittan |
| 2005/0071332 | A1 | 3/2005 | Ortega et al. |
| 2005/0080625 | A1 | 4/2005 | Bennett et al. |
| 2005/0091118 | A1 | 4/2005 | Fano |
| 2005/0102614 | A1 | 5/2005 | Brockett et al. |
| 2005/0108001 | A1 | 5/2005 | Aarskog |
| 2005/0114124 | A1 | 5/2005 | Liu et al. |
| 2005/0119897 | A1 | 6/2005 | Bennett et al. |
| 2005/0143972 | A1 | 6/2005 | Gopalakrishnan et al. |
| 2005/0165607 | A1 | 7/2005 | DiFabbrizio et al. |
| 2005/0182629 | A1 | 8/2005 | Coorman et al. |
| 2005/0196733 | A1 | 9/2005 | Budra et al. |
| 2005/0288936 | A1 | 12/2005 | Busayapongchai et al. |
| 2006/0015341 | A1* | 1/2006 | Baker ............ 704/255 |
| 2006/0018492 | A1 | 1/2006 | Chiu et al. |
| 2006/0058999 | A1* | 3/2006 | Barker et al. ............ 704/256 |
| 2006/0106592 | A1 | 5/2006 | Brockett et al. |
| 2006/0106594 | A1 | 5/2006 | Brockett et al. |
| 2006/0106595 | A1 | 5/2006 | Brockett et al. |
| 2006/0117002 | A1 | 6/2006 | Swen |
| 2006/0122834 | A1 | 6/2006 | Bennett |
| 2006/0143007 | A1 | 6/2006 | Koh et al. |
| 2007/0055529 | A1 | 3/2007 | Kanevsky et al. |
| 2007/0058832 | A1 | 3/2007 | Hug et al. |
| 2007/0088556 | A1 | 4/2007 | Andrew |
| 2007/0100790 | A1 | 5/2007 | Cheyer et al. |
| 2007/0106674 | A1 | 5/2007 | Agrawal et al. |
| 2007/0118377 | A1 | 5/2007 | Badino et al. |
| 2007/0135949 | A1 | 6/2007 | Snover et al. |
| 2007/0174188 | A1 | 7/2007 | Fish |
| 2007/0179778 | A1* | 8/2007 | Gong et al. ............ 704/9 |
| 2007/0185917 | A1 | 8/2007 | Prahlad et al. |
| 2007/0282595 | A1 | 12/2007 | Tunning et al. |
| 2008/0015864 | A1 | 1/2008 | Ross et al. |
| 2008/0021708 | A1 | 1/2008 | Bennett et al. |
| 2008/0034032 | A1 | 2/2008 | Healey et al. |
| 2008/0052063 | A1 | 2/2008 | Bennett et al. |
| 2008/0120112 | A1 | 5/2008 | Jordan et al. |
| 2008/0129520 | A1 | 6/2008 | Lee |
| 2008/0140657 | A1 | 6/2008 | Azvine et al. |
| 2008/0221903 | A1 | 9/2008 | Kanevsky et al. |
| 2008/0228496 | A1 | 9/2008 | Yu et al. |
| 2008/0247519 | A1 | 10/2008 | Abella et al. |
| 2008/0249770 | A1 | 10/2008 | Kim et al. |
| 2008/0300878 | A1 | 12/2008 | Bennett |
| 2008/0319763 | A1 | 12/2008 | Di Fabbrizio et al. |
| 2009/0006100 | A1 | 1/2009 | Badger et al. |
| 2009/0006343 | A1 | 1/2009 | Platt et al. |
| 2009/0030800 | A1 | 1/2009 | Grois |
| 2009/0055179 | A1 | 2/2009 | Cho et al. |
| 2009/0058823 | A1 | 3/2009 | Kocienda |
| 2009/0076796 | A1 | 3/2009 | Daraselia |
| 2009/0077165 | A1 | 3/2009 | Rhodes et al. |
| 2009/0100049 | A1 | 4/2009 | Cao |
| 2009/0112677 | A1 | 4/2009 | Rhett |
| 2009/0150156 | A1 | 6/2009 | Kennewick et al. |
| 2009/0157401 | A1 | 6/2009 | Bennett |
| 2009/0164441 | A1 | 6/2009 | Cheyer |
| 2009/0171664 | A1 | 7/2009 | Kennewick et al. |
| 2009/0287583 | A1 | 11/2009 | Holmes |
| 2009/0290718 | A1 | 11/2009 | Kahn et al. |
| 2009/0299745 | A1 | 12/2009 | Kennewick et al. |
| 2009/0299849 | A1 | 12/2009 | Cao et al. |
| 2009/0307162 | A1 | 12/2009 | Bui et al. |
| 2010/0005081 | A1 | 1/2010 | Bennett |
| 2010/0023320 | A1 | 1/2010 | Di Cristo et al. |
| 2010/0036660 | A1 | 2/2010 | Bennett |
| 2010/0042400 | A1 | 2/2010 | Block et al. |
| 2010/0088020 | A1 | 4/2010 | Sano et al. |
| 2010/0138215 | A1 | 6/2010 | Williams |
| 2010/0145700 | A1 | 6/2010 | Kennewick et al. |
| 2010/0204986 | A1 | 8/2010 | Kennewick et al. |
| 2010/0217604 | A1 | 8/2010 | Baldwin et al. |
| 2010/0228540 | A1 | 9/2010 | Bennett |
| 2010/0235341 | A1 | 9/2010 | Bennett |
| 2010/0257160 | A1 | 10/2010 | Cao |
| 2010/0262599 | A1 | 10/2010 | Nitz |
| 2010/0277579 | A1 | 11/2010 | Cho et al. |
| 2010/0280983 | A1 | 11/2010 | Cho et al. |
| 2010/0286985 | A1 | 11/2010 | Kennewick et al. |
| 2010/0299142 | A1 | 11/2010 | Freeman et al. |
| 2010/0312547 | A1 | 12/2010 | van Os et al. |
| 2010/0318576 | A1 | 12/2010 | Kim |
| 2010/0332235 | A1 | 12/2010 | David |
| 2010/0332348 | A1 | 12/2010 | Cao |
| 2011/0047072 | A1 | 2/2011 | Ciurea |
| 2011/0060807 | A1 | 3/2011 | Martin et al. |
| 2011/0082688 | A1 | 4/2011 | Kim et al. |
| 2011/0112827 | A1 | 5/2011 | Kennewick et al. |
| 2011/0112921 | A1 | 5/2011 | Kennewick et al. |
| 2011/0119049 | A1 | 5/2011 | Ylonen |
| 2011/0125540 | A1 | 5/2011 | Jang et al. |
| 2011/0130958 | A1 | 6/2011 | Stahl et al. |
| 2011/0131036 | A1 | 6/2011 | Di Cristo et al. |
| 2011/0131045 | A1 | 6/2011 | Cristo et al. |
| 2011/0143811 | A1 | 6/2011 | Rodriguez |

(56) References Cited

U.S. PATENT DOCUMENTS

| | | |
|---|---|---|
| 2011/0144999 A1 | 6/2011 | Jang et al. |
| 2011/0161076 A1 | 6/2011 | Davis et al. |
| 2011/0161309 A1 | 6/2011 | Lung et al. |
| 2011/0175810 A1 | 7/2011 | Markovic et al. |
| 2011/0184730 A1 | 7/2011 | LeBeau et al. |
| 2011/0218855 A1 | 9/2011 | Cao et al. |
| 2011/0231182 A1 | 9/2011 | Weider et al. |
| 2011/0231188 A1 | 9/2011 | Kennewick et al. |
| 2011/0264643 A1 | 10/2011 | Cao |
| 2011/0279368 A1 | 11/2011 | Klein et al. |
| 2011/0306426 A1 | 12/2011 | Novak et al. |
| 2012/0002820 A1 | 1/2012 | Leichter |
| 2012/0016678 A1 | 1/2012 | Gruber et al. |
| 2012/0020490 A1 | 1/2012 | Leichter |
| 2012/0022787 A1 | 1/2012 | LeBeau et al. |
| 2012/0022857 A1 | 1/2012 | Baldwin et al. |
| 2012/0022860 A1 | 1/2012 | Lloyd et al. |
| 2012/0022868 A1 | 1/2012 | LeBeau et al. |
| 2012/0022869 A1 | 1/2012 | Lloyd et al. |
| 2012/0022870 A1 | 1/2012 | Kristjansson et al. |
| 2012/0022874 A1 | 1/2012 | Lloyd et al. |
| 2012/0022876 A1 | 1/2012 | LeBeau et al. |
| 2012/0023088 A1 | 1/2012 | Cheng et al. |
| 2012/0034904 A1 | 2/2012 | LeBeau et al. |
| 2012/0035908 A1 | 2/2012 | LeBeau et al. |
| 2012/0035924 A1 | 2/2012 | Jitkoff et al. |
| 2012/0035931 A1 | 2/2012 | LeBeau et al. |
| 2012/0035932 A1 | 2/2012 | Jitkoff et al. |
| 2012/0042343 A1 | 2/2012 | Laligand et al. |
| 2012/0137367 A1 | 5/2012 | Dupont et al. |
| 2012/0173464 A1 | 7/2012 | Tur et al. |
| 2012/0265528 A1 | 10/2012 | Gruber et al. |
| 2012/0271676 A1 | 10/2012 | Aravamudan et al. |
| 2012/0311583 A1 | 12/2012 | Gruber et al. |
| 2013/0110518 A1 | 5/2013 | Gruber et al. |
| 2013/0110520 A1 | 5/2013 | Cheyer et al. |

FOREIGN PATENT DOCUMENTS

| | | |
|---|---|---|
| DE | 198 41 541 B4 | 12/2007 |
| EP | 0138061 B1 | 9/1984 |
| EP | 0138061 A1 | 4/1985 |
| EP | 0218859 A2 | 4/1987 |
| EP | 0262938 A1 | 4/1988 |
| EP | 0293259 A2 | 11/1988 |
| EP | 0299572 A2 | 1/1989 |
| EP | 0313975 A2 | 5/1989 |
| EP | 0314908 A2 | 5/1989 |
| EP | 0327408 A2 | 8/1989 |
| EP | 0389271 A2 | 9/1990 |
| EP | 0411675 A2 | 2/1991 |
| EP | 0559349 A1 | 9/1993 |
| EP | 0559349 B1 | 9/1993 |
| EP | 0570660 A1 | 11/1993 |
| EP | 0863453 A1 | 9/1998 |
| EP | 1245023 A1 | 10/2002 |
| EP | 2 109 295 A1 | 10/2009 |
| GB | 2293667 A | 4/1996 |
| JP | 06 019965 | 1/1994 |
| JP | 2001 125896 | 5/2001 |
| JP | 2002 024212 | 1/2002 |
| JP | 2003 517158 A | 5/2003 |
| JP | 2009 036999 | 2/2009 |
| KR | 10-2007-0057496 | 6/2007 |
| KR | 10-0776800 B1 | 11/2007 |
| KR | 10-2008-001227 | 2/2008 |
| KR | 10-0810500 B1 | 3/2008 |
| KR | 10 2008 109322 A | 12/2008 |
| KR | 10 2009 086805 A | 8/2009 |
| KR | 10-0920267 B1 | 10/2009 |
| KR | 10-2010-0032792 | 4/2010 |
| KR | 10 2011 0113414 A | 10/2011 |
| WO | WO 95/02221 | 1/1995 |
| WO | WO 97/26612 | 7/1997 |
| WO | WO 98/41956 | 9/1998 |
| WO | WO 99/01834 | 1/1999 |
| WO | WO 99/08238 | 2/1999 |
| WO | WO 99/56227 | 11/1999 |
| WO | WO 00/60435 | 10/2000 |
| WO | WO 00/60435 A3 | 10/2000 |
| WO | WO 02/073603 A1 | 9/2002 |
| WO | WO 2006/129967 A1 | 12/2006 |
| WO | WO 2008/085742 A2 | 7/2008 |
| WO | WO 2008/109835 A2 | 9/2008 |
| WO | WO 2011/088053 A2 | 7/2011 |

OTHER PUBLICATIONS

Ambite, JL., et al., "Design and Implementation of the CALO Query Manager," Copyright © 2006, American Association for Artificial Intelligence, (www.aaai.org), 8 pages.

Ambite, JL., et al., "Integration of Heterogeneous Knowledge Sources in the CALO Query Manager," 2005, The 4th International Conference on Ontologies, DataBases, and Applications of Semantics (ODBASE), Agia Napa, Cyprus, ttp://www.isi.edu/people/ambite/publications/integration_heterogeneous_knowledge_sources_calo_query_manager, 18 pages.

Belvin, R. et al., "Development of the HRL Route Navigation Dialogue System," 2001, In Proceedings of the First International Conference on Human Language Technology Research, Paper, Copyright © 2001 HRL Laboratories, LLC, http://citeseerx.ist.psu.edu/viewdoc/summary?doi=10.1.1.10.6538, 5 pages.

Berry, P. M., et al. "PTIME: Personalized Assistance for Calendaring," ACM Transactions on Intelligent Systems and Technology, vol. 2, No. 4, Article 40, Publication date: Jul. 2011, 40:1-22, 22 pages.

Bussler, C., et al., "Web Service Execution Environment (WSMX)," Jun. 3, 2005, W3C Member Submission, http://www.w3.org/Submission/WSMX, 29 pages.

Butcher, M., "EVI arrives in town to go toe-to-toe with Siri," Jan. 23, 2012, http://techcrunch.conn/2012/01/23/evi-arrives-in-town-to-go-toe-to-toe-with-siri/, 2 pages.

Chen, Y., "Multimedia Siri Finds and Plays Whatever You Ask for," Feb. 9, 2012, http://www.psfk.com/2012/02/multimedia-siri.html, 9 pages.

Cheyer, A., "About Adam Cheyer," Sep. 17, 2012, http://www.adam.cheyer.com/about.html, 2 pages.

Cheyer, A., "A Perspective on AI & Agent Technologies for SCM," VerticalNet, 2001 presentation, 22 pages.

Cheyer, A. et al., "Spoken Language and Multimodal Applications for Electronic Realties," © Springer-Verlag London Ltd, Virtual Reality 1999, 3:1-15, 15 pages.

Cutkosky, M. R. et al., "PACT: An Experiment in Integrating Concurrent Engineering Systems," Journal, Computer, vol. 26 Issue 1, Jan. 1993, IEEE Computer Society Press Los Alamitos, CA, USA, http://dl.acm.org/citation.cfm?id=165320, 14 pages.

Domingue, J., et al., "Web Service Modeling Ontology (WSMO)—An Ontology for Semantic Web Services," Jun. 9-10, 2005, position paper at the W3C Workshop on Frameworks for Semantics in Web Services, Innsbruck, Austria, 6 pages.

Elio, R. et al., "On Abstract Task Models and Conversation Policies," http://webdocs.cs.ualberta.ca/~ree/publications/papers2/ATS.AA99.pdf, May 1999, 10 pages.

Ericsson, S. et al., "Software illustrating a unified approach to multimodality and multilinguality in the in-home domain," Dec. 22, 2006, Talk and Look: Tools for Ambient Linguistic Knowledge, http://www.talk-project.eurice.eu/fileadmin/talk/publications_public/deliverables_public/D1_6.pdf, 127 pages.

Evi, "Meet Evi: the one mobile app that provides solutions for your everyday problems," Feb. 8, 2012, http://www.evi.com/, 3 pages.

Feigenbaum, E., et al., "Computer-assisted Semantic Annotation of Scientific Life Works;" 2007, http://tomgruber.org/writing/stanford-cs300.pdf, 22 pages.

Gannes, L., "Alfred App Gives Personalized Restaurant Recommendations," allthingsd.com, Jul. 18, 2011, http://allthingsd.com/20110718/alfred-app-gives-personalized-restaurant-recommendations/, 3 pages.

(56) References Cited

OTHER PUBLICATIONS

Gautier, P. O., et al. "Generating Explanations of Device Behavior Using Compositional Modeling and Causal Ordering," 1993, http://citeseerx.ist.psu.edu/viewdoc/summary?doi=10.1.1.42.8394, 9 pages.

Gervasio, M. T., et al., Active Preference Learning for Personalized Calendar Scheduling Assistancae, Copyright © 2005, http://www.ai.sri.com/~gervasio/pubs/gervasio-iui05.pdf, 8 pages.

Glass, A., "Explaining Preference Learning," 2006, http://cs229.stanford.edu/proj2006/Glass-ExplainingPreferenceLearning.pdf, 5 pages.

Glass, J., et al., "Multilingual Spoken-Language Understanding in the MIT Voyager System," Aug. 1995, http://groups.csail.mit.edu/sls/publications/1995/speechcomm95-voyager.pdf, 29 pages.

Goddeau, D., et al., "A Form-Based Dialogue Manager for Spoken Language Applications," Oct. 1996, http://phasedance.com/pdf/icslp96.pdf, 4 pages.

Goddeau, D., et al., "Galaxy: A Human-Language Interface to On-Line Travel Information," 1994 International Conference on Spoken Language Processing, Sep. 18-22, 1994, Pacific Convention Plaza Yokohama, Japan, 6 pages.

Gruber, T. R., et al., "An Ontology for Engineering Mathematics," In Jon Doyle, Piero Torasso, & Erik Sandewall, Eds., Fourth International Conference on Principles of Knowledge Representation and Reasoning, Gustav Stresemann Institut, Bonn, Germany, Morgan Kaufmann; 1994, http://www-ksl.stanford.edu/knowledge-sharing/papers/engmath.html, 22 pages.

Gruber, T. R., "A Translation Approach to Portable Ontology Specifications," Knowledge Systems Laboratory, Stanford University, Sep. 1992, Technical Report KSL 92-71, Revised Apr. 1993, 27 pages.

Gruber, T. R., "Automated Knowledge Acquisition for Strategic Knowledge," Knowledge Systems Laboratory, Machine Learning, 4, 293-336 (1989), 44 pages.

Gruber, T. R., "(Avoiding) the Travesty of the Commons," Presentation at NPUC 2006, New Paradigms for User Computing, IBM Almaden Research Center, Jul. 24, 2006. http://tomgruber.org/writing/avoiding-travestry.htm, 52 pages.

Gruber, T. R., "Big Think Small Screen: How semantic computing in the cloud will revolutionize the consumer experience on the phone," Keynote presentation at Web 3.0 conference, Jan. 27, 2010, http://tomgruber.org/writing/web30jan2010.htm, 41 pages.

Gruber, T. R., "Collaborating around Shared Content on the WWW," W3C Workshop on WWW and Collaboration, Cambridge, MA, Sep. 11, 1995, http://www.w3.org/Collaboration/Workshop/Proceedings/P9.html, 1 page.

Gruber, T. R., "Collective Knowledge Systems: Where the Social Web meets the Semantic Web," Web Semantics: Science, Services and Agents on the World Wide Web (2007), doi:10.1016/j.websem.2007.11.011, keynote presentation given at the 5th International Semantic Web Conference, Nov. 7, 2006, 19 pages.

Gruber, T. R., "Where the Social Web meets the Semantic Web," Presentation at the 5th International Semantic Web Conference, Nov. 7, 2006, 38 pages.

Gruber, T. R., "Despite our Best Efforts, Ontologies are not the Problem," AAAI Spring Symposium, Mar. 2008, http://tomgruber.org/writing/aaai-ss08.htm, 40 pages.

Gruber, T. R., "Enterprise Collaboration Management with Intraspect," Intraspect Software, Inc., Instraspect Technical White Paper Jul. 2001, 24 pages.

Gruber, T. R., "Every ontology is a treaty—a social agreement—among people with some common motive in sharing," Interview by Dr. Miltiadis D. Lytras, Official Quarterly Bulletin of AIS Special Interest Group on Semantic Web and Information Systems, vol. 1, Issue 3, 2004, http://www.sigsemis.org 1, 5 pages.

Gruber, T. R., et al., "Generative Design Rationale: Beyond the Record and Replay Paradigm," Knowledge Systems Laboratory, Stanford University, Dec. 1991, Technical Report KSL 92-59, Updated Feb. 1993, 24 pages.

Gruber, T. R., "Helping Organizations Collaborate, Communicate, and Learn," Presentation to NASA Ames Research, Mountain View, CA, Mar. 2003, http://tomgruber.org/writing/organizational-intelligence-talk.htm, 30 pages.

Gruber, T. R., "Intelligence at the Interface: Semantic Technology and the Consumer Internet Experience," Presentation at Semantic Technologies conference (SemTech08), May 20, 2008, http://tomgruber.org/writing.htm, 40 pages.

Gruber, T. R., Interactive Acquisition of Justifications: Learning "Why" by Being Told "What" Knowledge Systems Laboratory, Stanford University, Oct. 1990, Technical Report KSL 91-17, Revised Feb. 1991, 24 pages.

Gruber, T. R., "It Is What It Does: The Pragmatics of Ontology for Knowledge Sharing," (c) 2000, 2003, http://www.cidoc-crm.org/docs/symposium_presentations/gruber_cidoc-ontology-2003.pdf, 21 pages.

Gruber, T. R., et al., "Machine-generated Explanations of Engineering Models: A Compositional Modeling Approach," (1993) In Proc. International Joint Conference on Artificial Intelligence, http://citeseerx.ist.psu.edu/viewdoc/summary?doi=10.1.1.34.930, 7 pages.

Gruber, T. R., "2021: Mass Collaboration and the Really New Economy," TNTY Futures, the newsletter of The Next Twenty Years series, vol. 1, Issue 6, Aug. 2001, http://www.tnty.com/newsletter/futures/archive/v01-05business.html, 5 pages.

Gruber, T. R., et al.,"NIKE: A National Infrastructure for Knowledge Exchange," Oct. 1994, http://www.eit.com/papers/nike/nike.html and nike.ps, 10 pages.

Gruber, T. R., "Ontologies, Web 2.0 and Beyond," Apr. 24, 2007, Ontology Summit 2007, http://tomgruber.org/writing/ontolog-social-web-keynote.pdf, 17 pages.

Gruber, T. R., "Ontology of Folksonomy: A Mash-up of Apples and Oranges," Originally published to the web in 2005, Int'l Journal on Semantic Web & Information Systems, 3(2), 2007, 7 pages.

Gruber, T. R., "Siri, a Virtual Personal Assistant—Bringing Intelligence to the Interface," Jun. 16, 2009, Keynote presentation at Semantic Technologies conference, Jun. 2009. http://tomgruber.org/writing/semtech09.htm, 22 pages.

Gruber, T. R., "TagOntology," Presentation to Tag Camp, www.tagcamp.org, Oct. 29, 2005, 20 pages.

Gruber, T. R., et al., "Toward a Knowledge Medium for Collaborative Product Development," In Artificial Intelligence in Design 1992, from Proceedings of the Second International Conference on Artificial Intelligence in Design, Pittsburgh, USA, Jun. 22-25, 1992, 19 pages.

Gruber, T. R., "Toward Principles for the Design of Ontologies Used for Knowledge Sharing," In International Journal Human-Computer Studies 43, p. 907-928, substantial revision of paper presented at the International Workshop on Formal Ontology, Mar. 1993, Padova, Italy, available as Technical Report KSL 93-04, Knowledge Systems Laboratory, Stanford University, further revised Aug. 23, 1993, 23 pages.

Guzzoni, D., et al., "Active, A Platform for Building Intelligent Operating Rooms," Surgetica 2007 Computer-Aided Medical Interventions: tools and applications, pp. 191-198, Paris, 2007, Sauramps Médical, http://lsro.epfl.ch/page-68384-en.html, 8 pages.

Guzzoni, D., et al., "Active, A Tool for Building Intelligent User Interfaces," ASC 2007, Palma de Mallorca, http://lsro.epfl.ch/page-34241.html, 6 pages.

Guzzoni, D., et al., "A Unified Platform for Building Intelligent Web Interaction Assistants," Proceedings of the 2006 IEEE/WIC/ACM International Conference on Web Intelligence and Intelligent Agent Technology, Computer Society, 4 pages.

Guzzoni, D., et al., "Modeling Human-Agent Interaction with Active Ontologies," 2007, AAAI Spring Symposium, Interaction Challenges for Intelligent Assistants, Stanford University, Palo Alto, California, 8 pages.

Hardawar, D., "Driving app Waze builds its own Siri for hands-free voice control," Feb. 9, 2012, http://venturebeat.com/2012/02/09/driving-app-waze-builds-its-own-siri-for-hands-free-voice-control/, 4 pages.

(56) References Cited

OTHER PUBLICATIONS

Intraspect Software, "The Intraspect Knowledge Management Solution: Technical Overview," http://tomgruber.org/writing/intraspect-whitepaper-1998.pdf, 18 pages.
Julia, L., et al., Un éditeur interactif de tableaux dessinés à main levée (An Interactive Editor for Hand-Sketched Tables), Traitement du Signal 1995, vol. 12, No. 6, 8 pages. No English Translation Available.
Karp, P. D., "A Generic Knowledge-Base Access Protocol," May 12, 1994, http://lecture.cs.buu.ac.th/~f50353/Document/gfp.pdf, 66 pages.
Lemon, O., et al., "Multithreaded Context for Robust Conversational Interfaces: Context-Sensitive Speech Recognition and Interpretation of Corrective Fragments," Sep. 2004, ACM Transactions on Computer-Human Interaction, vol. 11, No. 3, 27 pages.
Leong, L., et al., "CASIS: A Context-Aware Speech Interface System," IUI'05, Jan. 9-12, 2005, Proceedings of the 10th international conference on Intelligent user interfaces, San Diego, California, USA, 8 pages.
Lieberman, H., et al., "Out of context: Computer systems that adapt to, and learn from, context," 2000, IBM Systems Journal, vol. 39, Nos. 3/4, 2000, 16 pages.
Lin, B., et al., "A Distributed Architecture for Cooperative Spoken Dialogue Agents with Coherent Dialogue State and History," 1999, http://citeseerx.ist.psu.edu/viewdoc/summary?doi=10.1.1.42.272, 4 pages.
McGuire, J., et al., "SHADE: Technology for Knowledge-Based Collaborative Engineering," 1993, Journal of Concurrent Engineering: Applications and Research (CERA), 18 pages.
Meng, H., et al., "Wheels: A Conversational System in the Automobile Classified Domain," Oct. 1996, httphttp://citeseerx.ist.psu.edu/viewdoc/summary?doi=10.1.1.16.3022, 4 pages.
Milward, D., et al., "D2.2: Dynamic Multimodal Interface Reconfiguration," Talk and Look: Tools for Ambient Linguistic Knowledge, Aug. 8, 2006, http://www.ihmc.us/users/nblaylock/Pubs/Files/talk_d2.2.pdf, 69 pages.
Mitra, P., et al., "A Graph-Oriented Model for Articulation of Ontology Interdependencies," 2000, http://ilpubs.stanford.edu:8090/442/1/2000-20.pdf, 15 pages.
Moran, D. B., et al., "Multimodal User Interfaces in the Open Agent Architecture," Proc. of the 1997 International Conference on Intelligent User Interfaces (IUI97), 8 pages.
Mozer, M., "An Intelligent Environment Must be Adaptive," Mar./Apr. 1999, IEEE Intelligent Systems, 3 pages.
Mühlhäuser, M., "Context Aware Voice User Interfaces for Workflow Support," Darmstadt 2007, http://tuprints.ulb.tu-darnnstadt.de/876/1/PhD.pdf, 254 pages.
Naone, E., "TR10: Intelligent Software Assistant," Mar.-Apr. 2009, Technology Review, http://www.technologyreview.com/printer_friendly_article.aspx?id=22117, 2 pages.
Neches, R., "Enabling Technology for Knowledge Sharing," Fall 1991, AI Magazine, pp. 37-56, (21 pages).
Nöth, E., et al., "Verbmobil: The Use of Prosody in the Linguistic Components of a Speech Understanding System," IEEE Transactions on Speech and Audio Processing, vol. 8, No. 5, Sep. 2000, 14 pages.
*Phoenix Solutions, Inc. v. West Interactive Corp.*, Document 40, Declaration of Christopher Schmandt Regarding the MIT Galaxy System dated Jul. 2, 2010, 162 pages.
Rice, J., et al., "Monthly Program: Nov. 14, 1995," The San Francisco Bay Area Chapter of ACM SIGCHI, http://www.baychi.org/calendar/19951114/, 2 pages.
Rice, J., et al., "Using the Web Instead of a Window System," Knowledge Systems Laboratory, Stanford University, (http://tomgruber.org/writing/ksl-95-69.pdf, Sep. 1995.) CHI '96 Proceedings: Conference on Human Factors in Computing Systems, Apr. 13-18, 1996, Vancouver, BC, Canada, 14 pages.
Rivlin, Z., et al., "Maestro: Conductor of Multimedia Analysis Technologies," 1999 SRI International, Communications of the Association for Computing Machinery (CACM), 7 pages.
Roddy, D., et al., "Communication and Collaboration in a Landscape of B2B eMarketplaces," VerticalNet Solutions, white paper, Jun. 15, 2000, 23 pages.
Seneff, S., et al., "A New Restaurant Guide Conversational System: Issues in Rapid Prototyping for Specialized Domains," Oct. 1996, citeseerx.ist.psu.edu/viewdoc/download?doi=10.1.1.16 . . . rep . . . , 4 pages.
Sheth, A., et al., "Relationships at the Heart of Semantic Web: Modeling, Discovering, and Exploiting Complex Semantic Relationships," Oct. 13, 2002, Enhancing the Power of the Internet: Studies in Fuzziness and Soft Computing, SpringerVerlag, 38 pages.
Simonite, T., "One Easy Way to Make Siri Smarter," Oct. 18, 2011, Technology Review, http://www.technologyreview.com/printer_friendly_article.aspx?id=38915, 2 pages.
Stent, A., et al., "The CommandTalk Spoken Dialogue System," 1999, http://acl.ldc.upenn.edu/P/P99/P99-1024.pdf, 8 pages.
Tofel, K., et al., "SpeakTolt: A personal assistant for older iPhones, iPads," Feb. 9, 2012, http://gigaonn.com/apple/speaktoit-siri-for-older-iphones-ipads/, 7 pages.
Tucker, J., "Too lazy to grab your TV remote? Use Siri instead," Nov. 30, 2011, http://www.engadget.com/2011/11/30/too-lazy-to-grab-your-tv-remote-use-siri-instead/, 8 pages.
Tur, G., et al., "The CALO Meeting Speech Recognition and Understanding System," 2008, Proc. IEEE Spoken Language Technology Workshop, 4 pages.
Tur, G., et al., "The-CALO-Meeting-Assistant System," IEEE Transactions on Audio, Speech, and Language Processing, vol. 18, No. 6, Aug. 2010, 11 pages.
Vlingo InCar, "Distracted Driving Solution with Vlingo InCar," 2:38 minute video uploaded to YouTube by Vlingo Voice on Oct. 6, 2010, http://www.youtube.com/watch?v=Vqs8XfXxgz4, 2 pages.
Vlingo, "Vlingo Launches Voice Enablement Application on Apple App Store," Vlingo press release dated Dec. 3, 2008, 2 pages.
YouTube, "Knowledge Navigator," 5:34 minute video uploaded to YouTube by Knownav on Apr. 29, 2008, http://www.youtube.com/watch?v=QRH8eimU_20, 1 page.
YouTube,"Send Text, Listen to and Send E-Mail 'By Voice' www.voiceassist.com," 2:11 minute video uploaded to YouTube by VoiceAssist on Jul. 30, 2009, http://www.youtube.com/watch?v=0tEU61nHHA4, 1 page.
YouTube,"Text'nDrive App Demo—Listen and Reply to your Messages by Voice while Driving!," 1:57 minute video uploaded to YouTube by TextnDrive on Apr. 27, 2010, http://www.youtube.com/watch?v=WaGfzoHsAMw, 1 page.
YouTube, "Voice on the Go (BlackBerry)," 2:51 minute video uploaded to YouTube by VoiceOnTheGo on Jul. 27, 2009, http://www.youtube.com/watch?v=pJqpWgQS98w, 1 page.
Zue, V., "Conversational Interfaces: Advances and Challenges," Sep. 1997, http://www.cs.cmu.edu/~dod/papers/zue97.pdf, 10 pages.
Zue, V. W., "Toward Systems that Understand Spoken Language," Feb. 1994, ARPA Strategic Computing Institute, © 1994 IEEE, 9 pages.
International Search Report and Written Opinion dated Nov. 29, 2011, received in International Application No. PCT/US2011/20861, which corresponds to U.S. Appl. No. 12/987,982, 15 pages. (Thomas Robert Gruber).
Martin, D., et al., "The Open Agent Architecture: A Framework for building distributed software systems," Jan.-Mar. 1999, Applied Artificial Intelligence: An International Journal, vol. 13, No. 1-2, http://adam.cheyer.com/papers/oaa.pdf, 38 pages.
Acero, A., et al., "Environmental Robustness in Automatic Speech Recognition," International Conference on Acoustics, Speech, and Signal Processing (ICASSP'90), Apr. 3-6, 1990, 4 pages.
Acero, A., et al., "Robust Speech Recognition by Normalization of The Acoustic Space," International Conference on Acoustics, Speech, and Signal Processing, 1991, 4 pages.
Ahlbom, G., et al., "Modeling Spectral Speech Transitions Using Temporal Decomposition Techniques," IEEE International Conference of Acoustics, Speech, and Signal Processing (ICASSP'87), Apr. 1987, vol. 12, 4 pages.
Aikawa, K., "Speech Recognition Using Time-Warping Neural Networks," Proceedings of the 1991 IEEE Workshop on Neural Networks for Signal Processing, Sep. 30 to Oct. 1, 1991, 10 pages.

(56) References Cited

OTHER PUBLICATIONS

Anastasakos, A., et al., "Duration Modeling in Large Vocabulary Speech Recognition," International Conference on Acoustics, Speech, and Signal Processing (ICASSP'95), May 9-12, 1995, 4 pages.

Anderson, R. H., "Syntax-Directed Recognition of Hand-Printed Two-Dimensional Mathematics," In Proceedings of Symposium on Interactive Systems for Experimental Applied Mathematics: Proceedings of the Association for Computing Machinery Inc. Symposium, © 1967, 12 pages.

Ansari, R., et al., "Pitch Modification of Speech using a Low-Sensitivity Inverse Filter Approach," IEEE Signal Processing Letters, vol. 5, No. 3, Mar. 1998, 3 pages.

Anthony, N. J., et al., "Supervised Adaption for Signature Verification System," Jun. 1, 1978, IBM Technical Disclosure, 3 pages.

Apple Computer, "Guide Maker User's Guide," © Apple Computer, Inc., Apr. 27, 1994, 8 pages.

Apple Computer, "Introduction to Apple Guide," © Apple Computer, Inc., Apr. 28, 1994, 20 pages.

Asanović, K., et al., "Experimental Determination of Precision Requirements for Back-Propagation Training of Artificial Neural Networks," In Proceedings of the 2nd International Conference of Microelectronics for Neural Networks, 1991, www.ICSI.Berkeley.EDU, 7 pages.

Atal, B. S., "Efficient Coding of LPC Parameters by Temporal Decomposition," IEEE International Conference on Acoustics, Speech, and Signal Processing (ICASSP'83), Apr. 1983, 4 pages.

Bahl, L. R., et al., "Acoustic Markov Models Used in the Tangora Speech Recognition System," In Proceeding of International Conference on Acoustics, Speech, and Signal Processing (ICASSP'88), Apr. 11-14, 1988, vol. 1, 4 pages.

Bahl, L. R., et al., "A Maximum Likelihood Approach to Continuous Speech Recognition," IEEE Transaction on Pattern Analysis and Machine Intelligence, vol. PAMI-5, No. 2, Mar. 1983, 13 pages.

Bahl, L. R., et al., "A Tree-Based Statistical Language Model for Natural Language Speech Recognition," IEEE Transactions on Acoustics, Speech and Signal Processing, vol. 37, Issue 7, Jul. 1989, 8 pages.

Bahl, L. R., et al., "Large Vocabulary Natural Language Continuous Speech Recognition," In Proceedings of 1989 International Conference on Acoustics, Speech, and Signal Processing, May 23-26, 1989, vol. 1, 6 pages.

Bahl, L. R., et al, "Multonic Markov Word Models for Large Vocabulary Continuous Speech Recognition," IEEE Transactions on Speech and Audio Processing, vol. 1, No. 3, Jul. 1993, 11 pages.

Bahl, L. R., et al., "Speech Recognition with Continuous-Parameter Hidden Markov Models," In Proceeding of International Conference on Acoustics, Speech, and Signal Processing (ICASSP'88), Apr. 11-14, 1988, vol. 1, 8 pages.

Banbrook, M., "Nonlinear Analysis of Speech from a Synthesis Perspective," A thesis submitted for the degree of Doctor of Philosophy, The University of Edinburgh, Oct. 15, 1996, 35 pages.

Belaid, A., et al., "A Syntactic Approach for Handwritten Mathematical Formula Recognition," IEEE Transactions on Pattern Analysis and Machine Intelligence, vol. PAMI-6, No. 1, Jan. 1984, 7 pages.

Bellegarda, E. J., et al., "On-Line Handwriting Recognition Using Statistical Mixtures," Advances in Handwriting and Drawings: A Multidisciplinary Approach, Europia, 6th International IGS Conference on Handwriting and Drawing, Paris—France, Jul. 1993, 11 pages.

Bellegarda, J. R., "A Latent Semantic Analysis Framework for Large-Span Language Modeling," 5th European Conference on Speech, Communication and Technology, (EUROSPEECH'97), Sep. 22-25, 1997, 4 pages.

Bellegarda, J. R., "A Multispan Language Modeling Framework for Large Vocabulary Speech Recognition," IEEE Transactions on Speech and Audio Processing, vol. 6, No. 5, Sep. 1998, 12 pages.

Bellegarda, J. R., et al., "A Novel Word Clustering Algorithm Based on Latent Semantic Analysis," In Proceedings of the IEEE International Conference on Acoustics, Speech, and Signal Processing (ICASSP'96), vol. 1, 4 pages.

Bellegarda, J. R., et al., "Experiments Using Data Augmentation for Speaker Adaptation," International Conference on Acoustics, Speech, and Signal Processing (ICASSP'95), May 9-12, 1995, 4 pages.

Bellegarda, J. R., "Exploiting Both Local and Global Constraints for Multi-Span Statistical Language Modeling," Proceeding of the 1998 IEEE International Conference on Acoustics, Speech, and Signal Processing (ICASSP'98), vol. 2, May 12-15 1998, 5 pages.

Bellegarda, J. R., "Exploiting Latent Semantic Information in Statistical Language Modeling," In Proceedings of the IEEE, Aug. 2000, vol. 88, No. 8, 18 pages.

Bellegarda, J. R., "Interaction-Driven Speech Input—A Data-Driven Approach to the Capture of Both Local and Global Language Constraints," 1992, 7 pages, available at http://old.sigchi.org/bulletin/1998.2/bellegarda.html.

Bellegarda, J. R., "Large Vocabulary Speech Recognition with Multispan Statistical Language Models," IEEE Transactions on Speech and Audio Processing, vol. 8, No. 1, Jan. 2000, 9 pages.

Bellegarda, J. R., et al., "Performance of the IBM Large Vocabulary Continuous Speech Recognition System on the ARPA Wall Street Journal Task," Signal Processing VII: Theories and Applications, © 1994 European Association for Signal Processing, 4 pages.

Bellegarda, J. R., et al., "The Metamorphic Algorithm: A Speaker Mapping Approach to Data Augmentation," IEEE Transactions on Speech and Audio Processing, vol. 2, No. 3, Jul. 1994, 8 pages.

Black, A. W., et al., "Automatically Clustering Similar Units for Unit Selection in Speech Synthesis," In Proceedings of Eurospeech 1997, vol. 2, 4 pages.

Blair, D. C., et al., "An Evaluation of Retrieval Effectiveness for a Full-Text Document-Retrieval System," Communications of the ACM, vol. 28, No. 3, Mar. 1985, 11 pages.

Briner, L. L., "Identifying Keywords in Text Data Processing," In Zelkowitz, Marvin V., ED, Directions and Challenges, 15th Annual Technical Symposium, Jun. 17, 1976, Gaithersbury, Maryland, 7 pages.

Bulyko, I., et al., "Joint Prosody Prediction and Unit Selection for Concatenative Speech Synthesis," Electrical Engineering Department, University of Washington, Seattle, 2001, 4 pages.

Bussey, H. E., et al., "Service Architecture, Prototype Description, and Network Implications of a Personalized Information Grazing Service," INFOCOM'90, Ninth Annual Joint Conference of the IEEE Computer and Communication Societies, Jun. 3-7, 1990, http://slrohall.com/publications/, 8 pages.

Buzo, A., et al., "Speech Coding Based Upon Vector Quantization," IEEE Transactions on Acoustics, Speech, and Signal Processing, vol. Assp-28, No. 5, Oct. 1980, 13 pages.

Caminero-Gil, J., et al., "Data-Driven Discourse Modeling for Semantic Interpretation," In Proceedings of the IEEE International Conference on Acoustics, Speech, and Signal Processing, May 7-10, 1996, 6 pages.

Cawley, G. C., "The Application of Neural Networks to Phonetic Modelling," PhD Thesis, University of Essex, Mar. 1996, 13 pages.

Chang, S., et al., "A Segment-based Speech Recognition System for Isolated Mandarin Syllables," Proceedings TENCON '93, IEEE Region 10 conference on Computer, Communication, Control and Power Engineering, Oct. 19-21, 1993, vol. 3, 6 pages.

Conklin, J., "Hypertext: An Introduction and Survey," Computer Magazine, Sep. 1987, 25 pages.

Connolly, F. T., et al., "Fast Algorithms for Complex Matrix Multiplication Using Surrogates," IEEE Transactions on Acoustics, Speech, and Signal Processing, Jun. 1989, vol. 37, No. 6, 13 pages.

Deerwester, S., et al., "Indexing by Latent Semantic Analysis," Journal of the American Society for Information Science, vol. 41, No. 6, Sep. 1990, 19 pages.

Deller, Jr., J. R., et al., "Discrete-Time Processing of Speech Signals," © 1987 Prentice Hall, ISBN: 0-02-328301-7, 14 pages.

Digital Equipment Corporation, "Open VMS Software Overview," Dec. 1995, software manual, 159 pages.

(56) References Cited

OTHER PUBLICATIONS

Donovan, R. E., "A New Distance Measure for Costing Spectral Discontinuities in Concatenative Speech Synthesisers," 2001, http://citeseerx.ist.psu.edu/viewdoc/summary?doi=10.1.1.21.6398, 4 pages.
Frisse, M. E., "Searching for Information in a Hypertext Medical Handbook," Communications of the ACM, vol. 31, No. 7, Jul. 1988, 8 pages.
Goldberg, D., et al., "Using Collaborative Filtering to Weave an Information Tapestry," Communications of the ACM, vol. 35, No. 12, Dec. 1992, 10 pages.
Gorin, A. L., et al., "On Adaptive Acquisition of Language," International Conference on Acoustics, Speech, and Signal Processing (ICASSP'90), vol. 1, Apr. 3-6, 1990, 5 pages.
Gotoh, Y., et al., "Document Space Models Using Latent Semantic Analysis," In Proceedings of Eurospeech, 1997, 4 pages.
Gray, R. M., "Vector Quantization," IEEE ASSP Magazine, Apr. 1984, 26 pages.
Harris, F. J., "On the Use of Windows for Harmonic Analysis with the Discrete Fourier Transform," In Proceedings of the IEEE, vol. 66, No. 1, Jan. 1978, 34 pages.
Helm, R., et al., "Building Visual Language Parsers," In Proceedings of CHI'91 Proceedings of the SIGCHI Conference on Human Factors in Computing Systems, 8 pages.
Hermansky, H., "Perceptual Linear Predictive (PLP) Analysis of Speech," Journal of the Acoustical Society of America, vol. 87, No. 4, Apr. 1990, 15 pages.
Hermansky, H., "Recognition of Speech in Additive and Convolutional Noise Based on Rasta Spectral Processing," In proceedings of IEEE International Conference on Acoustics, speech, and Signal Processing (ICASSP'93), Apr. 27-30, 1993, 4 pages.
Hoehfeld M., et al., "Learning with Limited Numerical Precision Using the Cascade-Correlation Algorithm," IEEE Transactions on Neural Networks, vol. 3, No. 4, Jul. 1992, 18 pages.
Holmes, J. N., "Speech Synthesis and Recognition—Stochastic Models for Word Recognition," Speech Synthesis and Recognition, Published by Chapman & Hall, London, ISBN 0 412 53430 4, © 1998 J. N. Holmes, 7 pages.
Hon, H.W., et al., "CMU Robust Vocabulary-Independent Speech Recognition System," IEEE International Conference on Acoustics, Speech, and Signal Processing (ICASSP-91), Apr. 14-17, 1991, 4 pages.
IBM Technical Disclosure Bulletin, "Speech Editor," vol. 29, No. 10, Mar. 10, 1987, 3 pages.
IBM Technical Disclosure Bulletin, "Integrated Audio-Graphics User Interface," vol. 33, No. 11, Apr. 1991, 4 pages.
IBM Technical Disclosure Bulletin, "Speech Recognition with Hidden Markov Models of Speech Waveforms," vol. 34, No. 1, Jun. 1991, 10 pages.
Iowegian International, "FIR Filter Properties," dspGuro, Digital Signal Processing Central, http://www.dspguru.com/dsp/taqs/fir/properties, downloaded on Jul. 28, 2010, 6 pages.
Jacobs, P. S., et al., "Scisor: Extracting Information from On-Line News," Communications of the ACM, vol. 33, No. 11, Nov. 1990, 10 pages.
Jelinek, F., "Self-Organized Language Modeling for Speech Recognition," Readings in Speech Recognition, edited by Alex Waibel and Kai-Fu Lee, May 15, 1990, © 1990 Morgan Kaufmann Publishers, Inc., ISBN: 1-55860-124-4, 63 pages.
Jennings, A., et al., "A Personal News Service Based on a User Model Neural Network," IEICE Transactions on Information and Systems, vol. E75-D, No. 2, Mar. 1992, Tokyo, JP, 12 pages.
Ji, T., et al., "A Method for Chinese Syllables Recognition based upon Sub-syllable Hidden Markov Model," 1994 International Symposium on Speech, Image Processing and Neural Networks, Apr. 13-16, 1994, Hong Kong, 4 pages.
Jones, J., "Speech Recognition for Cyclone," Apple Computer, Inc., E.R.S., Revision 2.9, Sep. 10, 1992, 93 pages.

Katz, S. M., "Estimation of Probabilities from Sparse Data for the Language Model Component of a Speech Recognizer," IEEE Transactions on Acoustics, Speech, and Signal Processing, vol. ASSP-35, No. 3, Mar. 1987, 3 pages.
Kitano, H., "PhiDM-Dialog, An Experimental Speech-to-Speech Dialog Translation System," Jun. 1991 Computer, vol. 24, No. 6, 13 pages.
Klabbers, E., et al., "Reducing Audible Spectral Discontinuities," IEEE Transactions on Speech and Audio Processing, vol. 9, No. 1, Jan. 2001, 13 pages.
Klatt, D. H., "Linguistic Uses of Segmental Duration in English: Acoustic and Perpetual Evidence," Journal of the Acoustical Society of America, vol. 59, No. 5, May 1976, 16 pages.
Kominek, J., et al., "Impact of Durational Outlier Removal from Unit Selection Catalogs," 5th ISCA Speech Synthesis Workshop, Jun. 14-16, 2004, 6 pages.
Kubala, F., et al., "Speaker Adaptation from a Speaker-Independent Training Corpus," International Conference on Acoustics, Speech, and Signal Processing (ICASSP'90), Apr. 3-6, 1990, 4 pages.
Kubala, F., et al., "The Hub and Spoke Paradigm for CSR Evaluation," Proceedings of the Spoken Language Technology Workshop, Mar. 6-8, 1994, 9 pages.
Lee, K.F., "Large-Vocabulary Speaker-Independent Continuous Speech Recognition: The SPHINX System," Apr. 18, 1988, Partial fulfillment of the requirements for the degree of Doctor of Philosophy, Computer Science Department, Carnegie Mellon University, 195 pages.
Lee, L., et al., "A Real-Time Mandarin Dictation Machine for Chinese Language with Unlimited Texts and Very Large Vocabulary," International Conference on Acoustics, Speech and Signal Processing, vol. 1, Apr. 3-6, 1990, 5 pages.
Lee, L, et al., "Golden Mandarin(II)-An Improved Single-Chip Real-Time Mandarin Dictation Machine for Chinese Language with Very Large Vocabulary," 0-7803-0946-4/93 © 1993IEEE, 4 pages.
Lee, L, et al., "Golden Mandarin(II)—An Intelligent Mandarin Dictation Machine for Chinese Character Input with Adaptation/Learning Functions," International Symposium on Speech, Image Processing and Neural Networks, Apr. 13-16, 1994, Hong Kong, 5 pages.
Lee, L., et al., "System Description of Golden Mandarin (I) Voice Input for Unlimited Chinese Characters," International Conference on Computer Processing of Chinese & Oriental Languages, vol. 5, Nos. 3 & 4, Nov. 1991, 16 pages.
Lin, C.H., et al., "A New Framework for Recognition of Mandarin Syllables With Tones Using Sub-syllabic Unites," IEEE International Conference on Acoustics, Speech, and Signal Processing (ICASSP-93), Apr. 27-30, 1993, 4 pages.
Linde, Y., et al., "An Algorithm for Vector Quantizer Design," IEEE Transactions on Communications, vol. 28, No. 1, Jan. 1980, 12 pages.
Liu, F.H., et al., "Efficient Joint Compensation of Speech for the Effects of Additive Noise and Linear Filtering," IEEE International Conference of Acoustics, Speech, and Signal Processing, ICASSP-92, Mar. 23-26, 1992, 4 pages.
Logan, B., "Mel Frequency Cepstral Coefficients for Music Modeling," In International Symposium on Music Information Retrieval, 2000, 2 pages.
Lowerre, B. T., "The-HARPY Speech Recognition System," Doctoral Dissertation, Department of Computer Science, Carnegie Mellon University, Apr. 1976, 20 pages.
Maghbouleh, A., "An Empirical Comparison of Automatic Decision Tree and Linear Regression Models for Vowel Durations," Revised version of a paper presented at the Computational Phonology in Speech Technology workshop, 1996 annual meeting of the Association for Computational Linguistics in Santa Cruz, California, 7 pages.
Markel, J. D., et al., "Linear Prediction of Speech," Springer-Verlag, Berlin Heidelberg New York 1976, 12 pages.
Morgan, B., "Business Objects," (Business Objects for Windows) Business Objects Inc., DBMS Sep. 1992, vol. 5, No. 10, 3 pages.
Mountford, S. J., et al., "Talking and Listening to Computers," The Art of Human-Computer Interface Design, Copyright © 1990 Apple Computer, Inc. Addison-Wesley Publishing Company, Inc., 17 pages.
Murty, K. S. R., et al., "Combining Evidence from Residual Phase and MFCC Features for Speaker Recognition," IEEE Signal Processing Letters, vol. 13, No. 1, Jan. 2006, 4 pages.

(56) References Cited

OTHER PUBLICATIONS

Murveit H. et al., "Integrating Natural Language Constraints into HMM-based Speech Recognition," 1990 International Conference on Acoustics, Speech, and Signal Processing, Apr. 3-6, 1990, 5 pages.
Nakagawa, S., et al., "Speaker Recognition by Combining MFCC and Phase Information," IEEE International Conference on Acoustics Speech and Signal Processing (ICASSP), Mar. 14-19, 2010, 4 pages.
Niesler, T. R., et al., "A Variable-Length Category-Based N-Gram Language Model," IEEE International Conference on Acoustics, Speech, and Signal Processing (ICASSP'96), vol. 1, May 7-10, 1996, 6 pages.
Papadimitriou, C. H., et al., "Latent Semantic Indexing: A Probabilistic Analysis," Nov. 14, 1997, http://citeseerx.ist.psu.edu/messages/downloadsexceeded.html, 21 pages.
Parsons, T. W., "Voice and Speech Processing," Linguistics and Technical Fundamentals, Articulatory Phonetics and Phonemics, © 1987 McGraw-Hill, Inc., ISBN: 0-07-0485541-0, 5 pages.
Parsons, T. W., "Voice and Speech Processing," Pitch and Formant Estimation, © 1987 McGraw-Hill, Inc., ISBN: 0-07-0485541-0, 15 pages.
Picone, J., "Continuous Speech Recognition Using Hidden Markov Models," IEEE ASSP Magazine, vol. 7, No. 3, Jul. 1990, 16 pages.
Rabiner, L. R., et al., "Fundamental of Speech Recognition," © 1993 At&T, Published by Prentice-Hall, Inc., ISBN: 0-13-285826-6, 17 pages.
Rabiner, L. R., et al., "Note on the Properties of a Vector Quantizer for LPC Coefficients," The Bell System Technical Journal, vol. 62, No. 8, Oct. 1983, 9 pages.
Ratcliffe, M., "ClearAccess 2.0 allows SQL searches off-line," (Structured Query Language), ClearAcess Corp., MacWeek Nov. 16, 1992, vol. 6, No. 41, 2 pages.
Remde, J. R., et al., "SuperBook: An Automatic Tool for Information Exploration-Hypertext?," In Proceedings of Hypertext'87 papers, Nov. 13-15, 1987, 14 pages.
Reynolds, C. F., "On-Line Reviews: A New Application of the HICOM Conferencing System," IEE Colloquium on Human Factors in Electronic Mail and Conferencing Systems, Feb. 3, 1989, 4 pages.
Rigoll, G., "Speaker Adaptation for Large Vocabulary Speech Recognition Systems Using Speaker Markov Models," International Conference on Acoustics, Speech, and Signal Processing (ICASSP'89), May 23-26, 1989, 4 pages.
Riley, M. D., "Tree-Based Modelling of Segmental Durations," Talking Machines Theories, Models, and Designs, 1992 © Elsevier Science Publishers B.V., North-Holland, ISBN: 08-444-89115.3, 15 pages.
Rivoira, S., et al., "Syntax and Semantics in a Word-Sequence Recognition System," IEEE International Conference on Acoustics, Speech, and Signal Processing (ICASSP'79), Apr. 1979, 5 pages.
Rosenfeld, R., "A Maximum Entropy Approach to Adaptive Statistical Language Modelling," Computer Speech and Language, vol. 10, No. 3, Jul. 1996, 25 pages.
Roszkiewicz, A., "Extending your Apple," Back Talk—Lip Service, A+ Magazine, The Independent Guide for Apple Computing, vol. 2, No. 2, Feb. 1984, 5 pages.
Sakoe, H., et al., "Dynamic Programming Algorithm Optimization for Spoken Word Recognition," IEEE Transactins on Acoustics, Speech, and Signal Processing, Feb. 1978, vol. ASSP-26 No. 1, 8 pages.
Salton, G., et al., "On the Application of Syntactic Methodologies in Automatic Text Analysis," Information Processing and Management, vol. 26, No. 1, Great Britain 1990, 22 pages.
Savoy, J., "Searching Information in Hypertext Systems Using Multiple Sources of Evidence," International Journal of Man-Machine Studies, vol. 38, No. 6, Jun. 1993, 15 pages.
Scagliola, C., "Language Models and Search Algorithms for Real-Time Speech Recognition," International Journal of Man-Machine Studies, vol. 22, No. 5, 1985, 25 pages.
Schmandt, C., et al., "Augmenting a Window System with Speech Input," IEEE Computer Society, Computer Aug. 1990, vol. 23, No. 8, 8 pages.

Schütze, H., "Dimensions of Meaning," Proceedings of Supercomputing'92 Conference, Nov. 16-20, 1992, 10 pages.
Sheth B., et al., "Evolving Agents for Personalized Information Filtering," In Proceedings of the Ninth Conference on Artificial Intelligence for Applications, Mar. 1-5, 1993, 9 pages.
Shikano, K., et al., "Speaker Adaptation Through Vector Quantization," IEEE International Conference on Acoustics, Speech, and Signal Processing (ICASSP'86), vol. 11, Apr. 1986, 4 pages.
Sigurdsson, S., et al., "Mel Frequency Cepstral Coefficients: An Evaluation of Robustness of MP3 Encoded Music," In Proceedings of the 7th International Conference on Music Information Retrieval (ISMIR), 2006, 4 pages.
Silverman, K. E. A., et al., "Using a Sigmoid Transformation for Improved Modeling of Phoneme Duration," Proceedings of the IEEE International Conference on Acoustics, Speech, and Signal Processing, Mar. 15-19 1999, 5 pages.
Tenenbaum, A.M., et al., "Data Structure Using Pascal," 1981 Prentice-Hall, Inc., 34 pages.
Tsai, W.H., et al., "Attributed Grammar—A Tool for Combining Syntactic and Statistical Approaches to Pattern Recognition," IEEE Transactions on Systems, Man, and Cybernetics, vol. SMC-10, No. 12, Dec. 1980, 13 pages.
Udell, J., "Computer Telephony," BYTE, vol. 19, No. 7, Jul. 1, 1994, 9 pages.
van Santen, J. P. H., "Contextual Effects on Vowel Duration," Journal Speech Communication, vol. 11, No. 6, Dec. 1992, 34 pages.
Vepa, J., et al., "New Objective Distance Measures for Spectral Discontinuities in Concatenative Speech Synthesis," In Proceedings of the IEEE 2002 Workshop on Speech Synthesis, 4 pages.
Verschelde, J., "MATLAB Lecture 8. Special Matrices in MATLAB," Nov. 23, 2005, UIC Dept. of Math., Stat.. & C.S., MCS 320, Introduction to Symbolic Computation, 4 pages.
Vingron, M. "Near-Optimal Sequence Alignment," Deutsches Krebsforschungszentrum (DKFZ), Abteilung Theoretische Bioinformatik, Heidelberg, Germany, Jun. 1996, 20 pages.
Werner, S., et al., "Prosodic Aspects of Speech," Université de Lausanne, Switzerland, 1994, Fundamentals of Speech Synthesis and Speech Recognition: Basic Concepts, State of the Art, and Future Challenges, 18 pages.
Wikipedia, "Mel Scale," Wikipedia, the free encyclopedia, http://en.wikipedia.org/wiki/Mel_scale, 2 pages.
Wikipedia, "Minimum Phase," Wikipedia, the free encyclopedia, http://en.wikipedia.org/wiki/Minimum_phase, 8 pages.
Wolff, M., "Poststructuralism and the ARTFUL Database: Some Theoretical Considerations," Information Technology and Libraries, vol. 13, No. 1, Mar. 1994, 10 pages.
Wu, M., "Digital Speech Processing and Coding," ENEE408G Capstone-Multimedia Signal Processing, Spring 2003, Lecture-2 course presentation, University of Maryland, College Park, 8 pages.
Wu, M., "Speech Recognition, Synthesis, and H.C.I.," ENEE408G Capstone-Multimedia Signal Processing, Spring 2003, Lecture—3 course presentation, University of Maryland, College Park, 11 pages.
Wyle, M. F., "A Wide Area Network Information Filter," In Proceedings of First International Conference on Artificial Intelligence on Wall Street, Oct. 9-11, 1991, 6 pages.
Yankelovich, N., et al., "Intermedia: The Concept and the Construction of a Seamless Information Environment," Computer Magazine, Jan. 1988, © 1988 IEEE, 16 pages.
Yoon, K., et al., "Letter-to-Sound Rules for Korean," Department of Linguistics, The Ohio State University, 2002, 4 pages.
Zhao, Y., "An Acoustic-Phonetic-Based Speaker Adaptation Technique for Improving Speaker-Independent Continuous Speech Recognition," IEEE Transactions on Speech and Audio Processing, vol. 2, No. 3, Jul. 1994, 15 pages.
Zovato, E., et al., "Towards Emotional Speech Synthesis: A Rule Based Approach," 2 pages.
International Search Report dated Nov. 9, 1994, received in International Application No. PCT/US1993/12666, which corresponds to U.S. Appl. No. 07/999,302, 8 pages (Robert Don Strong).
International Preliminary Examination Report dated Mar. 1, 1995, received in International Application No. PCT/US1993/12666, which corresponds to U.S. Appl. No. 07/999,302, 5 pages (Robert Don Strong).

(56) References Cited

OTHER PUBLICATIONS

International Preliminary Examination Report dated Apr. 10, 1995, received in International Application No. PCT/US1993/12637, which corresponds to U.S. Appl. No. 07/999,354, 7 pages (Alejandro Acero).
International Search Report dated Feb. 8, 1995, received in International Application No. PCT/US1994/11011, which corresponds to U.S. Appl. No. 08/129,679, 7 pages (Yen-Lu Chow).
International Preliminary Examination Report dated Feb. 28, 1996, received in International Application No. PCT/US1994/11011, which corresponds to U.S. Appl. No. 08/129,679, 4 pages (Yen-Lu Chow).
Written Opinion dated Aug. 21, 1995, received in International Application No. PCT/US1994/11011, which corresponds to U.S. Appl. No. 08/129,679, 4 pages (Yen-Lu Chow).
International Search Report dated Nov. 8, 1995, received in International Application No. PCT/US1995/08369, which corresponds to U.S. Appl. No. 08/271,639, 6 pages (Peter V. De Souza).
International Preliminary Examination Report dated Oct. 9, 1996, received in International Application No. PCT/US1995/08369, which corresponds to U.S. Appl. No. 08/271,639, 4 pages (Peter V. De Souza).
Agnäs, MS., et al., "Spoken Language Translator: First-Year Report," Jan. 1994, SICS (ISSN 0283-3638), SRI and Telia Research AB, 161 pages.
Allen, J., "Natural Language Understanding," 2nd Edition, Copyright © 1995 by The Benjamin/Cummings Publishing Company, Inc., 671 pages.
Alshawi, H., et al., "CLARE: A Contextual Reasoning and Cooperative Response Framework for the Core Language Engine," Dec. 1992, SRI International, Cambridge Computer Science Research Centre, Cambridge, 273 pages.
Alshawi, H., et al., "Declarative Derivation of Database Queries from Meaning Representations," Oct. 1991, Proceedings of the BANKAI Workshop on Intelligent Information Access, 12 pages.
Alshawi H., et al., "Logical Forms in The Core Language Engine," 1989, Proceedings of the 27th Annual Meeting of the Association for Computational Linguistics, 8 pages.
Alshawi, H., et al., "Overview of the Core Language Engine," Sep. 1988, Proceedings of Future Generation Computing Systems, Tokyo, 13 pages.
Alshawi, H., "Translation and Monotonic Interpretation/Generation," Jul. 1992, SRI International, Cambridge Computer Science Research Centre, Cambridge, 18 pages, http://www.cam.sri.com/tr/crc024/paper.ps.Z_1992.
Appelt, D., et al., "Fastus: A Finite-state Processor for Information Extraction from Real-world Text," 1993, Proceedings of IJCAI, 8 pages.
Appelt, D., et al., "SRI: Description of the JV-FASTUS System Used for MUC-5," 1993, SRI International, Artificial Intelligence Center, 19 pages.
Appelt, D., et al., SRI International Fastus System MUC-6 Test Results and Analysis, 1995, SRI International, Menlo Park, California, 12 pages.
Archbold, A., et al., "A Team User's Guide," Dec. 21, 1981, SRI International, 70 pages.
Bear, J., et al., "A System for Labeling Self-Repairs in Speech," Feb. 22, 1993, SRI International, 9 pages.
Bear, J., et al., "Detection and Correction of Repairs in Human-Computer Dialog," May 5, 1992, SRI International, 11 pages.
Bear, J., et al., "Integrating Multiple Knowledge Sources for Detection and Correction of Repairs in Human-Computer Dialog," 1992, Proceedings of the 30th annual meeting on Association for Computational Linguistics (ACL), 8 pages.
Bear, J., et al., "Using Information Extraction to Improve Document Retrieval," 1998, SRI International, Menlo Park, California, 11 pages.

Berry, P., et al., "Task Management under Change and Uncertainty Constraint Solving Experience with the CALO Project," 2005, Proceedings of CP'05 Workshop on Constraint Solving under Change, 5 pages.
Bobrow, R. et al., "Knowledge Representation for Syntactic/Semantic Processing," From: AAA-80 Proceedings. Copyright © 1980, AAAI, 8 pages.
Bouchou, B., et al., "Using Transducers in Natural Language Database Query," Jun. 17-19, 1999, Proceedings of 4th International Conference on Applications of Natural Language to Information Systems, Austria, 17 pages.
Bratt, H., et al., "The SRI Telephone-based ATIS System," 1995, Proceedings of ARPA Workshop on Spoken Language Technology, 3 pages.
Bulyko, I. et al., "Error-Correction Detection and Response Generation in a Spoken Dialogue System," © 2004 Elsevier B.V., specom. 2004.09.009, 18 pages.
Burke, R., et al., "Question Answering from Frequently Asked Question Files," 1997, AI Magazine, vol. 18, No. 2, 10 pages.
Burns, A., et al., "Development of a Web-Based Intelligent Agent for the Fashion Selection and Purchasing Process via Electronic Commerce," Dec. 31, 1998, Proceedings of the Americas Conference on Information system (AMCIS), 4 pages.
Carter, D., "Lexical Acquisition in the Core Language Engine," 1989, Proceedings of the Fourth Conference of the European Chapter of the Association for Computational Linguistics, 8 pages.
Carter, D., et al., "The Speech-Language Interface in the Spoken Language Translator," Nov. 23, 1994, SRI International, 9 pages.
Chai, J., et al., "Comparative Evaluation of a Natural Language Dialog Based System and a Menu Driven System for Information Access: a Case Study," Apr. 2000, Proceedings of the International Conference on Multimedia Information Retrieval (RIAO), Paris, 11 pages.
Cheyer, A., et al., "Multimodal Maps: An Agent-based Approach," International Conference on Cooperative Multimodal Communication, 1995, 15 pages.
Cheyer, A., et al., "The Open Agent Architecture," Autonomous Agents and Multi-Agent systems, vol. 4, Mar. 1, 2001, 6 pages.
Cheyer, A., et al., "The Open Agent Architecture: Building communities of distributed software agents" Feb. 21, 1998, Artificial Intelligence Center SRI International, Power Point presentation, downloaded from http://www.ai.sri.com/~oaa/, 25 pages.
Codd, E. F., "Databases: Improving Usability and Responsiveness—'How About Recently'," Copyright © 1978, by Academic Press, Inc., 28 pages.
Cohen, P.R., et al., "An Open Agent Architecture," 1994, 8 pages. http://citeseerx.ist.psu.edu/viewdoc/summary?doi=10.1.1.30.480.
Coles, L. S., et al., "Chemistry Question-Answering," Jun. 1969, SRI International, 15 pages.
Coles, L. S., "Techniques for Information Retrieval Using an Inferential Question-Answering System with Natural-Language Input," Nov. 1972, SRI International, 198 Pages.
Coles, L. S., "The Application of Theorem Proving to Information Retrieval," Jan. 1971, SRI International, 21 pages.
Constantinides, P., et al., "A Schema Based Approach to Dialog Control," 1998, Proceedings of the International Conference on Spoken Language Processing, 4 pages.
Cox, R. V., et al., "Speech and Language Processing for Next-Millennium Communications Services," Proceedings of the IEEE, vol. 88, No. 8, Aug. 2000, 24 pages.
Craig, J., et al., "Deacon: Direct English Access and Control," Nov. 7-10, 1966 AFIPS Conference Proceedings, vol. 19, San Francisco, 18 pages.
Dar, S., et al., "DTL's DataSpot: Database Exploration Using Plain Language," 1998 Proceedings of the 24th VLDB Conference, New York, 5 pages.
Davis, Z., et al., "A Personal Handheld Multi-Modal Shopping Assistant," 2006 IEEE, 9 pages.
Decker, K., et al., "Designing Behaviors for Information Agents," The Robotics Institute, Carnegie-Mellon University, paper, Jul. 6, 1996, 15 pages.

(56) References Cited

OTHER PUBLICATIONS

Decker, K., et al., "Matchmaking and Brokering," The Robotics Institute, Carnegie-Mellon University, paper, May 16, 1996, 19 pages.
Dowding, J., et al., "Gemini: A Natural Language System for Spoken-Language Understanding," 1993, Proceedings of the Thirty-First Annual Meeting of the Association for Computational Linguistics, 8 pages.
Dowding, J., et al., "Interleaving Syntax and Semantics in an Efficient Bottom-Up Parser," 1994, Proceedings of the 32nd Annual Meeting of the Association for Computational Linguistics, 7 pages.
Epstein, M., et al., "Natural Language Access to a Melanoma Data Base," Sep. 1978, SRI International, 7 pages.
Exhibit 1, "Natural Language Interface Using Constrained Intermediate Dictionary of Results," Classes/Subclasses Manually Reviewed for the Search of U.S. Patent No. 7,177,798, Mar. 22, 2013, 1 page.
Exhibit 1, "Natural Language Interface Using Constrained Intermediate Dictionary of Results," List of Publications Manually reviewed for the Search of U.S. Patent No. 7,177,798, Mar. 22, 2013, 1 page.
Ferguson, G., et al., "TRIPS: An Integrated Intelligent Problem-Solving Assistant," 1998, Proceedings of the Fifteenth National Conference on Artificial Intelligence (AAAI-98) and Tenth Conference on Innovative Applications of Artificial Intelligence (IAAI-98), 7 pages.
Fikes, R., et al., "A Network-based knowledge Representation and its Natural Deduction System," Jul. 1977, SRI International, 43 pages.
Gambäck, B., et al., "The Swedish Core Language Engine," 1992 NOTEX Conference, 17 pages.
Glass, J., et al., "Multilingual Language Generation Across Multiple Domains," Sep. 18-22, 1994, International Conference on Spoken Language Processing, Japan, 5 pages.
Green, C. "The Application of Theorem Proving to Question-Answering Systems," Jun. 1969, SRI Stanford Research Institute, Artificial Intelligence Group, 169 pages.
Gregg, D. G., "DSS Access on the WWW: An Intelligent Agent Prototype," 1998 Proceedings of the Americas Conference on Information Systems-Association for Information Systems, 3 pages.
Grishman, R., "Computational Linguistics: An Introduction," © Cambridge University Press 1986, 172 pages.
Grosz, B. et al., "Dialogic: A Core Natural-Language Processing System," Nov. 9, 1982, SRI International, 17 pages.
Grosz, B. et al., "Research on Natural-Language Processing at SRI," Nov. 1981, SRI International, 21 pages.
Grosz, B., et al., "TEAM: An Experiment in the Design of Transportable Natural-Language Interfaces," Artificial Intelligence, vol. 32, 1987, 71 pages.
Grosz, B., "Team: A Transportable Natural-Language Interface System," 1983, Proceedings of the First Conference on Applied Natural Language Processing, 7 pages.
Guida, G., et al., "NLI: A Robust Interface for Natural Language Person-Machine Communication," Int. J. Man-Machine Studies, vol. 17, 1982, 17 pages.
Guzzoni, D., et al., "Active, A platform for Building Intelligent Software," Computational Intelligence 2006, 5 pages. http://www.informatik.uni-trier.de/~ley/pers/hd/g/Guzzoni:Didier.
Guzzoni, D., "Active: A unified platform for building intelligent assistant applications," Oct. 25, 2007, 262 pages.
Guzzoni, D., et al., "Many Robots Make Short Work," 1996 AAAI Robot Contest, SRI International, 9 pages.
Haas, N., et al., "An Approach to Acquiring and Applying Knowledge," Nov. 1980, SRI International, 22 pages.
Hadidi, R., et al., "Students' Acceptance of Web-Based Course Offerings: An Empirical Assessment," 1998 Proceedings of the Americas Conference on Information Systems (AMCIS), 4 pages.
Hawkins, J., et al., "Hierarchical Temporal Memory: Concepts, Theory, and Terminology," Mar. 27, 2007, Numenta, Inc., 20 pages.
He, Q., et al., "Personal Security Agent: KQML-Based PKI," The Robotics Institute, Carnegie-Mellon University, paper, Oct. 1, 1997, 14 pages.

Hendrix, G. et al., "Developing a Natural Language Interface to Complex Data," ACM Transactions on Database Systems, vol. 3, No. 2, Jun. 1978, 43 pages.
Hendrix, G., "Human Engineering for Applied Natural Language Processing," Feb. 1977, SRI International, 27 pages.
Hendrix, G., "Klaus: A System for Managing Information and Computational Resources," Oct. 1980, SRI International, 34 pages.
Hendrix, G., "Lifer: A Natural Language Interface Facility," Dec. 1976, SRI Stanford Research Institute, Artificial Intelligence Center, 9 pages.
Hendrix, G., "Natural-Language Interface," Apr.-Jun. 1982, American Journal of Computational Linguistics, vol. 8, No. 2, 7 pages.
Hendrix, G., "The Lifer Manual: A Guide to Building Practical Natural Language Interfaces," Feb. 1977, SRI International, 76 pages.
Hendrix, G., et al., "Transportable Natural-Language Interfaces to Databases," Apr. 30, 1981, SRI International, 18 pages.
Hirschman, L., et al., "Multi-Site Data Collection and Evaluation in Spoken Language Understanding," 1993, Proceedings of the workshop on Human Language Technology, 6 pages.
Hobbs, J., et al., "Fastus: A System for Extracting Information from Natural-Language Text," Nov. 19, 1992, SRI International, Artificial Intelligence Center, 26 pages.
Hobbs, J., et al.,"Fastus: Extracting Information from Natural-Language Texts," 1992, SRI International, Artificial Intelligence Center, 22 pages.
Hobbs, J., "Sublanguage and Knowledge," Jun. 1984, SRI International, Artificial Intelligence Center, 30 pages.
Hodjat, B., et al., "Iterative Statistical Language Model Generation for Use with an Agent-Oriented Natural Language Interface," vol. 4 of the Proceedings of HCI International 2003, 7 pages.
Huang, X., et al., "The SPHINX-II Speech Recognition System: An Overview," Jan. 15, 1992, Computer, Speech and Language, 14 pages.
Issar, S., et al., "CMU's Robust Spoken Language Understanding System," 1993, Proceedings of EUROSPEECH, 4 pages.
Issar, S., "Estimation of Language Models for New Spoken Language Applications," Oct. 3-6, 1996, Proceedings of 4th International Conference on Spoken language Processing, Philadelphia, 4 pages.
Janas, J., "The Semantics-Based Natural Language Interface to Relational Databases," © Springer-Verlag Berlin Heidelberg 1986, Germany, 48 pages.
Johnson, J., "A Data Management Strategy for Transportable Natural Language Interfaces," Jun. 1989, doctoral thesis submitted to the Department of Computer Science, University of British Columbia, Canada, 285 pages.
Julia, L., et al., "http://www.speech.sri.com/demos/atis.html," 1997, Proceedings of AAAI, Spring Symposium, 5 pages.
Kahn, M., et al., "CoABS Grid Scalability Experiments," 2003, Autonomous Agents and Multi-Agent Systems, vol. 7, 8 pages.
Kamel, M., et al., "A Graph Based Knowledge Retrieval System," © 1990 IEEE, 7 pages.
Katz, B., "Annotating the World Wide Web Using Natural Language," 1997, Proceedings of the 5th RIAO Conference on Comouter Assisted Information Searching on the Internet, 7 pages.
Katz, B., "A Three-Step Procedure for Language Generation," Dec. 1980, Massachusetts Institute of Technology, Artificial Intelligence Laboratory, 42 pages.
Katz, B., et al., "Exploiting Lexical Regularities in Designing Natural Language Systems," 1988, Proceedings of the 12th International Conference on Computational Linguistics, Coling'88, Budapest, Hungary, 22 pages.
Katz, B., et al., "REXTOR: A System for Generating Relations from Natural Language," In Proceedings of the ACL Oct. 2000 Workshop on Natural Language Processing and Information Retrieval (NLP &IR), 11 pages.
Katz, B., "Using English for Indexing and Retrieving," 1988 Proceedings of the 1st RIAO Conference on User-Oriented Content-Based Text and Image (RIAO'88), 19 pages.
Konolige, K., "A Framework for a Portable Natural-Language Interface to Large Data Bases," Oct. 12, 1979, SRI International, Artificial Intelligence Center, 54 pages.

(56) References Cited

OTHER PUBLICATIONS

Laird, J., et al., "SOAR: An Architecture for General Intelligence," 1987, Artificial Intelligence vol. 33, 64 pages.

Langly, P., et al.,"A Design for the Icarus Architechture," SIGART Bulletin, vol. 2, No. 4, 6 pages.

Larks, "Intelligent Software Agents: Larks," 2006, downloaded on Mar. 15, 2013 from http://www.cs.cmu.edu/larks.html, 2 pages.

Martin, D., et al., "Building Distributed Software Systems with the Open Agent Architecture," Mar. 23-25, 1998, Proceedings of the Third International Conference on the Practical Application of Intelligent Agents and Multi-Agent Technology, 23 pages.

Martin, D., et al., "Development Tools for the Open Agent Architecture," Apr. 1996, Proceedings of the International Conference on the Practical Application of Intelligent Agents and Multi-Agent Technology, 17 pages.

Martin, D., et al., "Information Brokering in an Adent Architecture," April, 1997, Proceedings of the second International Conference on the Practical Application of Intelligent Agents and Multi-Agent Technology, 20 pages.

Martin, D., et al., "PAAM '98 Tutorial: Building and Using Practical Agent Applications," 1998, SRI International, 78 pages.

Martin, P., et al., "Transportability and Generality in a Natural-Language Interface System," Aug. 8-12, 1983, Proceedings of the Eight International Joint Conference on Artificial Intelligence, West Germany, 21 pages.

Matiasek, J., et al., "Tamic-P: A System for NL Access to Social Insurance Database," Jun. 17-19, 1999, Proceeding of the 4th International Conference on Applications of Natural Language to Information Systems, Austria, 7 pages.

Michos, S.E., et al., "Towards an adaptive natural language interface to command languages," Natural Language Engineering 2 (3), © 1994 Cambridge University Press, 19 pages.

Milstead, J., et al., "Metadata: Cataloging by Any Other Name . . . " Jan. 1999, Online, Copyright © 1999 Information Today, Inc., 18 pages.

Minker, W., et al., "Hidden Understanding Models for Machine Translation," 1999, Proceedings of ETRW on Interactive Dialogue in Multi-Modal Systems, 4 pages.

Modi, P. J., et al., "CMRadar: A Personal Assistant Agent for Calendar Management," © 2004, American Association for Artificial Intelligence, Intelligent Systems Demonstrations, 2 pages.

Moore, R., et al., "Combining Linguistic and Statistical Knowledge Sources in Natural-Language Processing for ATIS," 1995, SRI International, Artificial Intelligence Center, 4 pages.

Moore, R., "Handling Complex Queries in a Distributed Data Base," Oct. 8, 1979, SRI International, Artificial Intelligence Center, 38 pages.

Moore, R., "Practical Natural-Language Processing by Computer," Oct. 1981, SRI International, Artificial Intelligence Center, 34 pages.

Moore, R., et al., "SRI's Experience with the ATIS Evaluation," Jun. 24-27, 1990, Proceedings of a workshop held at Hidden Valley, Pennsylvania, 4 pages.

Moore, et al., "The Information Warefare Advisor: An Architecture for Interacting with Intelligent Agents Across the Web," Dec. 31, 1998 Proceedings of Americas Conference on Information Systems (AMCIS), 4 pages.

Moore, R., "The Role of Logic in Knowledge Representation and Commonsense Reasoning," Jun. 1982, SRI International, Artificial Intelligence Center, 19 pages.

Moore, R., "Using Natural-Language Knowledge Sources in Speech Recognition," Jan. 1999, SRI International, Artificial Intelligence Center, 24 pages.

Moran, D., et al., "Intelligent Agent-based User Interfaces," Oct. 12-13, 1995, Proceedings of International Workshop on Human Interface Technology, University of Aizu, Japan, 4 pages. http://www.dougmoran.com/dimoran/PAPERS/oaa-iwhit1995.pdf.

Moran, D., "Quantifier Scoping in the SRI Core Language Engine," 1988, Proceedings of the 26th annual meeting on Association for Computational Linguistics, 8 pages.

Motro, A., "Flex: A Tolerant and Cooperative User Interface to Databases," IEEE Transactions on Knowledge and Data Engineering, vol. 2, No. 2, Jun. 1990, 16 pages.

Murveit, H., et al., "Speech Recognition in SRI's Resource Management and ATIS Systems," 1991, Proceedings of the workshop on Speech and Natural Language (HTL'91), 7 pages.

Oaa, "The Open Agent Architecture 1.0 Distribution Source Code," Copyright 1999, SRI International, 2 pages.

Odubiyi, J., et al., "SAIRE—a scalable agent-based information retrieval engine," 1997 Proceedings of the First International Conference on Autonomous Agents, 12 pages.

Owei, V., et al., "Natural Language Query Filtration in the Conceptual Query Language," © 1997 IEEE, 11 pages.

Pannu, A., et al., "A Learning Personal Agent for Text Filtering and Notification," 1996, The Robotics Institute School of Computer Science, Carnegie-Mellon University, 12 pages.

Pereira, "Logic for Natural Language Analysis," Jan. 1983, SRI International, Artificial Intelligence Center, 194 pages.

Perrault, C.R., et al., "Natural-Language Interfaces," Aug. 22, 1986, SRI International, 48 pages.

Pulman, S.G., et al., "Clare: A Combined Language and Reasoning Engine," 1993, Proceedings of JFIT Conference, 8 pages. URL: http://www.cam.sri.com/tr/crc042/paper.ps.Z.

Ravishankar, "Efficient Algorithms for Speech Recognition," May 15, 1996, Doctoral Thesis submitted to School of Computer Science, Computer Science Division, Carnegie Mellon University, Pittsburg, 146 pages.

Rayner, M., et al., "Adapting the Core Language Engine to French and Spanish," May 10, 1996, Cornell University Library, 9 pages. http://arxiv.org/abs/cmp-Ig/9605015.

Rayner, M., "Abductive Equivalential Translation and its application to Natural Language Database Interfacing," Sep. 1993 Dissertation paper, SRI International, 163 pages.

Rayner, M., et al., "Deriving Database Queries from Logical Forms by Abductive Definition Expansion," 1992, Proceedings of the Third Conference on Applied Natural Language Processing, ANLC'92, 8 pages.

Rayner, M., "Linguistic Domain Theories: Natural-Language Database Interfacing from First Principles," 1993, SRI International, Cambridge, 11 pages.

Rayner, M., et al., "Spoken Language Translation With Mid-90's Technology: A Case Study," 1993, EUROSPEECH, ISCA, 4 pages. http://dblp.uni-trier.de/db/conf/interspeech/eurospeech1993. html#RaynerBCCDGKKLPPS93.

Rudnicky, A.I., et al., "Creating Natural Dialogs in the Carnegie Mellon Communicator System,".

Russell, S., et al., "Artificial Intelligence, A Modern Approach," © 1995 Prentice Hall, Inc., 121 pages.

Sacerdoti, E., et al., "A Ladder User's Guide (Revised)," Mar. 1980, SRI International, Artificial Intelligence Center, 39 pages.

Sagalowicz, D., "A D-Ladder User's Guide," Sep. 1980, SRI International, 42 pages.

Sameshima, Y., et al., "Authorization with security attributes and privilege delegation Access control beyond the ACL," Computer Communications, vol. 20, 1997, 9 pages.

San-Segundo, R., et al., "Confidence Measures for Dialogue Management in the CU Communicator System," Jun. 5-9, 2000, Proceedings of Acoustics, Speech, and Signal Processing (ICASSP'00), 4 pages.

Sato, H., "A Data Model, Knowledge Base, and Natural Language Processing for Sharing a Large Statistical Database," 1989, Statistical and Scientific Database Management, Lecture Notes in Computer Science, vol. 339, 20 pages.

Schnelle, D., "Context Aware Voice User Interfaces for Workflow Support," Aug. 27, 2007, Dissertation paper, 254 pages.

Sharoff, S., et al., "Register-domain Separation as a Methodology for Development of Natural Language Interfaces to Databases," 1999, Proceedings of Human-Computer Interaction (Interact'99), 7 pages.

Shimazu, H., et al., "CAPIT: Natural Language Interface Design Tool with Keyword Analyzer and Case-Based Parser," NEC Research & Development, vol. 33, No. 4, Oct. 1992, 11 pages.

Shinkle, L., "Team User's Guide," Nov. 1984, SRI International, Artificial Intelligence Center, 78 pages.

(56) References Cited

OTHER PUBLICATIONS

Shklar, L., et al., "Info Harness: Use of Automatically Generated Metadata for Search and Retrieval of Heterogeneous Information," 1995 Proceedings of CAiSE'95, Finland,.

Singh, N., "Unifying Heterogeneous Information Models," 1998 Communications of the ACM, 13 pages.

SRI2009, "SRI Speech: Products: Software Development Kits: EduSpeak," 2009, 2 pages, available at http://web.archive.org/web/20090828084033/http://www.speechatsri.com/products/eduspeak.shtml.

Starr, B., et al., "Knowledge-Intensive Query Processing," May 31, 1998, Proceedings of the 5th KRDB Workshop, Seattle, 6 pages.

Stern, R., et al. "Multiple Approaches to Robust Speech Recognition," 1992, Proceedings of Speech and Natural Language Workshop, 6 pages.

Stickel, "A Nonclausal Connection-Graph Resolution Theorem-Proving Program," 1982, Proceedings of AAAI'82, 5 pages.

Sugumaran, V., "A Distributed Intelligent Agent-Based Spatial Decision Support System," Dec. 31, 1998, Proceedings of the Americas Conference on Information systems (AMCIS), 4 pages.

Sycara, K., et al., "Coordination of Multiple Intelligent Software Agents," International Journal of Cooperative Information Systems (IJCIS), vol. 5, Nos. 2 & 3, Jun. & Sep. 1996, 33 pages.

Sycara, K., et al., "Distributed Intelligent Agents," IEEE Expert, vol. 11, No. 6, Dec. 1996, 32 pages.

Sycara, K., et al., "Dynamic Service Matchmaking Among Agents in Open Information Environments ," 1999, Sigmod Record, 7 pages.

Sycara, K., et al., "The RETSINA MAS Infrastructure," 2003, Autonomous Agents and Multi-Agent Systems, vol. 7, 20 pages.

Tyson, M., et al., "Domain-Independent Task Specification in the TACITUS Natural Language System," May 1990, SRI International, Artificial Intelligence Center, 16 pages.

Wahlster, W., et al., "Smartkom: multimodal communication with a life-like character," 2001 EUROSPEECH—Scandinavia, 7th European Conference on Speech Communication and Technology, 5 pages.

Waldinger, R., et al., "Deductive Question Answering from Multiple Resources," 2003, New Directions in Question Answering, published by AAAI, Menlo Park, 22 pages.

Walker, D., et al., "Natural Language Access to Medical Text," Mar. 1981, SRI International, Artificial Intelligence Center, 23 pages.

Waltz, D., "An English Language Question Answering System for a Large Relational Database," © 1978 ACM, vol. 21, No. 7, 14 pages.

Ward, W., et al., "A Class Based Language Model for Speech Recognition," © 1996 IEEE, 3 pages.

Ward, W., et al., "Recent Improvements in the CMU Spoken Language Understanding System," 1994, ARPA Human Language Technology Workshop, 4 pages.

Ward, W., "The CMU Air Travel Information Service: Understanding Spontaneous Speech," 3 pages.

Warren, D.H.D., et al., "An Efficient Easily Adaptable System for Interpreting Natural Language Queries," Jul.-Dec. 1982, American Journal of Computational Linguistics, vol. 8, No. 3-4, 11 pages.

Weizenbaum, J., "ELIZA—A Computer Program for the Study of Natural Language Communication Between Man and Machine," Communications of the ACM, vol. 9, No. 1, Jan. 1966, 10 pages.

Winiwarter, W., "Adaptive Natural Language Interfaces to FAQ Knowledge Bases," Jun. 17-19, 1999, Proceedings of 4th International Conference on Applications of Natural Language to Information Systems, Austria, 22 pages.

Wu, X. et al., "KDA: A Knowledge-based Database Assistant," Data Engineering, Feb. 6-10, 1989, Proceeding of the Fifth International Conference on Engineering (IEEE Cat. No. 89CH2695-5), 8 pages.

Yang, J., et al., "Smart Sight: A Tourist Assistant System," 1999 Proceedings of Third International Symposium on Wearable Computers, 6 pages.

Zeng, D., et al., "Cooperative Intelligent Software Agents," The Robotics Institute, Carnegie-Mellon University, Mar. 1995, 13 pages.

Zhao, L., "Intelligent Agents for Flexible Workflow Systems," Oct. 31, 1998 Proceedings of the Americas Conference on Information Systems (AMCIS), 4 pages.

Zue, V., et al., "From Interface to Content: Translingual Access and Delivery of On-Line Information," 1997, EUROSPEECH, 4 pages.

Zue, V., et al., "Jupiter: A Telephone-Based Conversational Interface for Weather Information," Jan. 2000, IEEE Transactions on Speech and Audio Processing, 13 pages.

Zue, V., et al., "Pegasus: A Spoken Dialogue Interface for On-Line Air Travel Planning," 1994 Elsevier, Speech Communication 15 (1994), 10 pages.

Zue, V., et al., "The Voyager Speech Understanding System: Preliminary Development and Evaluation," 1990, Proceedings of IEEE 1990 International Conference on Acoustics, Speech, and Signal Processing, 4 pages.

* cited by examiner

General Training Stage

Exemplar Selection Stage

Focused Training Stage

Classification Stage

EXEMPLAR-BASED LATENT PERCEPTUAL MODELING FOR AUTOMATIC SPEECH RECOGNITION

BACKGROUND

This specification relates to natural language processing, and more specifically, to automatic speech recognition.

Speech input received by a speech recognition system is typically a signal captured through a noisy channel, e.g., a microphone in a noisy environment. Automatic speech recognition or speech processing is a computational process for converting a speech signal into a sequence of symbols or tokens in a desired output domain, such as a sequence of known phonemes, syllables, letters, and/or words. In many applications, such as automated dictation and automated digital assistance, accurate and speedy transcription from a voice input to a corresponding word sequence is critical to the quality and effectiveness of the applications.

Statistical acoustic modeling techniques, such as those involving hidden Markov models (HMM) and n-gram modeling, are often used to create the framework for automatic speech recognition. Typically, state of the art acoustic modeling uses numerous parameters to describe the variations in speech in a given language. For example, while English has less than 50 phonemes (elementary units of sound), acoustic models in state-of-the-art systems commonly employ tens to hundreds of thousands of parameters (e.g., Gaussian components) to characterize the variations in real speech samples. The high dimensionality required by the state-of-the-art acoustic models reflects the extreme variability involved in the acoustic realization of the underlying phoneme sequences. As a result of this over-dimensioning, these state-of-the-art systems consume vast computational resources, making them difficult to deploy on a mobile platform, such as a smartphone, without compromising recognition accuracy.

SUMMARY

This specification describes a technique for selecting observation-specific training data (also referred to as "observation-specific exemplars" or "exemplars") from a general training corpus, and then creating, from the observation-specific training data, a focused, observation-specific acoustic model that is tailored to a test observation at hand (e.g., a speech signal to be recognized or classified in an output domain). The focused, observation-specific acoustic model not only improves representation accuracy for the test observation in the acoustic model, but also results in a more parsimonious representation with reduced dimensionality. In some embodiments, the improved representation accuracy may lead to higher confidence level in the recognition result. In addition, the resulting reduction in dimensionality may allow deployment of a speech recognition component on a mobile platform with limited computational resources, without significant compromise to recognition accuracy and/or speed.

In one aspect, a method for recognizing speech in an output domain includes: establishing a global speech recognition model based on an initial set of training data; receiving a plurality of input speech segments to be recognized in the output domain; and for each of the plurality of input speech segments: identifying in the global speech recognition model a respective set of focused training data relevant to the input speech segment; generating a respective focused speech recognition model based on the respective set of focused training data; and providing the respective focused speech recognition model for recognizing the input speech segment in the output domain. In some embodiments, the method further includes: providing the respective focused speech recognition model to a user device for recognizing the input speech segment at the user device.

In some embodiments, the recognition device is a user device, and the plurality of input speech segments have been derived from a speech input received from a user by the user device.

In some embodiments, for at least one of the plurality of input speech segments, the global speech recognition model is a respective focused speech recognition model generated in a previous iteration of the identifying and generating performed for the at least one input speech segment.

In some embodiments establishing the global speech recognition model based on the initial set of training data further includes: generating the initial set of training data from a plurality of training speech samples, the initial set of training data including an initial set of speech segments and an initial set of speech templates; and deriving a global latent space from the initial set of speech segments and the initial set of speech templates. In some embodiments, generating the global latent space further includes: deriving a respective segment-template co-occurrence matrix from the initial set of speech segments and the initial set of speech templates; and performing singular vector decomposition on the respective segment-template co-occurrence matrix to obtain at least one orthonormal basis for the global latent space.

In some embodiments, identifying in the global speech model the respective set of focused training data relevant to the input speech segment further includes: mapping the input speech segment and a set of candidate training data into the global latent space, the set of candidate training data including candidate speech segments and candidate speech templates; and identifying, from the candidate speech segments and candidate speech templates, a plurality of exemplar segments and a plurality of exemplar templates for inclusion in the respective set of focused training data, wherein the exemplar segments and exemplar templates satisfy a threshold degree of similarity to the input speech segment as measured in the global latent space.

In some embodiments, the threshold degree of similarity to the input speech segment is a threshold distance measured from a respective position of the input speech segment in the global latent space.

In some embodiments, the method further includes: generating additional training data from the plurality of training speech samples, the additional training data includes additional speech segments and additional speech templates outside of the initial set of speech segments and the initial set of speech templates.

In some embodiments, the candidate speech segments include at least some of the initial set of speech segments.

In some embodiments, the candidate speech templates include at least some of the initial set of speech templates.

In some embodiments, the candidate speech segments include at least one additional speech segment outside of the initial set of speech segments.

In some embodiments, the candidate speech templates include at least one additional speech template outside of the initial set of speech templates.

In some embodiments, generating the respective focused speech recognition model based on the respective set of focused training data includes: deriving a focused latent space from the plurality of exemplar segments and the plurality of exemplar templates.

In some embodiments, deriving the focused latent space from the plurality of exemplar segments and the plurality of exemplar templates includes: modifying at least one of the pluralities of exemplar templates and exemplar segments based on the pluralities of exemplar segments and exemplar templates; and deriving the focused latent space from the pluralities of exemplar segments and exemplar templates after the modification.

In some embodiments, modifying at least one of the pluralities of exemplar templates and exemplar segments based on the pluralities of exemplar segments and exemplar templates includes: merging two or more of the plurality of exemplar templates into a new exemplar template in the plurality of exemplar template.

In some embodiments, modifying at least one of the pluralities of exemplar templates and exemplar segments based on the pluralities of exemplar segments and exemplar templates includes: generating at least one new exemplar template from the plurality of exemplar segments; and including the at least one new exemplar template in the plurality of exemplar templates.

In some embodiments, modifying at least one of the pluralities of exemplar templates and exemplar segments based on the pluralities of exemplar segments and exemplar templates includes: removing at least one exemplar template from the plurality of exemplar templates.

In some embodiments, generating the respective focused speech recognition model based on the respective set of focused training data includes: deriving a respective segment-template co-occurrence matrix from the pluralities of exemplar segments and exemplar templates in the respective set of focused training data; and performing singular vector decomposition on the respective segment-template co-occurrence matrix to obtain at least one orthonormal basis for the focused latent space.

In some embodiments, the method includes any combinations of the features identified above.

In another aspect, a method for recognizing speech in an output domain includes: receiving a speech input from a user; for each of a plurality of input speech segments in the speech input: receiving a respective focused speech recognition model; and recognizing the input speech segment using the respective focused speech recognition model, where the respective focused speech recognition model is generated based on a respective set of focused training data relevant to the input speech segment, the respective set of focused training data is selected for the input speech segment in a global speech recognition model, and the global speech recognition model is generated based on a set of global training data.

In some embodiments, the method includes any combinations of the features identified above.

The details of one or more implementations of the subject matter described in this specification are set forth in the accompanying drawings and the description below. Other features, aspects, and advantages of the subject matter will become apparent from the description, the drawings, and the claims.

DETAILED DESCRIPTION

Automatic speech recognition is a computational technique for converting a human speech input to a sequence of symbols or tokens that correspond to a sequence of known phonemes, letters, words, or sentences in a natural human language. Automatic speech recognition is used in many software applications in which the linguistic and semantic content of human speech input is used to drive the actions of the software applications. These applications include applications for automated dictation and automated digital assistance, for example.

Figure 1:
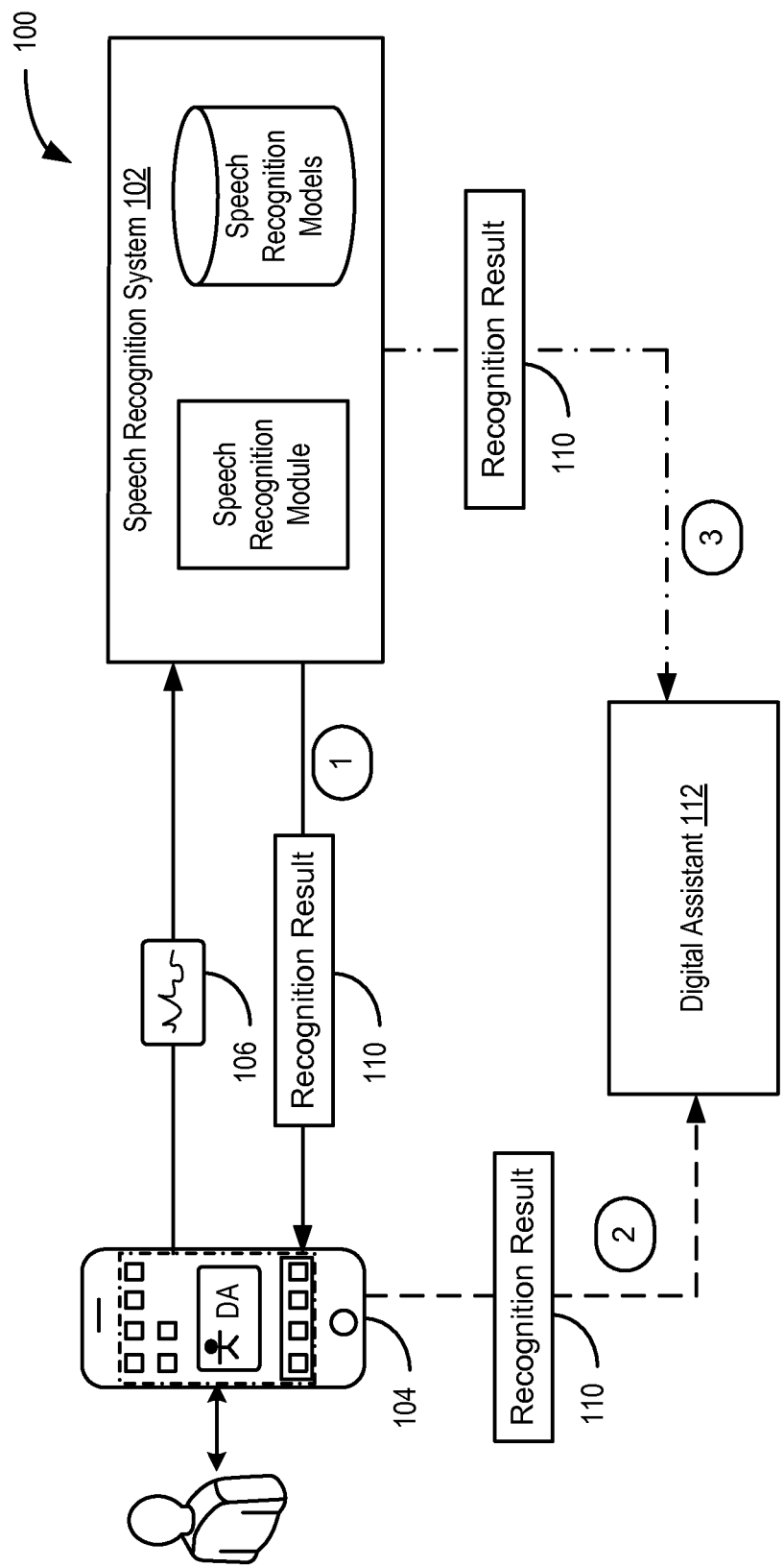
FIG. 1 illustrates an environment in which an exemplary speech recognition system operates in accordance with some embodiments.

FIG. 1 is a block diagram illustrating an exemplary environment 100 in which a speech recognition system 102 operates. In some embodiments, the speech recognition system 102 is implemented in accordance with a client-server model. In the environment 100, a client device 104 captures a speech input received from a user using a transducer, e.g., a microphone coupled to the client device 104. The speech input is converted to an analog or digital speech signal 106 at the client device 104. The analog or digital speech signal 106 represents the raw waveform of the speech input. The client device 104 sends the speech signal 106 to the speech recognition system 102 via one or more networks. The speech recognition system 102 receives the speech signal 106 from the client device 104, and automatically performs speech recognition to generate a corresponding output or recognition result 110, such as recognized text.

In some embodiments, the automatic speech recognition procedure is a classification process that decomposes the speech signal 106 into contributions of different feature components of a statistical model (e.g., a statistical acoustic model) trained on a large corpus of speech samples with known counterpart text and/or phonemes, and determines a likely corresponding recognition result based on the contributions. In some embodiments, the automatic speech recognition procedure is a classification process based on a comparison between the speech signal 106 and a plurality of basic speech signal patterns, otherwise known as templates. In some embodiments, the automatic speech recognition procedure is based on a combination of a statistical model and known templates. In some embodiments, the automatic speech recognition procedure includes multiple recognition levels, e.g., the sub-phoneme or phoneme level, the letter or word level, and the phrase or sentence level, where each level has its own statistical model(s) and recognition process(es).

In some embodiments, as illustrated in FIG. 1, the automatic speech recognition system 102 returns (e.g., shown as path 1 in FIG. 1) the recognition result 110 (e.g., the recognized text) back to the client device 104 through the one or more networks. In some embodiments, the client device 104 presents the recognition result 110 on the client device 104, e.g., as text in a user interface of a dictation application. In some embodiments, the client device 104 forwards (e.g., shown as path 2 in FIG. 1) the recognition result 110 to another system, such as an intelligent digital assistant system 112. After receiving the recognition result 110, the intelligent digital system 112 performs natural language processing and semantic interpretation of the recognition result 110. In some embodiments, instead of returning the recognition result 110 back to the client device 104, the speech recognition system 102 forwards (e.g., shown as path 2 in FIG. 1) the recognition result 110 to another system, such as an intelligent digital assistant system 112, to perform natural language processing and semantic interpretation of the recognition result 110.

FIG. 1 is merely illustrative, and other configurations of an operating environment for the speech recognition system 102 are possible in accordance with various embodiments. For example, although the speech recognition system 102 is shown as a standalone system in FIG. 1, in some embodiments, the speech recognition system 102 is a sub-system of another system. For example, in some embodiments, the speech recognition system 102 is a sub-system of the intelligent digital assistant system 112. In some embodiments, some functions of the speech recognition system 102 are implemented and accomplished on the client device 104 that communicates with a server component of the speech recognition system 102 through one or more networks.

Figure 2:
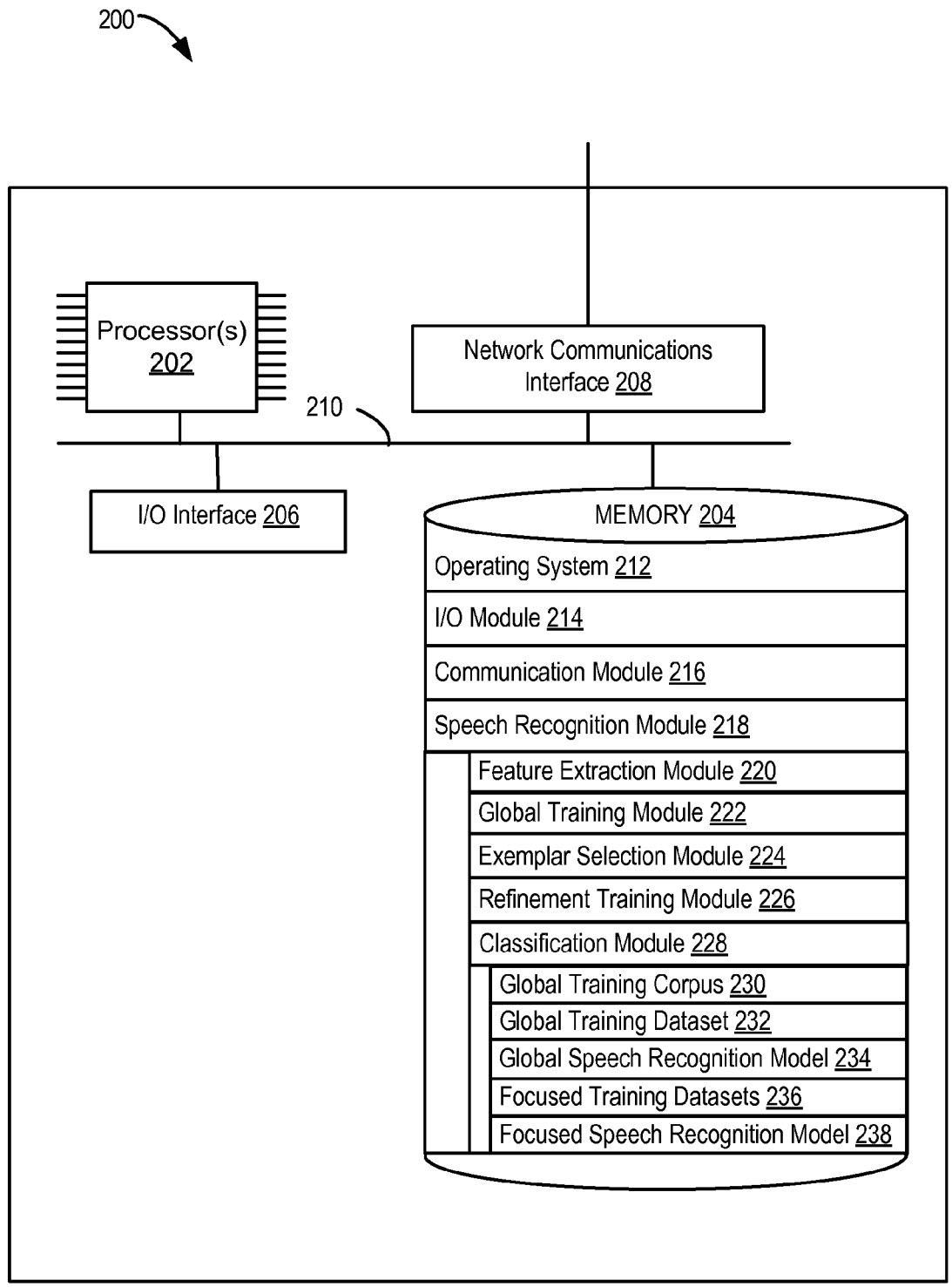
FIG. 2 is a block diagram of an exemplary speech recognition system in accordance with some embodiments.

FIG. 2 is a block diagram of a speech recognition system 200 in accordance with some embodiments. The speech recognition system 200 includes one or more processing units (or "processors") 202, memory 204, an input/output (I/O) interface 206, and a network communications interface 208. These components communicate with one another over one or more communication buses or signal lines 210. In some embodiments, the memory 204, or the computer readable storage media of memory 204, stores programs, modules, instructions, and data structures including all or a subset of: an operating system 212, an I/O module 214, a communication module 216, and a speech recognition module 218. The one or more processors 202 are coupled to the memory 204 and operable to execute these programs, modules, and instructions, and reads/writes from/to the data structures.

In some embodiments, the processing units 202 include one or more microprocessors, such as a single core or multi-core microprocessor. In some embodiments, the processing units 202 include one or more general purpose processors. In some embodiments, the processing units 202 include one or more special purpose processors. In some embodiments, the processing units 202 include one or more personal computers, mobile devices, handheld computers, tablet computers, or one of a wide variety of hardware platforms that contain one or more processing units and run on various operating systems.

In some embodiments, the memory 204 includes high-speed random access memory, such as DRAM, SRAM, DDR RAM or other random access solid state memory devices. In some embodiments the memory 204 includes non-volatile memory, such as one or more magnetic disk storage devices, optical disk storage devices, flash memory devices, or other non-volatile solid state storage devices. In some embodiments, the memory 204 includes one or more storage devices remotely located from the processing units 202. The memory 204, or alternately the non-volatile memory device(s) within the memory 204, comprises a computer readable storage medium.

In some embodiments, the I/O interface 206 couples input/output devices, such as displays, a keyboards, touch screens, speakers, and microphones, to the I/O module 214 of the speech recognition system 200. The I/O interface 206, in conjunction with the I/O module 214, receive user inputs (e.g., voice input, keyboard inputs, touch inputs, etc.) and process them accordingly. The I/O interface 206 and the user interface module 214 also present outputs (e.g., sounds, images, text, etc.) to the user according to various program instructions implemented on the speech recognition system 200.

In some embodiments, the network communications interface 208 includes wired communication port(s) and/or wireless transmission and reception circuitry. The wired communication port(s) receive and send communication signals via one or more wired interfaces, e.g., Ethernet, Universal Serial Bus (USB), FIREWIRE, etc. The wireless circuitry receives and sends RF signals and/or optical signals from/to communications networks and other communications devices. The wireless communications may use any of a plurality of communications standards, protocols and technologies, such as GSM, EDGE, CDMA, TDMA, Bluetooth, Wi-Fi, VoIP, Wi-MAX, or any other suitable communication protocol. The network communications interface 208 enables communication between the speech recognition system 200 with networks, such as the Internet, an intranet and/or a wireless network, such as a cellular telephone network, a wireless local area network (LAN) and/or a metropolitan area network (MAN), and other devices. The communications module 216 facilitates communications between the speech recognition system 200 and other devices over the network communications interface 208.

In some embodiments, the operating system 202 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communications between various hardware, firmware, and software components.

In some embodiments, the speech recognition system 200 is implemented on a standalone computer system. In some embodiments, the speech recognition system 200 is distributed across multiple computers. In some embodiments, some of the modules and functions of the speech recognition system 200 are divided into a server portion and a client portion, where the client portion resides on a user device and communicates with the server portion residing one a server device through one or more networks. It should be noted that the speech recognition system 200 is only one example of a speech recognition system, and that the speech recognition system 200 may have more or fewer components than shown, may combine two or more components, or may have a different configuration or arrangement of the components. The various components shown in FIG. 2 may be implemented in hardware, software, firmware, including one or more signal processing and/or application specific integrated circuits, or a combination of thereof.

As shown in FIG. 2, the speech recognition system 200 stores the speech recognition module 218 in the memory 204. In some embodiments, the speech recognition module 218 further includes the followings sub-modules, or a subset or superset thereof: a feature extraction module 220, global training module 222, an exemplar selection module 224, a refinement training module 226, and a classification module 228. In addition, each of these sub-modules has access to one or more of the following data structures and models of the speech recognition module 218, or a subset or superset thereof: a global training corpus 230, a global training dataset 232, a global speech recognition model 234, one or more focused training datasets 236 (also referred to as "observation-specific training datasets 236" or "sets of observation-specific exemplars 236") that have been selected from the global training dataset 232, and one or more observation-specific, focused speech recognition models 238. More details on the structures, functions, and interactions of the sub-modules and data structures of the speech recognition system 200 are provided with respect to FIGS. 3-6 and accompanying descriptions.

In general, there is a great amount of variations in the speech signals that are generated by different equipment, from speech input uttered by different users, and/or in different acoustic environments. Therefore, a conventional statistical acoustic model for continuous speech recognition commonly comprises tens to hundreds of thousands of Gaussian components. As a result, conventional real-time automatic speech recognition systems require a large amount of computational resources to operate, making them very difficult to deploy on a mobile platform, such as a portable digital assistant device, a smartphone, or a tablet computer.

The exemplar-based latent perceptual modeling technique described herein addresses these issues. Using the exemplar-based latent perceptual modeling technique, a focused, low-dimensionality acoustic model (also referred to as "the focused speech recognition model") is generated for each input signal (e.g., a speech signal) that is to be classified in an output domain (e.g., mapped to corresponding phoneme symbols or text). The input signal to be classified in an output domain is also referred to as an "observation" or "test observation." The focused, low-dimensionality acoustic model is generated from a subset of training data specifically selected from a large set of general training data based on the close similarity between the subset of training data to the input signal according to a general, high-dimensionality acoustic model (also referred to as the "global speech recognition model"). The subset of training data specifically selected for the input signal are also referred to herein as "exemplars" selected for the input signal.

According to the embodiments described herein, the focused, low-dimensionality acoustic model can avoid the built-in averaging that occurs during the training of the general acoustic model based on the general training data. Therefore, the focused, low-dimensionality acoustic model is capable of providing a more accurate representation for the input signal and leading to a higher confidence in the classification result (or recognition result) for the input signal. In addition, the reduced dimensionality of the focused acoustic model allows the focused acoustic model to be deployed with a smaller amount of computational resources than those required by the general acoustic model. Therefore, the exemplar-based latent perceptual modeling technique can be used to implement a real-time speech recognition system that at least partially resides on a mobile platform.

Figure 3:
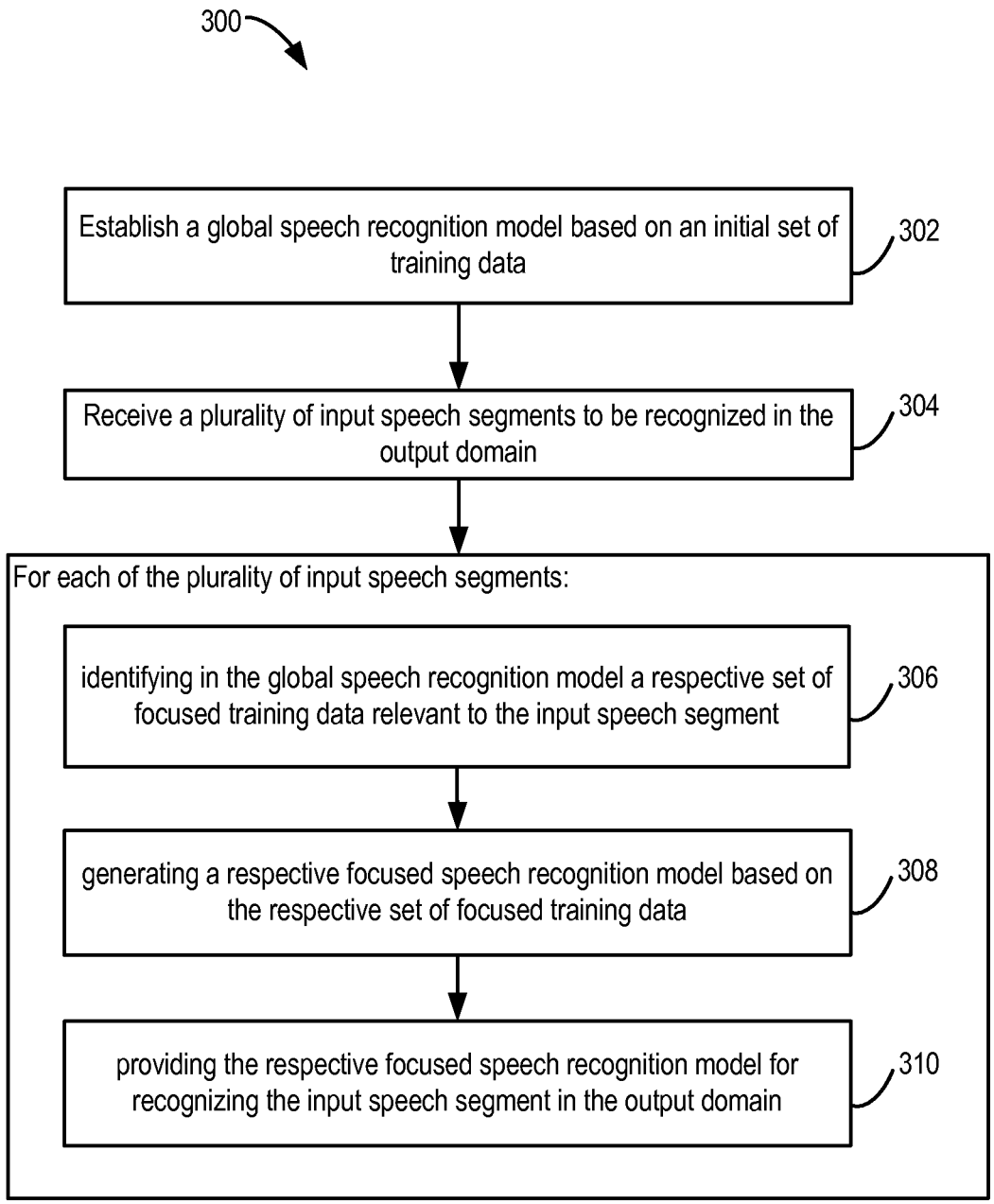
FIG. 3 is a flow chart of an exemplar speech recognition process in accordance with some embodiments.

FIG. 3 is a flow chart of an exemplary speech recognition process 300 implemented by a speech recognition system (e.g., the speech recognition system 102 or the device 200 in FIGS. 1 and 2) in accordance with some embodiments. In some embodiments, the process 300 is implemented on a server component of the speech recognition system (e.g., the speech recognition system 102 or the device 200 in FIGS. 1 and 2). Initially, a global speech recognition model is established (302) based on an initial set of training data. In some embodiments, the initial set of training data are randomly selected from a global training dataset (e.g., the global training dataset 232 of FIG. 2). In some embodiments, a plurality of input speech segments to be recognized by the speech recognition system are received (304). In some embodiments, the plurality of input speech segments are received from a user device (e.g., the client device 104 of FIG. 1). In some embodiments, a speech input is received from the user device, and the server component of the speech recognition system divides the speech input into a sequence of short speech segments of a predetermined duration, e.g., 10 ms. In some embodiments, the plurality of short speech segments each partially overlaps with a respective preceding segment and a respective succeeding segment. For each of the plurality of speech segments, the following steps are performed by the speech recognition system: (i) a respective set of focused training data relevant to the input speech segment is identified (306) in the global speech recognition model; (ii) a respective focused speech recognition model is generated (308) based on the respective set of focused training data; and (iii) the respective focused speech recognition model is provided (310) to another component of the speech recognition system (e.g., a classification module of the speech recognition system on a server or on a client device) for recognizing the speech input in an output domain.

In some embodiments, the steps (i) and (ii) are performed for more than one iteration, where in each iteration, a new set of focused training data relevant to the input speech segment is identified in the focused speech recognition model generated in a previous iteration.

In some embodiments, establishing the global speech recognition model based on the initial set of training data includes generating an initial set of training speech segments and an initial set of training speech templates from a plurality of training speech samples, and deriving a global latent space from the initial set of training speech segments and the initial set of training speech templates using a latent perceptual mapping (LPM) technique. In the LPM technique, to generate the global latent space, a respective segment-template co-occurrence matrix is derived from the initial set of training speech segments and the initial set of training speech templates, and the orthonormal basis of the global latent space is obtained by performing singular vector decomposition (SVD) on the respective segment-template co-occurrence matrix.

In some embodiments, to identify the respective set of focused training data in the global latent space, the input speech segment and a set of candidate training data are mapped into the global latent space, the candidate training data including a set of candidate training segments and a set of candidate training templates. A plurality of exemplar templates and a plurality of exemplar segments are selected from the candidate training templates and the candidate training segments based on their respective degrees of similarity to the input speech segment as measured in the global latent space. The exemplar segments and the exemplar templates are considered as the training data relevant to the input speech segment in the global latent space. In some embodiments, the exemplar segments and the exemplar templates are selected based on a threshold degree of similarity to the input speech segment as measured in the global latent space. In some embodiments, the threshold degree of similarity is a threshold distance measured from a respective position of the input speech segment in the global latent space.

In some embodiments, to generate the respective focused speech recognition model based on the respective set of focused training data, a focused latent space is derived from the exemplar segments and exemplar templates included in the set of focused training data. In some embodiments, to generate the respective focused speech recognition model based on the respective set of focused training data, a respective focused segment-template co-occurrence matrix is derived from the exemplar segments and the exemplar templates in the respective set of focused training data. Then, singular vector decomposition is performed on the respective focused segment-template co-occurrence matrix is performed to obtain the orthonormal basis for the focused latent space.

Figure 4:
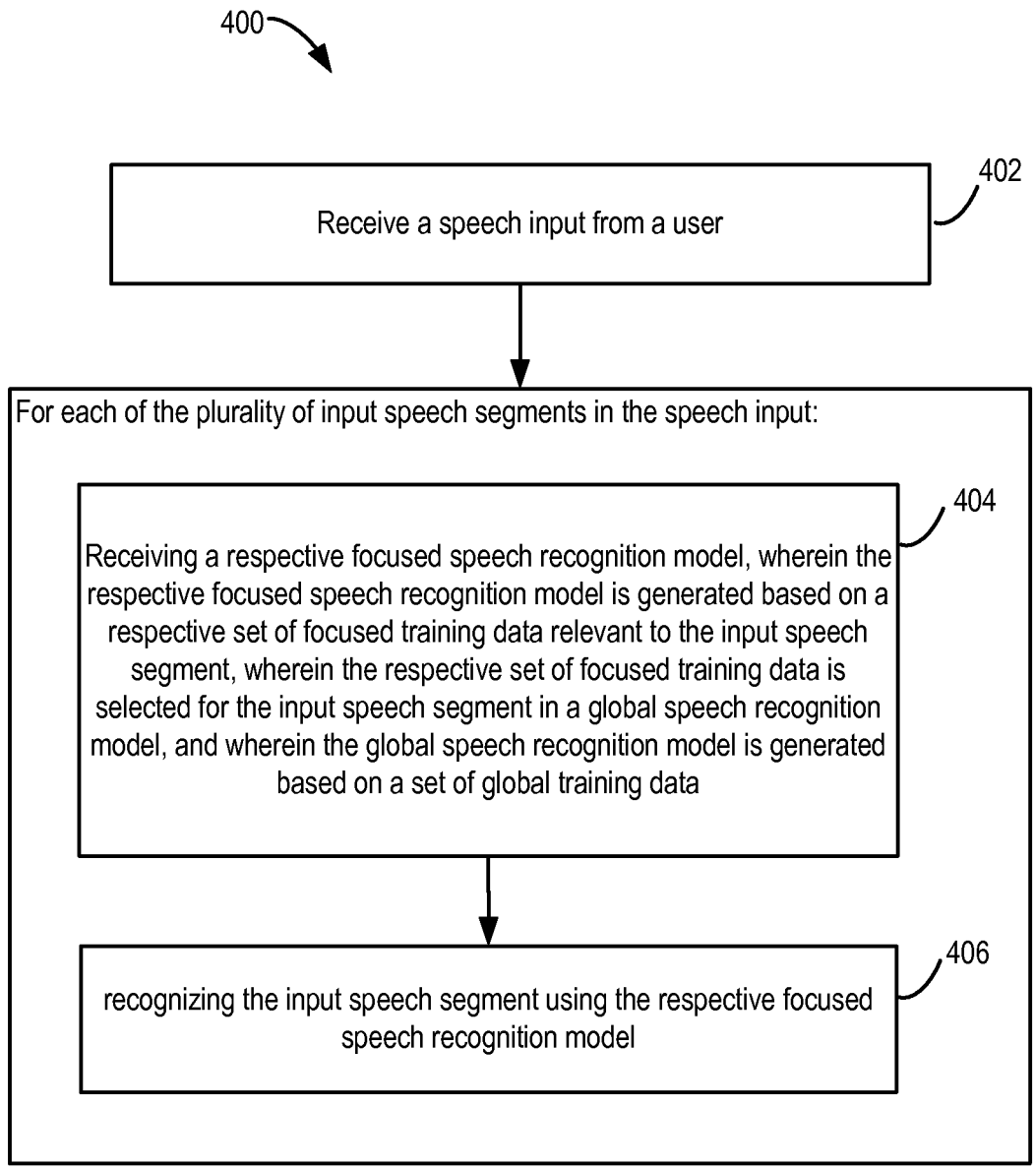
FIG. 4 is a flow chart of another exemplary speech recognition process in accordance with some embodiments.

FIG. 4 is a flow chart of an exemplar process 400 implemented by a speech recognition system (e.g., a client component of the speech recognition system 102 of FIG. 1 or the system 200 in FIG. 2) in accordance with some embodiments. In some embodiments, the process 300 is performed by a server component of the speech recognition system, and the process 400 is performed by a client component of the speech recognition system. In some embodiments, the client component resides on a user device (e.g., the user device 104 of FIG. 1), and communicates with the server component residing on a server device through one or more networks.

In some embodiments, in the process 400, a speech input is received (402) from a user at a user device. In some embodiments, the speech input is provided to a server by the user device. In some embodiments, the speech input is divided into a plurality of input speech segments of shorter durations (e.g., 10 ms). For each of the plurality of input speech segments derived from the speech input, a respective focused speech recognition model is received (404) from the server. In some embodiments, the respective focused speech recognition model is derived from a global speech recognition model and tailored for the particular input speech segment. In some embodiments, the focused speech recognition model is derived on the server by: identifying, from a general training corpus, training data that are relevant to the particular input speech segment; and generating the focused latent space from the identified training data. For example, the focused speech recognition model can be derived by the server using the steps 306 and 308 of the process 300. In some embodiments, the speech input segment is classified/recognized (406) using the focused speech recognition model on the client device.

FIGS. 3 and 4 set forth some basic processes that can be performed by a speech recognition system. More details of the processes are provided with respect to FIGS. 5A-5D, and 6. The training process of the speech recognition system includes at least a general training stage (shown in FIG. 5A), an exemplar selection stage (shown in FIG. 5B), and a focused training stage (shown in FIG. 5C).

As will be described in more details with respect to each of FIGS. 5A-5D, in some embodiments, during the general training stage, a global speech recognition model (e.g., the global speech recognition model 234 of FIG. 2) is generated from a set of general training data (e.g., the global training dataset 232 of FIG. 2). The global speech recognition model is shown as the global latent space 512 in FIG. 5A. In some embodiments, during the exemplar selection stage, an observation-specific training dataset (e.g., an observation-specific, focused training dataset 236 of FIG. 2) is selected from the global training dataset for a particular test observation (e.g., a newly received speech signal from a user), as shown in FIG. 5B. In some embodiments, after the observation-specific focused training dataset has been selected for the particular test observation, a focused, observation-specific speech recognition model tailored for classifying the particular test observation is generated from the observation-specific training dataset during the focused training stage. FIG. 5C illustrates some basic processes that occur during the focused training stage in accordance with some embodiments.

In some embodiments, after the focused, observation-specific speech recognition model (e.g., an observation-specific speech module 238 of FIG. 2, also shown as the focused latent space 568 in FIG. 5C) has been generated, the test-observation is classified by applying the focused, observation-specific speech recognition model to the test observation. FIG. 5D illustrates some basic processes that occur during the classification stage in accordance with some embodiments. In some embodiments, the classification stage occurs on a client component of the speech recognition system.

More details of the training and classification processes of the automatic speech recognition system are provided below with respect to each of FIGS. 5A-5D.

Figure 5A:
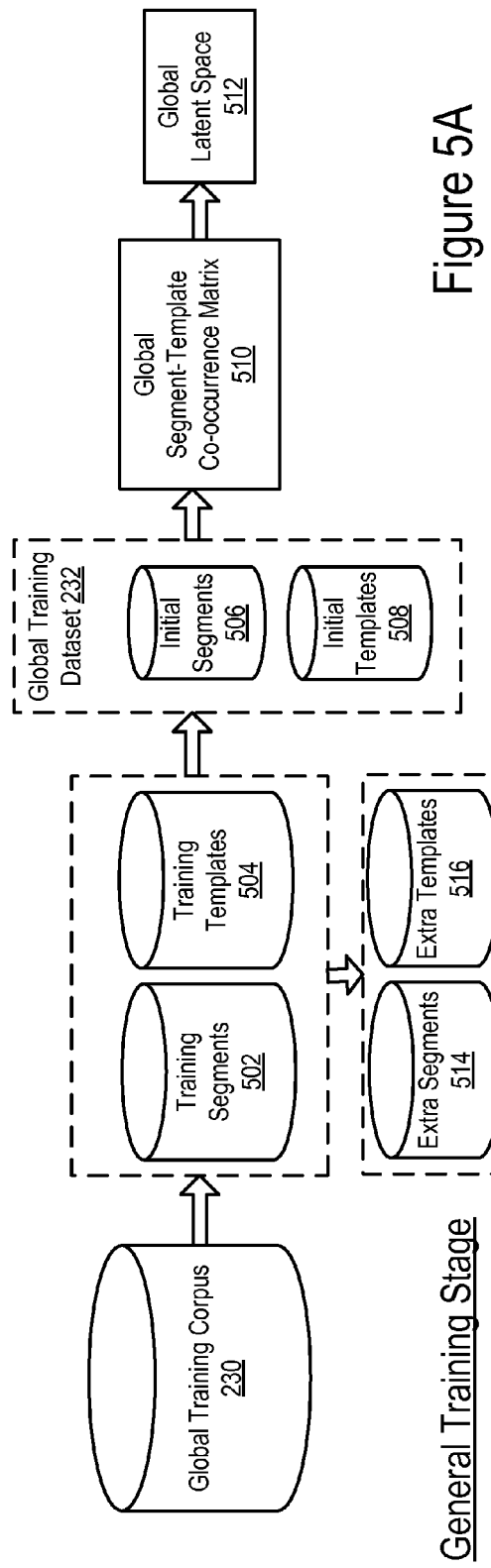
FIGS. 5A-5D are block diagrams illustrating a global training process, an exemplar selection process, a refinement training process, and a classification process of an exemplary speech recognition system in accordance with some embodiments.
Figure 5B:
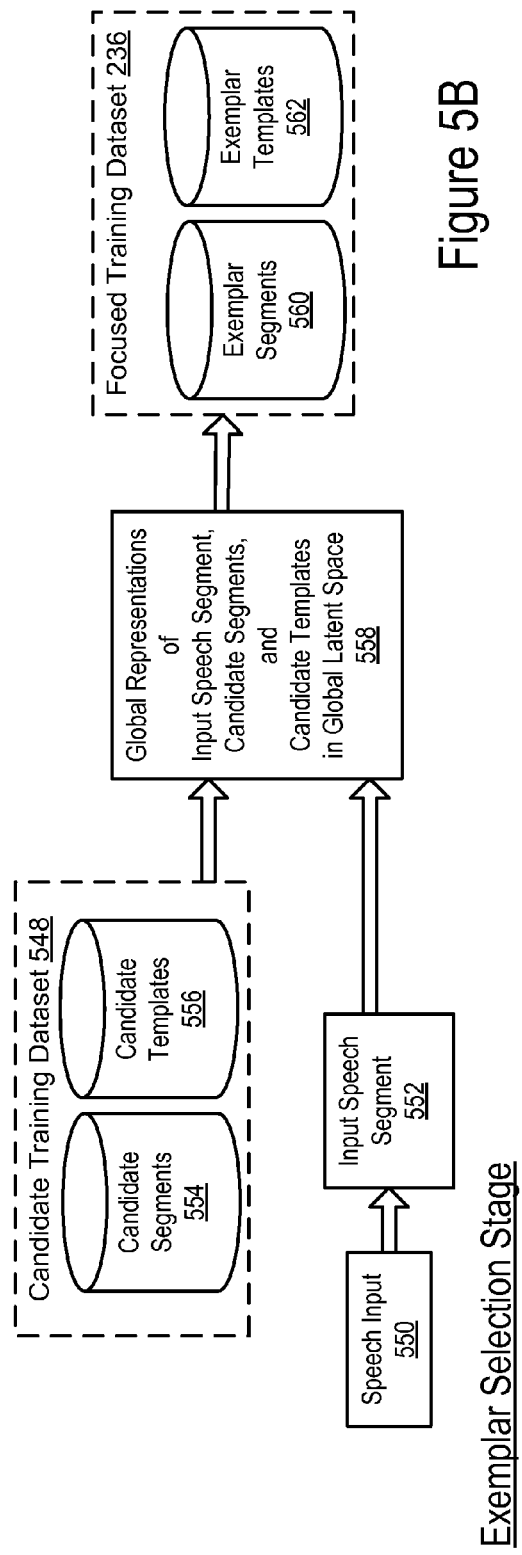
Figure 5C:
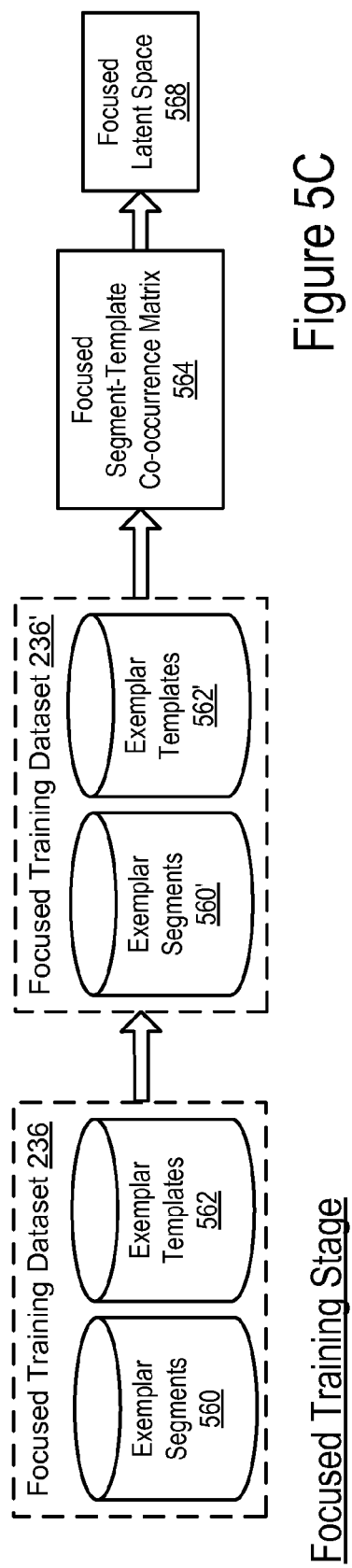
Figure 5D:
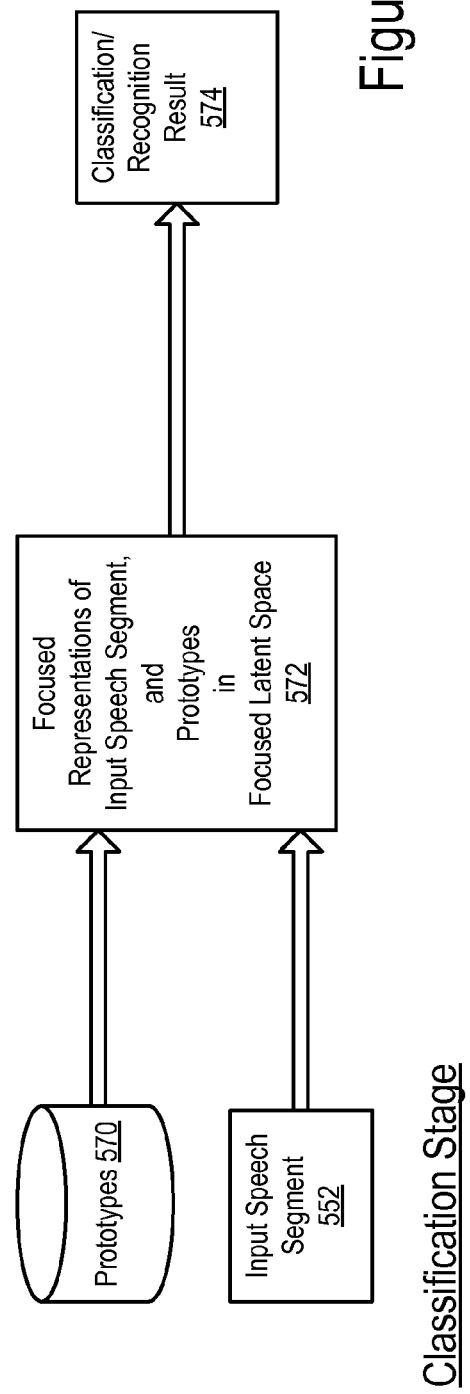

In FIG. 5A, the global training corpus 230 includes speech samples that have corresponding known counterparts in an output domain, such as a domain of textual representations for known phonemes, syllables, words, and/or sentences, etc. In some embodiments, the global training corpus 230 includes tens of thousands of training speech samples in their raw waveforms.

In some embodiments, a feature extraction module (e.g., feature extraction module 220 of FIG. 2) of the speech recognition system preprocesses the raw speech samples in the global training corpus 230, subdivides each long training sample into a sequence of shorter samples, e.g., samples of 20 millisecond durations or samples of 10 millisecond durations. In some embodiments, each of these shorter speech samples is converted (or "vector quantized") into a respective sequence of symbols according to a codebook, where the codebook provides a unique symbol for each of a plurality of acoustic characteristics that can be found in various speech segments. These vector quantized speech samples are training speech segments 502 derived from the global training corpus 230. In some embodiments, the training speech segments 502 are stored in the global training corpus 230. Various techniques known in the art can be used to produce the training speech segments 502 from the raw speech samples in the global training corpus 230.

In some embodiments, the feature extraction module also identifies a set of repeated patterns that reoccur in the training speech segments 302. These repeated patterns are designated as the training speech templates 504 derived from the global training corpus 230. In some embodiments, the training speech templates 504 typically have a shorter duration than the training speech segments 502. In some embodiments, each training speech segment is divided into one or more n-gram units and each n-gram unit corresponds to a subsequence of n symbols in the training speech segment (e.g., 1<n<20). In some embodiments, the n-gram units obtained from all of the training speech segments 502 are ranked based on at least their indexing power (e.g., how frequently the n-gram unit reoccurs in the training speech segments 502) and the respective lengths of the n-gram unit. In some embodiments, only a predetermined number of top-ranked n-gram units are selected as the training speech templates 504. In some embodiments, the training speech templates 504 are stored in the global training corpus 230. Various techniques known in the art can be used to produce the training speech templates 504 from the training speech segments 502 in the global training corpus 230.

More details on the selection and derivation of templates and segments based on raw speech samples are provided in a paper titled "*Latent Perceptual Mapping With Data-Driven Variable-Length Acoustic Units for Template-Based Speech Recognition*" by Shiva Sundaram and Jerome R. Bellegarda, published in *Proc. ICASSP* 2012, *Kyoto, Japan, March* 2012. The entirety of the paper is incorporated by reference herein.

In some embodiments, an initial set of training speech segments 506 and an initial set of training speech templates 508 are selected as the general or global training data 232 for a generally-applicable speech recognition model, also referred to as a "global speech recognition model." In some embodiments, training speech segments that are not included in the initial set of training speech segments 506 are saved as extra training segments 514 for later use. In some embodiments, training speech templates that are not included in the initial set of training speech templates 508 are saved as extra training templates 516 for later use. In some embodiments, the initial set of training speech templates 508 are selected from a set of n-gram units based on their respective ranking score calculated based on their indexing power and lengths, and at least some of the n-gram units not included in the initial set of training speech templates are saved as the extra templates 516.

In some embodiments, as shown in FIG. 5A, after the initial set of training speech segments 506 and the initial set of training speech templates 508 have been derived from the training samples in the global training corpus 230, a global segment-template co-occurrence matrix 510 is generated from the initial set of training speech segments 506 and the initial set of training speech templates 508 by the global training module 222 of FIG. 2.

In some embodiments, if there are N unique templates in the initial set of training speech templates 508 (denoted as $\{N_T\}$), and M unique segments in the initial set of training speech segments 506 (denoted as $\{M_S\}$), the global co-occurrence matrix 510 is a matrix $\tilde{F}$ with M×N dimensions. In some embodiments, the global co-occurrence matrix 510 is calculated by counting the number of times each template in $\{N_T\}$ appears in the $m^{th}$ segment in the initial set of training speech segments $\{M_S\}$. In some embodiments, a segment is considered to contain a particular template if the particular template is most similar to a particular unit of the segment as compared to all other templates in the initial set of training speech templates $\{N_T\}$. In other words, the $(m, n)^{th}$ entry of the co-occurrence matrix $\tilde{F}$ is obtained as follows:

$$f(m, n) = \left(\frac{\sum_{j \in A^m} I_n(j)}{\lambda_m}\right) \cdot p_n, \quad (100)$$

where $n \in \{1, 2, \ldots, N\}$.

In the above equation 100, $A^m$ is the $m^{th}$ segment in the initial set of training speech segments $\{M_S\}$, $\lambda_m$ is the total number templates found in $A^m$, and $p_n$ is the $n^{th}$ template in the initial set of training speech templates $\{N_T\}$. In addition, the indicator function $I_n(j)=1$ if and only if the $n^{th}$ template in the initial set of templates $\{N_T\}$ is nearest (most similar) to the $j^{th}$ unit in $A^m$ (the $m^{th}$ segment in set $\{M_S\}$). In some embodiments, dynamic time warping (DTW) with appropriate length normalization is used to determine the value of $I(\cdot)$.

In some embodiments, once the global segment-template co-occurrence matrix 510, denoted as $\tilde{F}$, has been obtained, dimensionality reduction is performed on the global segment-template co-occurrence matrix 510 using single vector decomposition (SVD). As a result, a reduced-rank approximation of the global co-occurrence matrix $\tilde{F}$ is obtained as follows:

$$\tilde{F} \cong \tilde{U}\tilde{S}\tilde{V}^T \quad (200).$$

In the above equation, $\tilde{U}$ is the left singular matrix with row vectors $\tilde{u}_i$ ($1 \leq i \leq M$). The left singular matrix $\tilde{U}$ has M×M dimensions. $\tilde{S}$ is the diagonal matrix of singular values $\tilde{s}_1 \geq \tilde{s}_2 \geq \ldots \geq \tilde{s}_R > 0$. The diagonal matrix $\tilde{S}$ has R×R dimensions. $\tilde{V}$ is the right singular matrix with row vectors $\tilde{v}_j$ ($1 \leq j \leq N$). The right singular matrix $\tilde{V}$ has N×R dimensions. R is the rank of the decomposition and R≤min(M, N). The superscript $^T$ denotes matrix transposition. As is well known, both the left and right singular matrices $\tilde{U}$ and $\tilde{V}$ are column orthonormal, i.e., $\tilde{U}^T\tilde{U}=\tilde{V}^T\tilde{V}=I_R$, where $I_R$ is the identity matrix of order R. Thus, the column vectors of $\tilde{U}$ and $\tilde{V}$ each define an orthonormal basis for the vector space of dimension R spanned by the respective row vectors of $\tilde{U}$ and $\tilde{V}$ (i.e., $\tilde{u}_i$'s and $\tilde{v}_j$'s). The latent vector space derived from the global training dataset 232 as described above with respect to FIG. 5A is also referred to as the "global latent space" in this specification, shown as global latent space 512 in FIG. 5A. The respective row vectors of $\tilde{U}$ and $\tilde{V}$ (i.e., $\tilde{u}_i$'s and the $\tilde{v}_j$'s) encapsulate the acoustic information observed in the global training dataset 232, and represent a global speech recognition model that can be used to recognize speech in accordance with conventional techniques.

Since the $m^{th}$ segment in the initial set of training speech segments 506 is characterized by the $m^{th}$ row of the global co-occurrence matrix $\tilde{F}$, the row vector $\tilde{u}_m\tilde{S}$ characterizes the position of the $m^{th}$ segment in the global latent space 512. Similarly, since the $n^{th}$ template in the initial set of training speech templates 508 is characterized by the $n^{th}$ column of the global co-occurrence matrix $\tilde{F}$, the column vector $\tilde{S}\tilde{v}_n^T$ (or equivalently, the row vector $\tilde{v}_n\tilde{S}$) characterizes the position of the $n^{th}$ template in the global latent space 512.

In some embodiments, the global or general training stage is completed when the singular value decomposition (SVD) of the global co-occurrence matrix 510 is completed by the global training module 222. Conventionally, speech recognition is performed based on the global speech recognition model described by the orthonormal basis of the global latent space 512. For example, an unknown test observation (e.g., a test speech segment) can be recognized (or classified in the output domain) by mapping the unknown observation into the global latent space 512 using a well-known Latent Perceptual Mapping (LPM) "folding in" technique. By gathering the relevant contributions of the N templates to this test observation (e.g., a test segment), it is possible to generate a feature vector $\tilde{X}$ for this test observation. The feature vector $\tilde{X}$ is a vector with 1×N dimension. Treating this feature vector $\tilde{X}$ as an additional row of the original global co-occurrence matrix $\tilde{F}$ yields:

$$\tilde{X} = \tilde{u}_x \tilde{S} \tilde{V}^T \quad (300),$$

which in turn leads to a point $P_x$ in the global latent space 512 characterized by:

$$P_x = \tilde{u}_x \tilde{S} = \tilde{X}\tilde{V} \quad (400).$$

This point $P_x$ is viewed as the global data representation of the test observation under consideration. In some embodiments, the similarity between two segments (e.g., the test segment and a prototype speech segment from the global training corpus 230) is obtained by a distance measure (e.g., calculated by a dot product) between the associated vectors of the two segments in the global latent space 512. In some embodiments, a nearest neighbor rule is then adopted to predict the phoneme label of the unknown test segment based on the known phoneme labels of the prototype speech segments in the global training corpus 230.

As set forth earlier, the global training corpus 230 includes training samples with variations caused by many different factors, such as speaker's emotions, vocal characteristics, and accents, ambient noise levels, acoustic properties of the local environment, and/or noise level and noise characteristics of the recording devices, etc. The latent perceptual mapping (LPM) method described above enables template-based speech recognition while keeping the number of modeling parameters tractable. Even though the latent space generated from the global training corpus as described with reference to FIG. 5A provides a reduced-rank acoustic model for speech recognition, generation of the global latent space 512 from the global training dataset 232, and classification/recognition of unknown test observations based on the global latent space 512 still requires a significant amount of computational resources. Therefore, it is difficult to deploy the training and/or recognition process on a mobile platform.

To address the above issues, in some embodiments, a smaller, and more focused set of training data (i.e., exemplar segments and exemplar templates) are specifically selected for each test observation at hand, and a respective focused speech recognition model is generated for each test observation based on the smaller, more focused set of training data. In some embodiments, the global speech recognition model (specifically, the global latent space 512) provides the basis, albeit with some approximations and representation inaccuracies, for determining the subset of training data that are relevant to the particular test observation at hand. FIGS. 5B and 5C provide more details on the selection and modifications of the focused set of training data.

As shown in FIG. 5B, an exemplar selection process is performed by an exemplar selection module (e.g., the exemplar selection module 224 of FIG. 2) of the speech recognition system. During the exemplar selection process, the exemplar selection module identifies the smaller, and more focused set of training data for each particular test observation based on the global speech recognition model. In some embodiments, the test observation is one of a plurality of input speech segment 552 of a speech input 550. In some embodiments, the test observation is an input speech segment 552 that has been vector quantized into a respective sequence of symbols using the same codebook as that used in vector quantizing the global training data 232.

In some embodiments, the exemplar selection module first obtains a set of candidate training segments 554 and a set of candidate training templates 556 from which exemplar segments and exemplar templates relevant to the particular test observation (or input speech segment) 552 will be selected. In some embodiments, the set of candidate training segments 554 includes at least some or all of the initial set of training speech segments 506 used during the general training stage. In some embodiments, the set of candidate training segments 554 includes one or more additional training segments outside of the initial set of training speech segments 506. For example, in some embodiments, the one or more additional training segments are selected from the extra training segments 514. In some embodiments, the set of candidate training templates 556 includes at least some or all of the initial set of training speech templates 508 used during the general training stage. In some embodiments, the set of candidate training templates 556 includes one or more additional training templates outside of the initial set of training speech templates 508. For example, in some embodiments, the one or more additional training templates are selected from the extra training templates 516. The candidate speech segments 554 and the candidate speech templates 556 constitute the respective candidate training dataset 548 for the particular input speech segment 552.

In some embodiments, the exemplar selection module selects the exemplar segments 560 and exemplar templates 562 from the candidate training data 548 based on their close similarity to the test observation 552 as determined according to the global speech recognition model (represented by the global latent space 512 of FIG. 5A) generated in the general training stage. In some embodiments, the respective degree of similarity between the test observation and each of the candidate training samples is measured based on the distance (e.g., dot product) between respective positions of the test observation 552 and the candidate training segments and templates in the global latent space 512. A smaller distance in the global latent space 512 represents a higher degree of similarity in the global latent space 512.

In some embodiments, the exemplar selection module maps the test observation (e.g., the input speech segment 552), each of the candidate training segments 554, and each of the candidate training templates 556 into the global latent space 512, and obtains their respective representations 558 in the global latent space 512. The respective representations 558 in the global latent space 512 each represent a respective location in the global latent space 512. Based on respective locations to which the test observation (e.g., the input speech segment 552), the candidate training segments 554, and the candidate training templates 556 have been mapped in the global latent space 512, the exemplar selection module determines whether each particular candidate training segment or candidate training template is relevant to the test observation (e.g., the input speech segment 552). As described in more details below, the relevance is based on clustering or a threshold distance measured from the test observation.

In some embodiments, the candidate training segments 554, the candidate training templates 556, and the test observation (e.g., the input speech segment 552 are clustered into different groups in the global latent space 512 based on their respective locations in the global latent space 512. The candidate training segments and templates that fall into the same cluster as the test observation (e.g., input speech segment 552) are designated as being relevant to the test observation. In some embodiments, whether a candidate training segment or candidate training template is relevant to the test observation is determined based on whether that candidate training segment or candidate training template is within a threshold distance r away from the test observation in the global latent space 512.

In some embodiments, to find the global representations of candidate templates and segments that were included in the global training dataset 232, recall that the $m^{th}$ segment in the initial set of training speech segments 506 is characterized by the $m^{th}$ row of the global co-occurrence matrix $\tilde{F}$, the row vector $\tilde{u}_m \tilde{S}$ characterizes the position of the $m^{th}$ segment in the global latent space 512. Similarly, the $n^{th}$ template in the initial set of training speech templates 508 is characterized by the $n^{th}$ column of the global co-occurrence matrix $\tilde{F}$, the column vector $\tilde{S}\tilde{v}_n^T$ (or equivalently, the row vector $\tilde{v}_n \tilde{S}$) characterizes the position of the $n^{th}$ template in the global latent space 512. In addition, the test observation (e.g., the input speech segment 552) has a respective global data representation $P_x = \tilde{u}_x \tilde{S} = \tilde{X}\tilde{V}$ of in the global latent space 512, and characterizes the position of the test observation (e.g., the input speech segment 552) in the global latent space 512.

In some embodiments, global data representation for each extra training segment $\tilde{Z}$ can be found in a similar manner as the test observation (e.g., the input speech segment 552). Treating the feature vector $\tilde{Z}$ of the extra training segment an additional row of the original co-occurrence matrix $\tilde{F}$ yields:

$$\tilde{Z} = \tilde{u}_Z \tilde{S} \tilde{V}^T \tag{500},$$

which in turn leads to a point $P_z$ in the global latent space characterized by:

$$P_z = \tilde{u}_Z \tilde{S} = \tilde{Z}\tilde{V} \tag{600}.$$

This point $P_z$ is viewed as the global data representation of the extra training segment, and characterizes the position of the extra training segment in the global latent space 512. In a similar manner, the global data representation of an extra training template $\tilde{Z}'$ is obtained by treating the feature vector of the extra template $\tilde{Z}'$ as an additional column of the global co-occurrence matrix 512, and the a point $$P_{z'} = \tilde{u}_Z \tilde{S} = \tilde{Z}' \tilde{V} \tag{700}$$

is the global data representation of the extra template $\tilde{Z}'$ in the global latent space and characterizes the position of the extra training template in the global latent space 512. According to the method above, a respective global data representation (and the respective position in the global latent space 512) is obtained for each extra training segment and each extra training template that was included in the candidate training dataset 548 but not in the global training dataset 232.

In some embodiments, the exemplar selection module selects all of the candidate training templates and segments that fall within the same cluster as the test observation as exemplars (including exemplar templates and exemplar segments) for the test observation (e.g., input speech segment 552).

In some embodiments, the exemplar selection module selects all of the candidate training segments that are within a threshold distance away from the test observation (e.g., the input speech segment 552) as exemplar segments relevant to the input speech segment 552. In some embodiments, the exemplar selection module selects all of the candidate training templates that are within a threshold distance away from the test observation as exemplar templates for the test observation.

In some embodiments, the threshold distances used for selecting the exemplar templates 562 and the exemplar segments 560 are adjusted for each different test observation depending on the number of exemplars that are found within the candidate training data 548 for the test observation. For example, if there are too few (e.g., less than a minimum threshold number) candidate segments and templates found within a given threshold distance from the test observation, the threshold distance is increased such that more candidate segments and/or templates are identified as exemplars for the test observation. If there are too many (e.g., more than a maximum threshold number) candidate segments and templates found within a given threshold distance from the test observation 552, the threshold distance is decreased such that fewer candidate segments and templates are identified as exemplars for the test observation.

In some embodiments, the set of exemplar segments 560 and the set of exemplar templates 562 that have been selected for test observation (e.g., the input speech segment 552) are stored in the focused training dataset 236 of FIG. 2. In some embodiments, the refinement training module (e.g., the refinement training module 226 of FIG. 2) utilizes the exemplar training segments 560 and the exemplar training templates 562 saved in the respective focused training dataset 236 for the test observation (e.g., the input speech segment 552) to generate the respective focused speech recognition model for the test observation (e.g., the input speech segment 552).

In some embodiments, after the exemplar selection module obtains the observation-specific, focused training dataset 236 (i.e., the set of observation exemplars) has been obtained during the exemplar selection stage shown in FIG. 5B, the exemplar selection module provides the observation-specific, focused training dataset 236 to the refinement training module (e.g., the refinement training module 226 of FIG. 2) to perform the focused training process (or the refinement training process). FIG. 5C illustrates the operations that occur during the focused training stage.

In some embodiments, the refinement training module generates a focused segment-template co-occurrence matrix 564 directly from the set of exemplar segments 560 and the set of exemplar templates 562 selected during the exemplar selection stage. In some embodiments, before the refinement training module generates the focused segment-template matrix 564 from the sets of exemplar segments 560 and exemplar templates 562, the refinement training module makes one or more modifications to the sets of exemplar segments 560 and exemplar templates 562. In some embodiments, the modifications are based on the sets of exemplar segments 560 and exemplar templates 562. In some embodiments, if a modified set of exemplar segments 560' and/or a modified set of exemplar templates 562' are produced through the modifications, the refinement training module generates the focused segment-template co-occurrence matrix 564 from the modified set of exemplar segments 560' and/or the modified set of exemplar templates 562'.

In some embodiments, when several exemplar templates cluster close together within the region near the input test segment 552 in the global latent space 512, the exemplar selection module merges the several exemplar templates into a single exemplar template and includes the merged exemplar template in the modified set of exemplar templates 562' in place of the several exemplar templates. In some embodiments, one or more representatives are selected from the several exemplar templates to remain in the modified set of exemplar templates 562' while the unselected exemplar templates are removed from the modified set of exemplar templates 562'. In some embodiments, exemplar templates are considered to be clustered close together when the relative distance between the several exemplar templates are less than a small threshold distance, e.g., $\frac{1}{10}$ of the threshold distance r for exemplar selection, in the global latent space 512.

In some embodiments, when several exemplar segments that correspond to different sequences of symbols in the output domain cluster close together within the region near the input test segment in the global latent space 512, the exemplar selection module generates one or more new exemplar templates to better distinguish between the several exemplar segments.

In some embodiments, based on the set of exemplar templates 560 and the set of exemplar segments 562 selected in the global latent space 512, the refinement training module regenerates a new set of exemplar segments and a new set of exemplar templates from the raw speech samples that correspond to the selected exemplars. The newly generated exemplar segments and templates are then included in the modified set of exemplar segments 560' and the modified set of exemplar templates 562'. The methods for generating segments and templates from raw speech samples have been described in more detail with respect to the generation of training speech segments 502 and the training speech templates 504 from the training speech samples 230.

In some embodiments, one or more of the following are performed to generate the new exemplar segments and/or the new exemplar templates for inclusion in the modified set of exemplar segments 560' and the modified set of exemplar templates 562': (1) a different set of speech segments are derived from the training samples by changing the segment duration or frame size, (2) a different set of features are identified through unsupervised clustering of the speech segments, (3) a different codebook is generated from the speech segments, (4) a different set of repeated patterns are identified from the speech segments and the codebook, and (5) a different subset of the repeated patterns are selected as templates based on their ranking scores.

In some embodiments, after the set of focused training dataset 236 or 236' has been determined by the refinement training module, the refinement training module uses the focused, observation-specific training dataset 236 or 236' to generate a focused segment-template co-occurrence matrix 564 for the input speech segment 552. The refinement training module then performs singular vector decomposition (SVD) to generate the focused latent space 568. The focused latent space 568 has a set of orthonormal bases that are better aligned with the input speech segment 552 and, in general, has fewer dimensions than the global latent space 512. Therefore, the focused latent space 568 can provide a more accurate representation of the input speech segment 552, and leads to more accurate classification results for the input speech segment 552.

In some embodiments, the exemplar selection and refinement training processes are performed only once for each new test observation (e.g., a new input speech segment) to be classified/recognized by the speech recognition system. In some embodiments, the exemplar selection and refinement training process are performed for multiple iterations to obtain an "ultimate" focused speech recognition model for the input speech segment. In some embodiments, in each iteration performed after the initial iteration, during the exemplar selection stage, the observation-specific speech recognition model generated from the previous iteration is used in place of the global speech recognition model, and the observation-specific candidate training dataset is either selected from the global training corpus or from the focused training dataset selected during the previous iteration. During the focused training stage of each iteration performed after the initial iteration, a new focused latent space is generated based on the newly selected set of exemplars in the current iteration.

Figure 6:
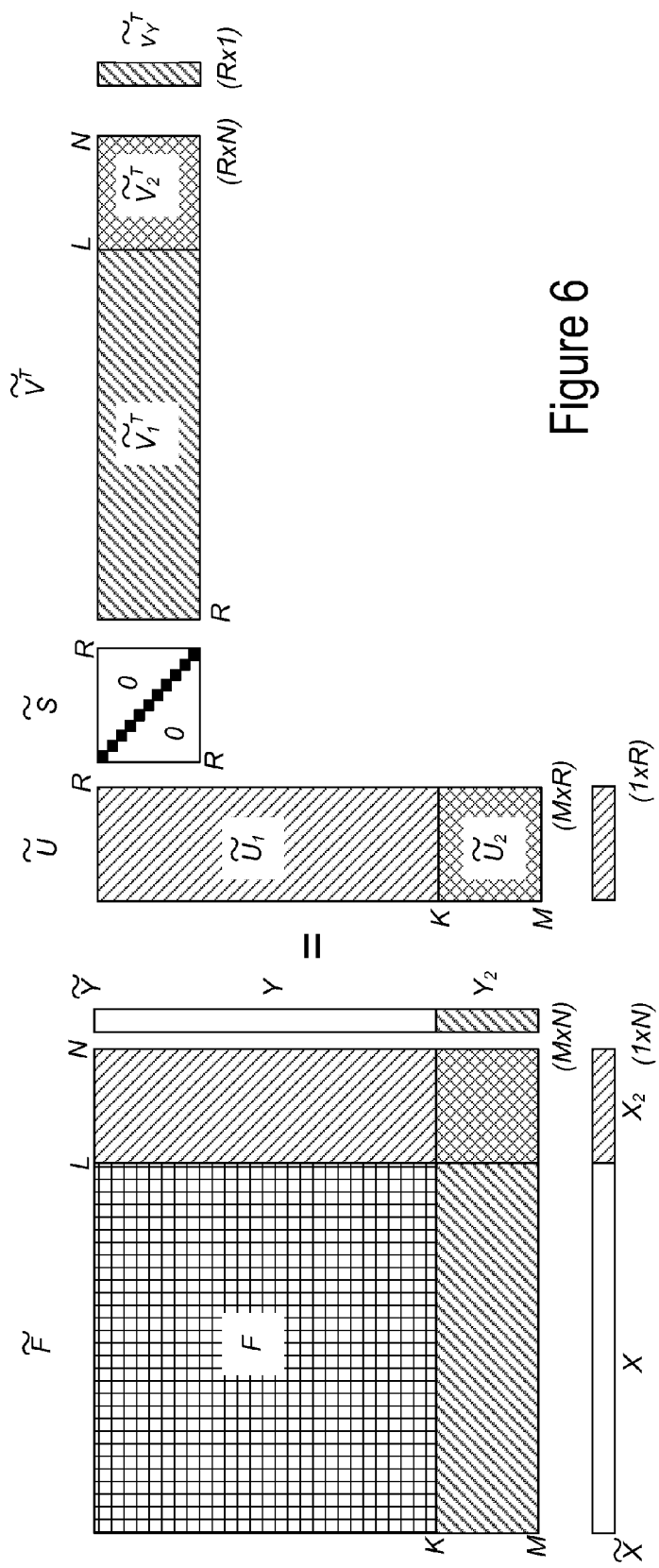
FIG. 6 illustrates mathematical manipulations involved in the selection of the observation-specific exemplars and generation of the observation-specific acoustic model in accordance with some embodiments.

In some embodiments, the methods for generating the focused segment-template co-occurrence matrix from the selected exemplars and generating the focused latent space from the focused segment-template co-occurrence matrix are the same as those described with respect to generating the global segment-template co-occurrence matrix 510 and the global latent space 512 in the global training stage. In some embodiments, the refinement training module and the global training module utilizes the same set of sub-modules to perform the training, but uses different training datasets as inputs for those sub-modules. FIG. 6 provides more details on the generation of the focused latent space 568 from the selected exemplar segments and the selected exemplar templates in accordance with some embodiments.

In some embodiments, after the observation-specific, focused speech recognition model (specifically, the focused latent space 568) is generated for the test observation (e.g., input speech segment 552), the test observation is classified/recognized in the output domain according to the focused speech recognition model. In some embodiments, as shown in FIG. 5D, the input speech segment 552 is recognized by mapping the input speech segment 552 into the focused latent space 568 using the well-known Latent Perceptual Mapping (LPM) "folding in" technique. By gathering the relevant contributions of the exemplar templates to this input speech segment, it is possible to generate a feature vector X for this input speech segment. The feature vector X is a vector with 1×L dimensions, where L is the number of exemplar templates used to generate the focused latent space 568. Treating this feature vector X as an additional row of the focused co-occurrence matrix F yields:

$$X = u_X S V^T \qquad (800),$$

where S and V are left and right singular matrices derived from SVD performed on the focused co-occurrence matrix F. X in turn leads to a point $P_x'$ in the focused latent space 568 characterized by:

$$P_x' = u_X S = X V \qquad (900).$$

This point $P_x'$ is viewed as the focused data representation of the input speech segment in the focused latent space 568. Respective focused data representations of prototype segments that have known counterparts in the output domain are obtained in a similar manner. In some embodiments, the similarity between two segments (e.g., the test observation and a prototype speech segment from the global training corpus 230) is obtained by a distance measure (e.g., calculated by a dot product) between the associated vectors of the two segments in the focused latent space 568. In some embodiments, a nearest neighbor rule is then adopted to predict the phoneme label of the input speech segment based on the known phoneme labels of the prototype speech segments in the global training corpus 230. As shown in FIG. 5D, the classification module obtained the respective focused representations 572 for the input speech segment 552 and the prototype segments 570, and generates a classification output 574 based on the focused representations 572.

FIG. 6 illustrates the mathematical manipulations used in the generation of the focused latent space from the selected exemplars in accordance with some embodiments. Transformation relationships between the global latent space and the focused latent space are also explored based on these mathematical manipulations. As explained above, the global data modeling encapsulated by the initial global latent space 512 enables the selection of local exemplars best aligned with test observations of interest (e.g., the input speech segment 552 in FIGS. 5A-5D). In some embodiments, such test observations could encompass both test segments and extra templates, depending on the application. For example, although the above explanation provides a scenario for selecting relevant exemplars and generating a focused latent space for an input speech segment, an analogous process can also be performed to identify relevant exemplars and generating a focused latent space for an extra template that was not included in the original set of templates. In some embodiments, the extra template is evaluated in the focused latent space and included as an additional template, or rejected as being a composite of several existing templates.

Because the latent space comprises both segments and templates, a nearest-neighbor rule using any reasonable (typically cosine-based) distance measure defined on the space leads to: (1) the K segments closest to either a test segment or an extra template, and/or (ii) the L templates closest to either a test segment or an extra template. Assuming without loss of generality, that the K segments and L templates selected above are arranged in such a way that they appear in the global segment-template co-occurrence matrix in the order as illustrated in FIG. 6, forming the small matrix F with K×L dimensions in the upper left corner of the global segment-template co-occurrence matrix $\tilde{F}$. The reduced description F (e.g., a focused segment-template co-occurrence matrix) serves as the basis for re-computing the associated latent space (e.g., a focused latent space). Keeping R for the order of the decomposition, the singular value decomposition of F yields:

$$F = U S V^T \qquad (1000)$$

with analogous definitions and properties as in Equation 200 above, including the orthonormality constraint $U^T U = V^T V = I_R$. In this new latent space, segments and templates are now represented by the rows of the K×R matrix US and the L×R matrix VS, respectively. In particular, the test segment X and the extra template Y are represented as:

$$X = u_X S V^T \quad (1100), \text{ and}$$

$$Y = U S v_Y^T \quad (1200),$$

leading to the new points $u_X S = XV$ and $v_Y S = Y^T U$, respectively. These new representations in the focused latent space relate to the original representations $\tilde{u}_X \tilde{S} = X \tilde{V}$ and $\tilde{v}_Y \tilde{S} = \tilde{Y}^T \tilde{U}$ in the global latent space by a set of fixed transformations as will be illustrated below. These transformation relationships will illustrate the relationship between sparsity and dimensionality reduction.

First, referring back to FIG. 6 where the global left and right matrices $\tilde{U}$ and $\tilde{V}$ are split as $[\tilde{U}_1^T \ \tilde{U}_2^T]$ and $[\tilde{V}_1^T \ \tilde{V}_2^T]$ respectively. In addition, vectors $\tilde{X}$ and $\tilde{Y}^T$ have been split as $[X \ X_2]$ and $[Y^T \ Y_2^T]^T$, respectively.

First, Note that, since $[\tilde{U}_1^T \ \tilde{U}_2^T]$ and $[\tilde{V}_1^T \ \tilde{V}_2^T]$ are both symmetric and positive definite, there exist two unique R×R lower triangular non-singular matrices G and H such that the following Cholesky factorizations hold:

$$GG^T = \tilde{U}_1^T \tilde{U}_1 \text{ and } HH^T = \tilde{V}_1^T \tilde{V}_1.$$

Given that U and V are orthonormal, the above factorizations are seen to correspond to:

$$\tilde{U}_1 = UG^T \quad (1102), \text{ and}$$

$$\tilde{V}_1 = VH^T \quad (1104),$$

which jointly encapsulate the underlying relationship between the global and the focused SVD matrices.

Further, by inspection of FIG. 6, it can be seen that:

$$F = USV^T = \tilde{U}_1 \tilde{S} \tilde{V}_1^T \quad (1106),$$

$$X = u_X S V^T = \tilde{u}_X \tilde{S} \tilde{V}_1^T \quad (1108), \text{ and}$$

$$Y = U S v_Y^T = \tilde{U}_1 \tilde{S} \tilde{v}_Y^T \quad (1110).$$

Invoking again the orthonormality of U and V and taking into account Equations 1102 and 1104, it is seen that:

$$US = \tilde{U}_1 \tilde{S} H \quad (1112),$$

$$u_X S = \tilde{u}_X \tilde{S} H \quad (1114),$$

$$VS = \tilde{V}_1 \tilde{S} G \quad (1116), \text{ and}$$

$$v_Y S = \tilde{v}_Y \tilde{S} G \quad (1118).$$

Taken together, Equations 1112-1118 thus define the transformation that relates the global latent space (based on global training data) and the focused latent space (based on selected exemplars).

An interesting interpretation of the above transformation ensues from the orthonormality constraints associated with the global latent space:

$$\tilde{F} = \tilde{U} \tilde{S} \tilde{V}^T \quad (200),$$

the orthonormality constraints can be expressed as:

$$\tilde{U}^T \tilde{U} = \tilde{U}_1^T \tilde{U}_1 + \tilde{U}_2^T \tilde{U}_2 = I_R \quad (1120), \text{ and}$$

$$\tilde{V}^T \tilde{V} = \tilde{V}_1^T \tilde{V}_1 + \tilde{V}_2^T \tilde{V}_2 = I_R \quad (1122).$$

In a situation where $\tilde{U}_2^T \tilde{U}_2 \approx 0$ and $\tilde{V}_2^T \tilde{V}_2 \approx 0$, we observe that the orthonormality constraints 1120 and 1122 reduce to:

$$\tilde{U}_1^T \tilde{U}_1 = I_R \quad (1124), \text{ and}$$

$$\tilde{V}_1^T \tilde{V}_1 = I_R \quad (1126).$$

In other words, the two matrices $\tilde{U}_1$ and $\tilde{V}_1$ become column-orthonormal. Taking Equations $GG^T = \tilde{U}_1^T \tilde{U}_1$ and $HH^T = \tilde{V}_1^T \tilde{V}_1$ into account, G and H can therefore be interpreted as defining the overall rotation that is necessary to superimpose the two latent spaces. Note that, in that case, from Equations 1112-1118, it is known that:

$$\|u_X S\|_F = \|\tilde{u}_X \tilde{S}\|_F \quad (1128), \text{ and}$$

$$\|v_Y S\|_F = \|\tilde{v}_Y \tilde{S}\|_F \quad (1130),$$

where $\|\cdot\|_F$ denotes the Frobenius matrix norm.

As $\tilde{U}_2^T \tilde{U}_2$ and $\tilde{V}_2^T \tilde{V}_2$ move away from 0, however, the two matrices $\tilde{U}_1$ and $\tilde{V}_1$ start deviating from orthonormality, and from Equations 1112-1118, the Frobenius norms of both G and H decreases accordingly, resulting into:

$$\|u_X S\|_F < \|\tilde{u}_X \tilde{S}\|_F \quad (1132), \text{ and}$$

$$\|v_Y S\|_F < \|\tilde{v}_Y \tilde{S}\|_F \quad (1134).$$

In other words, the transformation between the spaces becomes more akin to "zooming in" onto the region of the original latent space spanned by the exemplar selected.

Thus, there is an inverse relationship between the coverage of the K selected training segments and/or the L selected training templates within the global latent space and the potential gain in representation accuracy that can be achieved by exploiting exemplar-based LPM: the more specific the selected exemplars to the test sample at hand (i.e., the sparser the local representation in the global latent space), the greater the associated "zoom-in" potential.

Now, turning from the sparsity analysis above to dimensionality analysis of the two spaces. During the discussions above, it is assumed that the order of the exemplar-based decomposition remains identical to that of the global data decomposition (i.e., the SVD of the global segment-template co-occurrence matrix). This assumption is acceptable as long as R≤min(K, L). If this is not the case, however, the exemplar-based decomposition must be of order R'≤min(K, L)<R. This introduces another facet to the observation made in the earlier: the sparser the local representation, the smaller the dimension of the focused latent space.

Accommodating this additional element amounts to defining matrices P and Q analogous to G and H in Equations 1112-1118, except that they are now R×R' instead of R×R:

$$P^T P = (\tilde{U}_1^T \tilde{U}_1) \quad (1136), \text{ and}$$

$$Q^T Q = \tilde{V}_1^T \tilde{V}_1 \quad (1138).$$

In essence, the new matrices P and Q incorporate the focused latent space's low dimensionality into the same transformation as before. Since it is no longer possible to directly use Cholesky algorithm to find the above factorizations, this transformation becomes somewhat abstract. Yet, it leads to analogous expressions for the now K×R' and L×R' matrices US and VS as well as their extensions to new observations:

$$US = \tilde{U}_1 \tilde{S} Q \quad (1140),$$

$$u_X S = \tilde{u}_X \tilde{S} Q \quad (1142),$$

$$VS = \tilde{V}_1 \tilde{S} P \quad (1144), \text{ and}$$

$$v_Y S = \tilde{v}_Y \tilde{S} P \quad (1146).$$

Basically, Equations 1140-1146 now define a projection from the global latent space (based on the global training data) to the focused latent space (based on the selected exemplars), reflecting the fact that fewer dimensions are needed to describe the smaller region of the global latent space resulting from the zooming-in process described in this specification.

The above analysis provides insights regarding the relationship between sparsity and dimensionality reduction. Specifically, sparsity enables dimensionality reduction, by making it more attractive (in terms of potential gains in representational accuracy) to zoom in onto a particular region of the global latent space. Conversely, dimensionality reduction can also be viewed as a way to enhance sparsity, by throwing out dimensions that are not critical to the test sample at hand, and thereby influencing what exemplars get retained in the local/focused model. In both cases, the outcome is a more parsimonious representation of the acoustic evidence available in the training corpus. Thus, the LPM methods described in this specification expose the dual nature of parsimoniousness, as comparably conveyed by sparsity and dimensionality reduction.

Although the exemplar-based latent perceptual modeling technique is described in the context of automatic speech recognition, a person skilled in the art would recognize that the same technique can be used in other applications where classification of highly variable input is required, such as handwriting recognition, voice recognition, and fingerprint identification, and so on. To adapt the techniques for these other applications, the training samples, segments, and templates are changed accordingly to those applicable in the specific applications. For example, in handwriting recognition, the training samples are handwriting samples; segments are words, or letters, and/or other segments of writing samples; while templates are units of writing samples that reoccur in multiple segments, such as features particular strokes, etc.

What is claimed is:

1. A method for recognizing speech in an output domain, the method comprising:
at a device comprising one or more processors and memory:
establishing a global speech recognition model based on an initial set of training data;
receiving a plurality of input speech segments to be recognized in the output domain; and for each of the plurality of input speech segments:
identifying in the global speech recognition model a respective set of focused training data relevant to the input speech segment;
generating a respective focused speech recognition model based on the respective set of focused training data;
and providing the respective focused speech recognition model to a recognition device for recognizing the input speech segment in the output domain;
wherein establishing the global speech recognition model based on the initial set of training data further comprises:
generating the initial set of training data from a plurality of training speech samples, the initial set of training data including an initial set of speech segments and an initial set of speech templates;
and deriving a global latent space from the initial set of speech segments and the initial set of speech templates.

2. The method of claim 1, wherein the recognition device is a user device, and the plurality of input speech segments have been derived from a speech input received from a user by the user device.

3. The method of claim 1, wherein, for at least one of the plurality of input speech segments, the global speech recognition model is a respective focused speech recognition model generated in a previous iteration of the identifying and generating performed for the at least one input speech segment.

4. The method of claim 1, wherein identifying in the global speech model the respective set of focused training data relevant to the input speech segment further comprises:
mapping the input speech segment and a set of candidate training data into the global latent space, the set of candidate training data including candidate speech segments and candidate speech templates; and
identifying, from the candidate speech segments and candidate speech templates, a plurality of exemplar segments and a plurality of exemplar templates for inclusion in the respective set of focused training data, wherein the exemplar segments and exemplar templates satisfy a threshold degree of similarity to the input speech segment as measured in the global latent space.

5. The method of claim 4, further comprising:
generating additional training data from the plurality of training speech samples, the additional training data includes additional speech segments and additional speech templates outside of the initial set of speech segments and the initial set of speech templates.

6. The method of claim 4, wherein generating the respective focused speech recognition model based on the respective set of focused training data comprises:
deriving a focused latent space from the plurality of exemplar segments and the plurality of exemplar templates.

7. The method of claim 4, wherein deriving the focused latent space from the plurality of exemplar segments and the plurality of exemplar templates comprises:
modifying at least one of the pluralities of exemplar templates and exemplar segments based on the pluralities of exemplar segments and exemplar templates; and
deriving the focused latent space from the pluralities of exemplar segments and exemplar templates after the modification.

8. The method of claim 4, wherein modifying at least one of the pluralities of exemplar templates and exemplar segments based on the pluralities of exemplar segments and exemplar templates comprises:
merging two or more of the plurality of exemplar templates into a new exemplar template in the plurality of exemplar template.

9. The method of claim 4, wherein modifying at least one of the pluralities of exemplar templates and exemplar segments based on the pluralities of exemplar segments and exemplar templates comprises:
generating at least one new exemplar template from the plurality of exemplar segments; and
including the at least one new exemplar template in the plurality of exemplar templates.

10. The method of claim 4, wherein modifying at least one of the pluralities of exemplar templates and exemplar segments based on the pluralities of exemplar segments and exemplar templates comprises:
removing at least one exemplar template from the plurality of exemplar templates.

11. A method for recognizing speech in an output domain, the method comprising: at a client device comprising one or more processors and memory:
receiving a speech input from a user; for each of a plurality of input speech segments in the speech input: receiving a respective focused speech recognition model, wherein the respective focused speech recognition model is generated based on a respective set of focused training data relevant to the input speech segment, wherein the respective set of focused training data is selected for the input speech segment in a global speech recognition model, and wherein the global speech recognition model is generated based on a set of global training data; and
recognizing the input speech segment using the respective focused speech recognition model;

wherein establishing the global speech recognition model based on the initial set of training data further comprises: generating the initial set of training data from a plurality of training speech samples, the initial set of training data including an initial set of speech segments and an initial set of speech templates;

and deriving a global latent space from the initial set of speech segments and the initial set of speech templates.

12. A non-transitory computer-readable medium having instructions stored thereon, the instructions, when executed by one or more processors, cause the processors to perform operations comprising: establishing a global speech recognition model based on an initial set of training data; receiving a plurality of input speech segments to be recognized in an output domain; and for each of the plurality of input speech segments: identifying in the global speech recognition model a respective set of focused training data relevant to the input speech segment; generating a respective focused speech recognition model based on the respective set of focused training data; and providing the respective focused speech recognition model to a recognition device for recognizing the input speech segment in the output domain;

wherein establishing the global speech recognition model based on the initial set of training data further comprises: generating the initial set of training data from a plurality of training speech samples, the initial set of training data including an initial set of speech segments and an initial set of speech templates;

and deriving a global latent space from the initial set of speech segments and the initial set of speech templates.

13. The computer-readable medium of claim 12, wherein identifying in the global speech model the respective set of focused training data relevant to the input speech segment further comprises:

mapping the input speech segment and a set of candidate training data into the global latent space, the set of candidate training data including candidate speech segments and candidate speech templates; and identifying, from the candidate speech segments and candidate speech templates, a plurality of exemplar segments and a plurality of exemplar templates for inclusion in the respective set of focused training data, wherein the exemplar segments and exemplar templates satisfy a threshold degree of similarity to the input speech segment as measured in the global latent space.

14. The computer-readable medium of claim 13, wherein the operations further comprise:

generating additional training data from the plurality of training speech samples, the additional training data includes additional speech segments and additional speech templates outside of the initial set of speech segments and the initial set of speech templates.

15. The computer-readable medium of claim 13, wherein deriving the focused latent space from the plurality of exemplar segments and the plurality of exemplar templates comprises:

modifying at least one of the pluralities of exemplar templates and exemplar segments based on the pluralities of exemplar segments and exemplar templates; and deriving the focused latent space from the pluralities of exemplar segments and exemplar templates after the modification.

16. The computer-readable medium of claim 13, wherein modifying at least one of the pluralities of exemplar templates and exemplar segments based on the pluralities of exemplar segments and exemplar templates comprises:

merging two or more of the plurality of exemplar templates into a new exemplar template in the plurality of exemplar template.

17. The computer-readable medium of claim 13, wherein modifying at least one of the pluralities of exemplar templates and exemplar segments based on the pluralities of exemplar segments and exemplar templates comprises:

generating at least one new exemplar template from the plurality of exemplar segments; and including the at least one new exemplar template in the plurality of exemplar templates.

18. The computer-readable medium of claim 13, wherein modifying at least one of the pluralities of exemplar templates and exemplar segments based on the pluralities of exemplar segments and exemplar templates comprises:

removing at least one exemplar template from the plurality of exemplar templates.

19. A non-transitory computer-readable medium having instructions stored thereon, the instructions, when executed by one or more processors, cause the processors to perform operations comprising: at a client device: receiving a speech input from a user; for each of a plurality of input speech segments in the speech input: receiving a respective focused speech recognition model, wherein the respective focused speech recognition model is generated based on a respective set of focused training data relevant to the input speech segment, wherein the respective set of focused training data is selected for the input speech segment in a global speech recognition model, and wherein the global speech recognition model is generated based on a set of global training data; and recognizing the input speech segment using the respective focused speech recognition model;

wherein establishing the global speech recognition model based on the initial set of training data further comprises: generating the initial set of training data from a plurality of training speech samples, the initial set of training data including an initial set of speech segments and an initial set of speech templates;

and deriving a global latent space from the initial set of speech segments and the initial set of speech templates.

20. A system, comprising: one or more processors; and memory having instructions stored thereon, the instructions, when executed by the one or more processors, cause the processors to perform operations comprising: establishing a global speech recognition model based on an initial set of training data; receiving a plurality of input speech segments to be recognized in an output domain; and for each of the plurality of input speech segments: identifying in the global speech recognition model a respective set of focused training data relevant to the input speech segment; generating a respective focused speech recognition model based on the respective set of focused training data; and providing the respective focused speech recognition model to a recognition device for recognizing the input speech segment in the output domain;

wherein establishing the global speech recognition model based on the initial set of training data further comprises: generating the initial set of training data from a plurality of training speech samples, the initial set of training data including an initial set of speech segments and an initial set of speech templates;

and deriving a global latent space from the initial set of speech segments and the initial set of speech templates.

21. The system of claim 20, wherein identifying in the global speech model the respective set of focused training data relevant to the input speech segment further comprises:

mapping the input speech segment and a set of candidate training data into the global latent space, the set of candidate training data including candidate speech segments and candidate speech templates; and identifying, from the candidate speech segments and candidate speech templates, a plurality of exemplar segments and a plurality of exemplar templates for inclusion in the respective set of focused training data, wherein the exemplar segments and exemplar templates satisfy a threshold degree of similarity to the input speech segment as measured in the global latent space.

22. The system of claim 21, wherein the operations further comprise:

generating additional training data from the plurality of training speech samples, the additional training data includes additional speech segments and additional speech templates outside of the initial set of speech segments and the initial set of speech templates.

23. The system of claim 21, wherein deriving the focused latent space from the plurality of exemplar segments and the plurality of exemplar templates comprises:

modifying at least one of the pluralities of exemplar templates and exemplar segments based on the pluralities of exemplar segments and exemplar templates; and deriving the focused latent space from the pluralities of exemplar segments and exemplar templates after the modification.

24. The system of claim 21, wherein modifying at least one of the pluralities of exemplar templates and exemplar segments based on the pluralities of exemplar segments and exemplar templates comprises:

merging two or more of the plurality of exemplar templates into a new exemplar template in the plurality of exemplar template.

25. The system of claim 21, wherein modifying at least one of the pluralities of exemplar templates and exemplar segments based on the pluralities of exemplar segments and exemplar templates comprises:

generating at least one new exemplar template from the plurality of exemplar segments; and including the at least one new exemplar template in the plurality of exemplar templates.

26. The system of claim 21, wherein modifying at least one of the pluralities of exemplar templates and exemplar segments based on the pluralities of exemplar segments and exemplar templates comprises:

removing at least one exemplar template from the plurality of exemplar templates.

27. A system, comprising:

one or more processors;

and memory having instructions stored thereon, the instructions, when executed by one or more processors, cause the processors to perform operations comprising:

at a client device:

receiving a speech input from a user; for each of a plurality of input speech segments in the speech input: receiving a respective focused speech recognition model from a server, wherein the respective focused speech recognition model is generated based on a respective set of focused training data relevant to the input speech segment, wherein the respective set of focused training data is selected for the input speech segment in a global speech recognition model, and wherein the global speech recognition model is generated based on a set of global training data;

and recognizing the input speech segment using the respective focused speech recognition model;

wherein establishing the global speech recognition model based on the initial set of training data further comprises: generating the initial set of training data from a plurality of training speech samples, the initial set of training data including an initial set of speech segments and an initial set of speech templates;

and deriving a global latent space from the initial set of speech segments and the initial set of speech templates.

* * * * *